US011544288B2

(12) United States Patent
Horowitz et al.

(10) Patent No.: US 11,544,288 B2
(45) Date of Patent: Jan. 3, 2023

(54) SYSTEMS AND METHODS FOR MANAGING DISTRIBUTED DATABASE DEPLOYMENTS

(71) Applicant: MongoDB, Inc., New York, NY (US)

(72) Inventors: Eliot Horowitz, New York, NY (US); Cory P. Mintz, Millstone, NJ (US); Cailin Anne Nelson, Boulder, CO (US); Akshay Kumar, New York, NY (US)

(73) Assignee: MongoDB, Inc., New York, NY (US)

( * ) Notice: Subject to any disclaimer, the term of this patent is extended or adjusted under 35 U.S.C. 154(b) by 0 days.

(21) Appl. No.: 15/627,631

(22) Filed: Jun. 20, 2017

(65) Prior Publication Data

US 2017/0286516 A1    Oct. 5, 2017

Related U.S. Application Data

(63) Continuation-in-part of application No. 15/605,141, filed on May 25, 2017, now Pat. No. 10,698,775, and
(Continued)

(51) Int. Cl.
*G06F 16/27* (2019.01)
*G06F 11/14* (2006.01)
(Continued)

(52) U.S. Cl.
CPC .......... *G06F 16/273* (2019.01); *G06F 11/14* (2013.01); *G06F 11/1458* (2013.01);
(Continued)

(58) Field of Classification Search
CPC .... G06F 16/273; G06F 11/34; G06F 16/2365; G06F 11/1458; G06F 2201/84;
(Continued)

(56) References Cited

U.S. PATENT DOCUMENTS 4,918,593 A    4/1990    Huber
5,379,419 A    1/1995    Heffernan et al.
(Continued)

OTHER PUBLICATIONS

[No Author Listed], Automated Administration Tasks (SQL Server Agent). https://docs.microsoft.com/en-us/sql/ssms/agent/automated-adminsitration-tasks-sql-server-agent. 2 pages. [downloaded Mar. 4, 2017].

(Continued)

*Primary Examiner* — Usmaan Saeed
*Assistant Examiner* — Andalib F Lodhi
(74) *Attorney, Agent, or Firm* — Woll, Greenfield & Sacks, P.C.

(57) ABSTRACT

Various aspects provide for implementation of a cloud service for running, monitoring, and maintaining cloud distributed database deployments and in particular examples, provides cloud based services to run, monitor and maintain deployments of the known MongoDB database. Various embodiments provide services, interfaces, and manage provisioning of dedicated servers for the distributed database instances (e.g., MongoDB instances). Further aspects, including providing a database as a cloud service that eliminates the design challenges associated with many distributed database implementations, while allowing the client's input on configuration choices in building the database. In some implementations, clients can simply identity a number of database nodes, capability of the nodes, and within minutes have a fully functioning, scalable, replicated, and secure distributed database in the cloud.

26 Claims, 21 Drawing Sheets

Related U.S. Application Data a continuation-in-part of application No. 15/605,372, filed on May 25, 2017, now Pat. No. 10,614,098, which is a continuation-in-part of application No. 15/074,987, filed on Mar. 18, 2016, now Pat. No. 10,621,200, which is a continuation-in-part of application No. 14/969,537, filed on Dec. 15, 2015, now Pat. No. 9,881,034, which is a continuation of application No. 14/064,705, filed on Oct. 28, 2013, now Pat. No. 9,317,576, which is a continuation of application No. 12/977,563, filed on Dec. 23, 2010, now Pat. No. 8,572,031.

(60) Provisional application No. 62/355,087, filed on Jun. 27, 2016, provisional application No. 62/343,494, filed on May 31, 2016, provisional application No. 62/343,546, filed on May 13, 2016.

(51) Int. Cl.
  *G06F 16/23* (2019.01)
  *G06F 11/34* (2006.01)
  *G06F 11/30* (2006.01)

(52) U.S. Cl.
  CPC .......... *G06F 11/3006* (2013.01); *G06F 11/34* (2013.01); *G06F 11/3433* (2013.01); *G06F 11/3452* (2013.01); *G06F 16/2365* (2019.01); *G06F 2201/80* (2013.01); *G06F 2201/84* (2013.01)

(58) Field of Classification Search
  CPC .. G06F 11/3433; G06F 11/3006; G06F 11/14; G06F 11/3452; G06F 2201/80
  See application file for complete search history.

(56) References Cited

U.S. PATENT DOCUMENTS

| | | | |
|---|---|---|---|
| 5,416,917 A | 5/1995 | Adair et al. |
| 5,471,629 A | 11/1995 | Risch |
| 5,551,027 A | 8/1996 | Choy et al. |
| 5,598,559 A | 1/1997 | Chaudhuri |
| 5,710,915 A | 1/1998 | McElhiney |
| 5,884,299 A | 3/1999 | Ramesh et al. |
| 5,999,179 A | 12/1999 | Kekic et al. |
| 6,065,017 A | 5/2000 | Barker |
| 6,088,524 A | 7/2000 | Levy et al. |
| 6,112,201 A | 8/2000 | Wical |
| 6,115,705 A | 9/2000 | Larson |
| 6,212,529 B1 | 4/2001 | Boothby et al. |
| 6,240,406 B1 | 5/2001 | Tannen |
| 6,240,514 B1 | 5/2001 | Inoue et al. |
| 6,249,866 B1 | 6/2001 | Brundett et al. |
| 6,324,540 B1 | 11/2001 | Khanna et al. |
| 6,324,654 B1 | 11/2001 | Wahl et al. |
| 6,339,770 B1 | 1/2002 | Leung et al. |
| 6,351,742 B1 | 2/2002 | Agarwal et al. |
| 6,363,389 B1 | 3/2002 | Lyle et al. |
| 6,385,201 B1 | 5/2002 | Iwata |
| 6,385,604 B1 | 5/2002 | Bakalash et al. |
| 6,427,230 B1 | 7/2002 | Goiffon et al. |
| 6,438,538 B1 | 8/2002 | Goldring |
| 6,496,843 B1 | 12/2002 | Getchius et al. |
| 6,505,187 B1 | 1/2003 | Shatdal |
| 6,611,850 B1 | 8/2003 | Shen |
| 6,687,846 B1 | 2/2004 | Adrangi et al. |
| 6,691,101 B2 | 2/2004 | MacNicol et al. |
| 6,748,393 B1 | 6/2004 | Kapoor et al. |
| 6,801,905 B2 | 10/2004 | Andrei |
| 6,823,474 B2 | 11/2004 | Kampe et al. |
| 6,920,460 B1 | 7/2005 | Srinivasan et al. |
| 6,959,369 B1 | 10/2005 | Ashton et al. |
| 6,973,452 B2 | 12/2005 | Metzger et al. |
| 7,020,649 B2 | 3/2006 | Cochrane et al. |
| 7,032,089 B1 | 4/2006 | Ranade et al. |
| 7,082,473 B2 | 7/2006 | Breitbart et al. |
| 7,177,866 B2 | 2/2007 | Holenstein et al. |
| 7,181,460 B2 | 2/2007 | Coss et al. |
| 7,191,299 B1 | 3/2007 | Kekre et al. |
| 7,246,345 B1 | 7/2007 | Shanna et al. |
| 7,447,807 B1 | 11/2008 | Merry et al. |
| 7,467,103 B1 | 12/2008 | Murray et al. |
| 7,469,253 B2 | 12/2008 | Celis et al. |
| 7,472,117 B2 | 12/2008 | Dettinger et al. |
| 7,486,661 B2 | 2/2009 | Van den Boeck et al. |
| 7,529,834 B1 | 5/2009 | Birrell et al. |
| 7,548,928 B1 | 6/2009 | Dean et al. |
| 7,552,356 B1 | 6/2009 | Waterhouse et al. |
| 7,558,481 B2 | 7/2009 | Jenkins et al. |
| 7,567,991 B2 | 7/2009 | Armangau et al. |
| 7,617,369 B1 | 11/2009 | Bezbaruah et al. |
| 7,634,459 B1 | 12/2009 | Eshet et al. |
| 7,647,329 B1 | 1/2010 | Fischman et al. |
| 7,657,570 B2 | 2/2010 | Wang et al. |
| 7,657,578 B1 * | 2/2010 | Karr ............... G06F 11/2069 707/831 |
| 7,668,801 B1 | 2/2010 | Koudas et al. |
| 7,761,465 B1 | 7/2010 | Nonaka et al. |
| 7,778,959 B2 * | 8/2010 | Fries ............... G06F 11/1464 707/609 |
| 7,827,144 B1 | 11/2010 | Saito et al. |
| 7,957,284 B2 | 6/2011 | Lu et al. |
| 7,962,458 B2 | 6/2011 | Holenstein et al. |
| 8,005,804 B2 | 8/2011 | Greer |
| 8,005,868 B2 | 8/2011 | Saborit et al. |
| 8,037,059 B2 | 10/2011 | Bestgen et al. |
| 8,078,825 B2 | 12/2011 | Oreland et al. |
| 8,082,265 B2 | 12/2011 | Carlson et al. |
| 8,086,597 B2 | 12/2011 | Balmin et al. |
| 8,099,572 B1 | 1/2012 | Arora et al. |
| 8,103,906 B1 * | 1/2012 | Alibakhsh ............... H04L 67/01 718/1 |
| 8,108,443 B2 | 1/2012 | Thusoo |
| 8,126,848 B2 | 2/2012 | Wagner |
| 8,170,984 B2 | 5/2012 | Bakalash et al. |
| 8,185,505 B1 * | 5/2012 | Blitzer ............... G06F 11/1458 707/679 |
| 8,260,840 B1 | 9/2012 | Sirota et al. |
| 8,296,419 B1 | 10/2012 | Khanna et al. |
| 8,305,999 B2 | 11/2012 | Palanki et al. |
| 8,321,558 B1 | 11/2012 | Sirota et al. |
| 8,352,450 B1 | 1/2013 | Mraz et al. |
| 8,352,463 B2 | 1/2013 | Nayak |
| 8,363,961 B1 | 1/2013 | Avidan et al. |
| 8,370,857 B2 | 2/2013 | Kamii et al. |
| 8,386,463 B2 | 2/2013 | Bestgen et al. |
| 8,392,482 B1 | 3/2013 | McAlister et al. |
| 8,539,197 B1 | 9/2013 | Marshall et al. |
| 8,572,031 B2 | 10/2013 | Merriman et al. |
| 8,589,382 B2 | 11/2013 | Betawadkar-Norwood |
| 8,589,574 B1 | 11/2013 | Cormie et al. |
| 8,615,507 B2 | 12/2013 | Varadarajulu et al. |
| 8,712,044 B2 | 4/2014 | MacMillan et al. |
| 8,712,993 B1 | 4/2014 | Ordonez |
| 8,751,533 B1 | 6/2014 | Dhavale et al. |
| 8,775,070 B1 | 7/2014 | Bhatia |
| 8,843,441 B1 | 9/2014 | Rath et al. |
| 8,869,256 B2 | 10/2014 | Sample |
| 8,996,463 B2 | 3/2015 | Merriman et al. |
| 9,015,431 B2 | 4/2015 | Resch et al. |
| 9,069,827 B1 | 6/2015 | Rath et al. |
| 9,116,862 B1 | 8/2015 | Rath et al. |
| 9,141,814 B1 | 9/2015 | Murray |
| 9,183,254 B1 | 11/2015 | Cole et al. |
| 9,262,462 B2 | 2/2016 | Merriman et al. |
| 9,268,639 B2 | 2/2016 | Leggette et al. |
| 9,274,902 B1 | 3/2016 | Morley et al. |
| 9,313,604 B1 | 4/2016 | Holcombe |
| 9,317,576 B2 | 4/2016 | Merriman et al. |
| 9,350,633 B2 | 5/2016 | Cudak et al. |
| 9,350,681 B1 | 5/2016 | Kitagawa et al. |
| 9,442,995 B2 | 9/2016 | Pareek et al. |

(56) References Cited

U.S. PATENT DOCUMENTS

| | | |
|---|---|---|
| 9,460,008 B1 | 10/2016 | Leshinsky et al. |
| 9,495,427 B2 | 11/2016 | Abadi et al. |
| 9,569,481 B1 | 2/2017 | Chandra et al. |
| 9,628,404 B1 | 4/2017 | Goffinet et al. |
| 9,660,666 B1 | 5/2017 | Ciarlini et al. |
| 9,715,433 B2 | 7/2017 | Mu et al. |
| 9,740,762 B2 | 8/2017 | Horowitz et al. |
| 9,792,322 B2 | 10/2017 | Merriman et al. |
| 9,800,685 B2 | 10/2017 | Neerincx et al. |
| 9,805,108 B2 | 10/2017 | Merriman et al. |
| 9,881,034 B2 | 1/2018 | Horowitz et al. |
| 9,959,308 B1 | 5/2018 | Carman et al. |
| 10,031,931 B2 | 7/2018 | Horowitz et al. |
| 10,031,956 B2 | 7/2018 | Merriman et al. |
| 10,262,050 B2 | 4/2019 | Bostic et al. |
| 10,303,570 B2 | 5/2019 | Nakajima |
| 10,346,430 B2 | 7/2019 | Horowitz et al. |
| 10,346,434 B1 | 7/2019 | Morkel et al. |
| 10,366,100 B2 | 7/2019 | Horowitz et al. |
| 10,372,926 B1 | 8/2019 | Leshinsky et al. |
| 10,394,822 B2 | 8/2019 | Stearn |
| 10,423,626 B2 | 9/2019 | Stearn et al. |
| 10,430,433 B2 | 10/2019 | Stearn et al. |
| 10,467,245 B2 | 11/2019 | Sirer et al. |
| 10,474,645 B2 | 11/2019 | Freedman et al. |
| 10,489,357 B2 | 11/2019 | Horowitz et al. |
| 10,496,669 B2 | 12/2019 | Merriman et al. |
| 10,614,098 B2 | 4/2020 | Horowitz et al. |
| 10,621,050 B2 | 4/2020 | Horowitz et al. |
| 10,621,200 B2 | 4/2020 | Merriman et al. |
| 10,671,496 B2 | 6/2020 | Horowitz et al. |
| 10,673,623 B2 | 6/2020 | Horowitz et al. |
| 10,698,775 B2 | 6/2020 | Horowitz et al. |
| 10,713,275 B2 | 7/2020 | Merriman et al. |
| 10,713,280 B2 | 7/2020 | Horowitz et al. |
| 10,740,353 B2 | 8/2020 | Horowitz et al. |
| 10,740,355 B2 | 8/2020 | Horowitz et al. |
| 10,776,220 B2 | 9/2020 | Horowitz et al. |
| 10,846,305 B2 | 11/2020 | Merriman et al. |
| 10,846,411 B2 | 11/2020 | Horowitz et al. |
| 10,866,868 B2 | 12/2020 | Horowitz |
| 10,872,095 B2 | 12/2020 | Horowitz et al. |
| 10,977,277 B2 | 4/2021 | Merriman et al. |
| 10,990,590 B2 | 4/2021 | Merriman et al. |
| 10,997,211 B2 | 5/2021 | Merriman et al. |
| 11,012,806 B2 | 5/2021 | Tan et al. |
| 11,222,043 B2 | 1/2022 | Horowitz et al. |
| 2001/0021929 A1 | 9/2001 | Lin et al. |
| 2002/0029207 A1 | 3/2002 | Bakalash et al. |
| 2002/0065675 A1 | 5/2002 | Grainger et al. |
| 2002/0065676 A1 | 5/2002 | Grainger et al. |
| 2002/0065677 A1 | 5/2002 | Grainger et al. |
| 2002/0143901 A1 | 10/2002 | Lupo et al. |
| 2002/0147842 A1 | 10/2002 | Breitbart et al. |
| 2002/0184239 A1 | 12/2002 | Mosher, Jr. et al. |
| 2002/0198872 A1 | 12/2002 | MacNicol et al. |
| 2003/0046307 A1 | 3/2003 | Rivette et al. |
| 2003/0212668 A1 | 4/2003 | Hinshaw et al. |
| 2003/0084073 A1 | 5/2003 | Hotti et al. |
| 2003/0088659 A1 | 5/2003 | Susarla et al. |
| 2003/0182427 A1 | 9/2003 | Halpern |
| 2003/0187864 A1 | 10/2003 | McGoveran |
| 2004/0078569 A1 | 4/2004 | Hotti |
| 2004/0133591 A1 | 7/2004 | Holenstein et al. |
| 2004/0168084 A1 | 8/2004 | Owen et al. |
| 2004/0186817 A1 | 9/2004 | Thames et al. |
| 2004/0186826 A1 | 9/2004 | Choi et al. |
| 2004/0205048 A1 | 10/2004 | Pizzo et al. |
| 2004/0220937 A1 | 11/2004 | Bickford et al. |
| 2004/0236743 A1 | 11/2004 | Blaicher et al. |
| 2004/0254919 A1 | 12/2004 | Giuseppini |
| 2005/0027796 A1 | 2/2005 | San Andres et al. |
| 2005/0033756 A1 | 2/2005 | Kottomtharayil |
| 2005/0038833 A1 | 2/2005 | Colrain et al. |
| 2005/0192921 A1 | 9/2005 | Chaudhuri et al. |
| 2005/0216923 A1 | 9/2005 | Krebs |
| 2005/0234841 A1 | 10/2005 | Miao et al. |
| 2005/0283457 A1 | 12/2005 | Sonkin et al. |
| 2006/0004746 A1 | 1/2006 | Angus et al. |
| 2006/0020586 A1 | 1/2006 | Prompt et al. |
| 2006/0085541 A1 | 4/2006 | Cuomo et al. |
| 2006/0090095 A1 | 4/2006 | Massa et al. |
| 2006/0168154 A1 | 7/2006 | Zhang et al. |
| 2006/0209782 A1 | 9/2006 | Miller et al. |
| 2006/0218123 A1 | 9/2006 | Chowdhuri et al. |
| 2006/0224603 A1 | 10/2006 | Correll, Jr. |
| 2006/0235905 A1 | 10/2006 | Kapur |
| 2006/0259160 A1 | 11/2006 | Hood et al. |
| 2006/0287998 A1 | 12/2006 | Folting et al. |
| 2006/0288232 A1 | 12/2006 | Ho et al. |
| 2006/0294129 A1 | 12/2006 | Stanfill et al. |
| 2007/0050436 A1 | 3/2007 | Chen et al. |
| 2007/0061487 A1 | 3/2007 | Moore et al. |
| 2007/0094237 A1 | 4/2007 | Mitchell et al. |
| 2007/0124317 A1 | 5/2007 | Dettinger et al. |
| 2007/0203944 A1* | 8/2007 | Batra .................. G06F 16/27 |
| 2007/0226640 A1 | 9/2007 | Holbrook et al. |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0005475 A1 | 1/2008 | Lubbers et al. |
| 2008/0016021 A1 | 1/2008 | Gulbeden et al. |
| 2008/0071755 A1 | 3/2008 | Barsness et al. |
| 2008/0098041 A1 | 4/2008 | Chidambaran et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0030986 A1 | 1/2009 | Bates |
| 2009/0055350 A1 | 2/2009 | Branish et al. |
| 2009/0077010 A1 | 3/2009 | Muras et al. |
| 2009/0094318 A1 | 4/2009 | Gladwin et al. |
| 2009/0172322 A1* | 7/2009 | Gilpin ................. G06F 11/1464 711/162 |
| 2009/0222474 A1 | 9/2009 | Alpern et al. |
| 2009/0240744 A1 | 9/2009 | Thomson et al. |
| 2009/0254572 A1 | 10/2009 | Redlich et al. |
| 2009/0271412 A1 | 10/2009 | Lacapra et al. |
| 2010/0011026 A1 | 1/2010 | Saha et al. |
| 2010/0030793 A1 | 2/2010 | Cooper et al. |
| 2010/0030800 A1 | 2/2010 | Brodfuehrer et al. |
| 2010/0049717 A1 | 2/2010 | Ryan et al. |
| 2010/0057764 A1 | 3/2010 | Williamson |
| 2010/0058010 A1 | 3/2010 | Augenstein et al. |
| 2010/0094851 A1 | 4/2010 | Bent et al. |
| 2010/0106934 A1 | 4/2010 | Calder et al. |
| 2010/0161492 A1 | 6/2010 | Harvey et al. |
| 2010/0198791 A1 | 8/2010 | Wu et al. |
| 2010/0205028 A1 | 8/2010 | Johnson et al. |
| 2010/0223078 A1 | 9/2010 | Willis et al. |
| 2010/0235606 A1 | 9/2010 | Oreland et al. |
| 2010/0250497 A1 | 9/2010 | Redlich et al. |
| 2010/0250930 A1 | 9/2010 | Csaszar et al. |
| 2010/0257142 A1* | 10/2010 | Murphy .............. G06F 11/1464 707/681 |
| 2010/0333111 A1 | 12/2010 | Kothamasu |
| 2010/0333116 A1* | 12/2010 | Prahlad ................ G06F 3/067 713/153 |
| 2011/0022642 A1 | 1/2011 | deMilo et al. |
| 2011/0032571 A1 | 2/2011 | Kitada |
| 2011/0125704 A1 | 5/2011 | Mordinova et al. |
| 2011/0125766 A1 | 5/2011 | Carozza |
| 2011/0125894 A1 | 5/2011 | Anderson et al. |
| 2011/0138148 A1 | 6/2011 | Friedman et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2011/0258225 A1 | 10/2011 | Taylor et al. |
| 2011/0258317 A1 | 10/2011 | Sinha et al. |
| 2011/0295686 A1 | 12/2011 | Martin-Cocher |
| 2011/0307338 A1 | 12/2011 | Carlson |
| 2012/0054155 A1 | 3/2012 | Darcy |
| 2012/0054249 A1 | 3/2012 | Batra et al. |

(56) References Cited

U.S. PATENT DOCUMENTS

| | | |
|---|---|---|
| 2012/0054755 A1 | 3/2012 | Evans |
| 2012/0076058 A1 | 3/2012 | Padmanabh et al. |
| 2012/0078848 A1 | 3/2012 | Jennas et al. |
| 2012/0078896 A1 | 3/2012 | Nixon et al. |
| 2012/0079224 A1* | 3/2012 | Clayton .............. G06F 11/1456 711/162 |
| 2012/0084414 A1 | 4/2012 | Brock et al. |
| 2012/0084789 A1 | 4/2012 | Iorio |
| 2012/0109892 A1 | 5/2012 | Novik et al. |
| 2012/0109935 A1 | 5/2012 | Meijer |
| 2012/0130973 A1 | 5/2012 | Tamm et al. |
| 2012/0130988 A1 | 5/2012 | Nica et al. |
| 2012/0131278 A1 | 5/2012 | Chang et al. |
| 2012/0136835 A1 | 5/2012 | Kosuru et al. |
| 2012/0138671 A1 | 6/2012 | Gaede et al. |
| 2012/0158655 A1 | 6/2012 | Dove et al. |
| 2012/0158949 A1 | 6/2012 | Lee |
| 2012/0159097 A1 | 6/2012 | Jennas, II et al. |
| 2012/0166390 A1 | 6/2012 | Merriman et al. |
| 2012/0166517 A1 | 6/2012 | Lee et al. |
| 2012/0179833 A1 | 7/2012 | Kenrick et al. |
| 2012/0198200 A1 | 8/2012 | Li et al. |
| 2012/0215740 A1 | 8/2012 | Vaillant et al. |
| 2012/0215763 A1 | 8/2012 | Hughes et al. |
| 2012/0221540 A1 | 8/2012 | Rose et al. |
| 2012/0254175 A1 | 10/2012 | Horowitz et al. |
| 2012/0274664 A1 | 11/2012 | Fagnou |
| 2012/0320914 A1 | 12/2012 | Thyni et al. |
| 2013/0019296 A1 | 1/2013 | Brandenburg |
| 2013/0151477 A1 | 6/2013 | Tsaur et al. |
| 2013/0151558 A1 | 6/2013 | Chércoles Sńchez et al. |
| 2013/0179450 A1 | 7/2013 | Chitiveli |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2013/0346366 A1* | 12/2013 | Ananthanarayanan ...................... G06F 16/273 707/611 |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1 | 3/2014 | Berman et al. |
| 2014/0101100 A1 | 4/2014 | Hu et al. |
| 2014/0164831 A1 | 6/2014 | Merriman et al. |
| 2014/0180723 A1 | 6/2014 | Cote et al. |
| 2014/0201267 A1 | 7/2014 | Yang |
| 2014/0258343 A1 | 9/2014 | Nikula |
| 2014/0279929 A1 | 9/2014 | Gupta et al. |
| 2014/0280380 A1 | 9/2014 | Jagtap et al. |
| 2014/0289197 A1 | 9/2014 | Webber et al. |
| 2015/0012797 A1 | 1/2015 | Leggette et al. |
| 2015/0016300 A1 | 1/2015 | Devireddy et al. |
| 2015/0074041 A1 | 3/2015 | Bhattachaijee et al. |
| 2015/0081766 A1 | 3/2015 | Curtis et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2015/0331755 A1 | 11/2015 | Morgan |
| 2015/0341212 A1 | 11/2015 | Hsiao et al. |
| 2015/0378786 A1 | 12/2015 | Suparna et al. |
| 2015/0378825 A1 | 12/2015 | Resch |
| 2016/0005423 A1 | 1/2016 | Neppalli et al. |
| 2016/0048345 A1 | 2/2016 | Vijayrao et al. |
| 2016/0110284 A1 | 4/2016 | Athalye et al. |
| 2016/0110414 A1 | 4/2016 | Park et al. |
| 2016/0162354 A1 | 6/2016 | Singhai et al. |
| 2016/0162374 A1 | 6/2016 | Mutha et al. |
| 2016/0188377 A1 | 6/2016 | Thimmappa et al. |
| 2016/0198044 A1 | 7/2016 | Gruchala et al. |
| 2016/0203202 A1 | 7/2016 | Merriman et al. |
| 2016/0246861 A1 | 8/2016 | Merriman et al. |
| 2016/0253109 A1 | 9/2016 | Litke et al. |
| 2016/0306709 A1 | 10/2016 | Shaull |
| 2016/0323378 A1 | 11/2016 | Coskun et al. |
| 2016/0364440 A1 | 12/2016 | Lee et al. |
| 2017/0032007 A1 | 2/2017 | Merriman |
| 2017/0032010 A1 | 2/2017 | Merriman |
| 2017/0091327 A1 | 3/2017 | Bostic et al. |
| 2017/0109398 A1 | 4/2017 | Stearn |
| 2017/0109399 A1 | 4/2017 | Stearn et al. |
| 2017/0109421 A1 | 4/2017 | Stearn et al. |
| 2017/0169059 A1 | 6/2017 | Horowitz et al. |
| 2017/0177658 A1 | 6/2017 | Lee et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2017/0371968 A1 | 12/2017 | Horowitz et al. |
| 2018/0004801 A1 | 1/2018 | Burchall et al. |
| 2018/0004804 A1 | 1/2018 | Merriman et al. |
| 2018/0095852 A1 | 4/2018 | Keremane et al. |
| 2018/0096045 A1 | 4/2018 | Merriman et al. |
| 2018/0096066 A1* | 4/2018 | Venkataramanappa ...................... G06F 11/1451 |
| 2018/0150230 A1 | 5/2018 | Schreter |
| 2018/0165338 A1 | 6/2018 | Kumar et al. |
| 2018/0173745 A1 | 6/2018 | Balasubramanian et al. |
| 2018/0176300 A1 | 6/2018 | Chen et al. |
| 2018/0300203 A1* | 10/2018 | Kathpal ................ G06F 16/278 |
| 2018/0300209 A1 | 10/2018 | Rahut |
| 2018/0300381 A1 | 10/2018 | Horowitz et al. |
| 2018/0300385 A1 | 10/2018 | Merriman et al. |
| 2018/0314750 A1 | 11/2018 | Merriman et al. |
| 2018/0343131 A1 | 11/2018 | George et al. |
| 2018/0365114 A1 | 12/2018 | Horowitz |
| 2019/0102410 A1 | 4/2019 | Horowitz et al. |
| 2019/0303382 A1 | 10/2019 | Bostic et al. |
| 2020/0097486 A1 | 3/2020 | Horowitz et al. |
| 2020/0099392 A1 | 3/2020 | Hecker et al. |
| 2020/0160297 A1 | 5/2020 | Munk |
| 2020/0285549 A1 | 9/2020 | Horowitz et al. |
| 2020/0295925 A1 | 9/2020 | Horowitz et al. |
| 2020/0327021 A1 | 10/2020 | Horowitz et al. |
| 2020/0341867 A1 | 10/2020 | Horowitz et al. |
| 2020/0409804 A1 | 12/2020 | Horowitz et al. |

OTHER PUBLICATIONS

Chang et al., Bigtable: a distributed storage system for structured data. OSDI'06: Seventh Symposium on Operating System Design and Implementation. Nov. 2006.

Cooper et al., PNUTS: Yahoo!'s hosted data serving platform. VLDB Endowment. Aug. 2008.

Decandia et al., Dynamo: Amazon's highly available key-value store. SOSP 2007. Oct. 2004.

Nelson et al., Automate MongoDB with MMS. PowerPoint Presentation. Published Jul. 24, 2014. 27 slides. http://www.slideshare.net/mongodb/mms-automation-mongo-db-world.

Poder, Oracle living books. 2009. <http://tech.e2sn.com/oracle/sql/oracle-execution-plan-operation-reference >.

Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.

Van Renesse et al., Chain replication for supporting high throughput and availability. OSDI. 2004: 91-104.

Walsh et al., Xproc: An XML Pipeline Language. May 11, 2011. <https://www.w3.org/TR/xproc/>.

(56) References Cited

OTHER PUBLICATIONS

Wikipedia, Dataflow programming. Oct. 2011. <http://en.wikipedia.org/wiki/Dataflow_programming>.
Wikipedia, Pipeline (Unix). Sep. 2011. <http://en.wikipedia.org/wiki/Pipeline (Unix)>.
Wilkins et al., Migrate DB2 applications to a partitioned database. developerWorks, IBM. Apr. 24, 2008, 33 pages.
Ongaro et al., In Search of an Understandable Consensus Algorithm Proceedings of USENIX ATC '14: 2014 USENIX Annual Technical Conference. Philadelphia, PA. Jun. 19-20, 2014; pp. 305-320.
U.S. Appl. No. 16/890,948, filed Jun. 2, 2020, Merriman et al.
U.S. Appl. No. 16/887,092, filed May 29, 2020, Horowitz et al.
U.S. Appl. No. 16/883,653, filed May 26, 2020, Horowitz et al.
U.S. Appl. No. 16/912,963, filed Jun. 26, 2020, Horowitz et al.
U.S. Appl. No. 17/083,238, filed Oct. 28, 2020, Horowitz et al.
U.S. Appl. No. 17/018,475, filed Sep. 11, 2020, Horowitz et al.
U.S. Appl. No. 17/541,890, filed Dec. 3, 2021, Horowitz et al.

* cited by examiner

| Snapshot View 902 | Operation Log View 904 |
|---|---|
| | Create VEGETABLE collection |
| Snapshot_5-10-15_1000 | |
| | Insert CARROT into VEGETABLE collection |
| | Insert BROCCOLI into VEGETABLE collection |
| Snapshot_5-10-15_1001 | |
| | Insert TOMATO into VEGETABLE collection |
| | Remove TOMATO from VEGETABLE collection |
| | Create FRUIT collection |
| | Insert TOMATO into FRUIT collection |
| Snapshot_5-10-15_1002 | |
| | Insert BANANA into FRUIT collection |
| | Insert APPLE into FRUIT collection |

FIG. 9

SYSTEMS AND METHODS FOR MANAGING DISTRIBUTED DATABASE DEPLOYMENTS

RELATED APPLICATIONS

This Application claims the benefit under 35 U.S.C. § 120 of U.S. application Ser. No. 15/605,141, entitled "METHOD AND APPARATUS FOR READING AND WRITING COMMITTED DATA" filed on May 25, 2017, which is herein incorporated by reference in its entirety. Application Ser. No. 15/605,141 claims priority under 35 U.S.C. § 119(e) to U.S. Provisional Application Ser. No. 62/343,494, entitled "METHOD AND APPARATUS FOR READING AND WRITING COMMITTED DATA" filed on May 31, 2016, which is herein incorporated by reference in its entirety. This Applications claims the benefit under 35 U.S.C. § 120 of U.S. application Ser. No. 15/605,372, entitled "SYSTEM AND METHOD FOR DETERMINING CONSENSUS WITHIN A DISTRIBUTED DATABASE" filed on May 25, 2017, which is herein incorporated by reference in its entirety. Application Ser. No. 15/605,372 claims priority under 35 U.S.C. § 119(e) to U.S. Provisional Application Ser. No. 62/343,546, entitled "SYSTEM AND METHOD FOR DETERMINING CONSENSUS WITHIN A DISTRIBUTED DATABASE" filed on May 31, 2016, which is herein incorporated by reference in its entirety. Application Ser. No. 15/605,372 claims the benefit under 35 U.S.C. § 120 of U.S. application Ser. No. 15/074,987, entitled "METHOD AND APPARATUS FOR MAINTAINING REPLICA SETS" filed on Mar. 18, 2016, which is herein incorporated by reference in its entirety. Application Ser. No. 15/074,987 claims the benefit under 35 U.S.C. § 120 of U.S. application Ser. No. 14/064,705, entitled "METHOD AND APPARATUS FOR MAINTAINING REPLICA SETS" filed on Oct. 28, 2013, which is herein incorporated by reference in its entirety. Application Ser. No. 14/064,705 claims the benefit under 35 U.S.C. § 120 of U.S. application Ser. No. 12/977,563, entitled "METHOD AND APPARATUS FOR MAINTAINING REPLICA SETS" filed on Dec. 23, 2010, which is herein incorporated by reference in its entirety. This Applications claims priority under 35 U.S.C. § 119(e) to U.S. Provisional Application Ser. No. 62/355,087, entitled "SYSTEMS AND METHODS FOR MANAGING DISTRIBUTED DATABASE DEPLOYMENTS" filed on Jun. 27, 2016, which is herein incorporated by reference in its entirety. This Applications claims the benefit under 35 U.S.C. § 120 of U.S. application Ser. No. 14/969,537, entitled "SYSTEMS AND METHODS FOR AUTOMATING MANAGEMENT OF DISTRIBUTED DATABASES" filed on Dec. 15, 2015, which is herein incorporated by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

A number of conventional database systems exist that implement large and scalable database architectures. A variety of database architectures can be selected and tailored to a specific data requirements (e.g., large volume reads, high data availability, no data loss, etc.). As the number of systems that support the various architectures increase, the complexity of the database system likewise increases. In some settings, management of the database system becomes as complex as the architecture itself, and can overwhelm administrators who need to make changes on large distributed databases. Further, the design phase of such implementations is rife with error, inconsistency, and conflict. As distributed databases integrate cloud services and virtual architectures, these problems are magnified.

SUMMARY

Various aspects provide for implementation of a cloud service for running, monitoring, and maintaining distributed database deployments and in particular examples, provide cloud based services to run, monitor and maintain deployments of the known MongoDB database. Various embodiments provide services, interfaces, and manage provisioning of dedicated cloud resources for the distributed database instances (e.g., MongoDB instances). According to another aspect, providing database as a cloud service eliminates the design challenges associated with many distributed database implementations, while allowing the client's input on configuration choices in building the database. In some implementations, clients can simply identity a number of database nodes, capability of the nodes, and within minutes have a fully functioning, scalable, replicated, and secure distributed database.

According to one aspect, provided is a cloud implemented database as a service offering. Various embodiments implement cloud based services (e.g., via a manager process coupled with automatic execution of database configuration and provisioning) that generate any number of MongoDB instances. Some embodiments are configured to automatically provision cloud resources where an automation agent and/or monitor agent is included on every database component being instantiated, for example, as a cloud based service. Automation agents and/or monitor agents can be configured to monitor the database for performance optimizations, administrative tasks, updates, etc., and execute any of the preceding automatically, with little or no downtime to the distributed database.

According to various embodiments, the cloud implemented database as a service model is provided transparently to the end user. For example, the end user connects to the new database as if the client provisioned the hardware themselves or in other words, installed the database on their own machine locally. The client executes queries, writes, reads, etc., using the same command line interface or graphical user interfaces to which they are accustomed.

According to some embodiments, the system creates user distributed databases hosted in the cloud using templates for necessary configurations and/or architecture, and/or enables fine grain user selections specifying varying degrees of implementation details for database configurations (e.g., replication settings, number of nodes (e.g., nodes hosting database data) in the database, database partition information, consistency model, scale, architecture, storage engine, application version, etc.). In some examples, users can dynamically specify template use or select options to specify detailed database configurations. In further examples, user are presented with turnkey solutions (e.g., pre-defined architecture based on minimal input (e.g., replication (yes/no), number of replica nodes in a replica set (if yes), memory for nodes (e.g., RAM), and storage capacity for nodes (e.g., virtual disk allocation)), among other options). Alternatively user can fine tune turnkey default selections, and in another alternatives, users can specify the settings for the entire system providing a tailorable open system.

In further embodiments, the cloud based platform provides for integrated cloud resources with other implementations of MongoDB managed solutions. For example, the cloud system is uniquely positioned to provide database as a service and, for example, to integrate with existing MongoDB services (e.g., tools, automation, all automation/back up services, etc.). And other embodiments, cloud resources can be configured to capture and implement configuration and architecture of an existing database implementation.

According to one aspect, a system for managing a cloud hosted database service is provided. The system comprises: at least one processor operative connected to a memory, a provisioning component, executed by the at least one processor, configured to accept user specification of configuration for a distributed database, configured to: provision cloud based resources having processor and memory for a user, install and configure a database subsystem on the cloud based resource, wherein the database subsystem comprises: at least one replica set comprising a primary node hosting a primary database instance that accepts database write operations from client systems, and at least two secondary nodes that host copies of the primary database instance that replicate logged operations from the primary node, wherein the database subsystem is configured to accept write and read commands from client systems connected to the database subsystem, and provide a result to the client from matching records in the database stored in the replica set responsive to client communicated operations, a monitoring application, executing on the at least one cloud based resource, configured to communicate performance metrics (e.g., utilization of the cloud resources (e.g., processor usage, processor usage per user, storage usage, storage usage per indexes, storage usage per journal, I/O utilization for data, I/O utilization for indexes, I/O utilization for journal, etc.) for cloud resource utilization by the distributed database to a central management server and communicate performance metrics (e.g., primary live status, database router status, IOPS per database instance or user, database instance size, operations counters (e.g., per database instance, network, etc.), connection counters, bandwidth usage, logical instance size, to the central management server) for database operation to the central management server, and wherein the database subsystem is further configured to accept optimization information from the central management server based on analysis of the performance metrics for cloud resource utilization and the performance metrics for database operation by the central management server.

According to one embodiment, the provisioning component is configured to provision the cloud resources responsive to user entry of naming information, architecture information, database subsystem version, database geographic region, instance size, and database management information. According to one embodiment, the provisioning component is configured to generate user interface displays, wherein the user interface displays are configured to accept specification of: naming information (e.g., group name, cluster name, etc.); architecture information (e.g., replication factor, sharding enabled, etc.); a database subsystem version; a database geographic region; a database instance size (e.g., RAM, storage, etc.); and database management information (e.g., back up enabled). According to one embodiment, the provisioning component is configured to receive optimization information from the central management server; and automatically provision new cloud resources, install database subsystems having optimizations (e.g., new application version, updated storage engine, additional replica set nodes, etc.).

According to one embodiment, the provisioning component is further configured to manage transition between an original database resource and the new cloud resource enabling the new cloud resources to operate with the database subsystem and retire the original resource from use. According to one embodiment, the monitoring application further comprises at least one monitor agent executed on instantiated cloud resources configured to collect the performance metrics for cloud resource utilization or at least one monitor agent executing on database subsystem components (e.g., replica set nodes, database routing processes, database configuration processes, database subsystem instance associated with respective primary and secondary database nodes of the distributed database) configured to collect the performance metrics for database operation. According to one embodiment, the database subsystem further comprises a plurality of replica sets, wherein the database data is partitioned across the plurality of replica sets (e.g., each partition is supported by a replica set); a routing component configured to route client data requests to respective replica sets based on configuration metadata for the database data; and a configuration sever configured to store configuration metadata specifying location of database ranges, wherein a connection manager is configured to manage database connections from the client to the routing component.

According to one embodiment, the system further comprises, a snapshot component, executed on the at least one cloud resource, configured to: generate a plurality of snapshots of data stored in the at least one replica set, and identify a committed snapshot from the plurality of snapshots of data that is representative of data that has been replicated on a majority of members of the at least one replica set, and a command processing component configured to read the committed snapshot responsive specification of a read commit option in a client request and generate the result of data matching the read request using the committed snapshot. According to one embodiment, the snapshot component is further configured to identify a new committed snapshot responsive to receipt of at least one confirmation from the at least two secondary nodes. According to one embodiment, the at least one replica set is configured to communicate, via a normal database operation, heartbeat information as metadata within a write operation function; and automatically recover a primary node in the distributed database system in response to a detected failure of the primary node by an absence of the heartbeat information.

According to one aspect, a computer implemented method for managing a cloud hosted database service is provided. The method comprises: accepting, by a provisioning component, user specification of configuration for a distributed database, installing and configuring, by the provisioning component, a database subsystem on cloud based resources, wherein installing and configuring includes: hosting a primary copy of database data on a primary node, replicating write operations on the primary node to at least two secondary nodes hosting copies of the primary copy of the database, communicating, by a monitoring component, performance metrics for cloud resource utilization by the distributed database and performance metrics for database operation to a e central management server, and accepting, from the central management server, optimization information based on analysis of the performance metrics for cloud resource utilization and the performance metrics for database operation by the central management server.

According to one embodiment, the method further comprises provisioning the cloud resources responsive to user entry of naming information, architecture information, database subsystem version, database geographic region, instance size, and database management information. According to one embodiment, the method further comprises generating user interface displays, wherein the user interface displays are configured to accept specification of: naming information (e.g., group name, cluster name, etc.); architecture information (e.g., replication factor, sharding enabled, etc.); a database subsystem version; a database geographic region; a database instance size (e.g., RAM, storage, etc.); and database management information (e.g., back up enabled). According to one embodiment, the method further comprises receiving optimization information from the central management server; automatically provisioning new cloud resources; and installing database subsystems having optimizations (e.g., new application version, updated storage engine, additional replica set nodes, etc.).

According to one embodiment, the method further comprises managing transition between an original database resource and the new cloud resource enabling the new cloud resources to operate with the database subsystem; and retiring the original resource from use. According to one embodiment, the monitoring application further comprises at least one monitor agent on instantiated cloud resources or on database subsystem components, and the method further comprises collecting the performance metrics for cloud or the performance metrics for database operation. According to one embodiment, the database subsystem further comprises a plurality of replica sets, and the method further comprises partitioning the database data across the plurality of replica sets (e.g., each partition is supported by a replica set); routing client data requests to respective replica sets based on configuration metadata for the database data; and storing configuration metadata specifying location of database ranges.

According to one embodiment, the method further comprises: generating, by a snapshot component, a plurality of snapshots of data stored in the at least one replica set, and identifying a committed snapshot from the plurality of snapshots that is representative of data that has been replicated on a majority of members of the at least one replica set; and reading the committed snapshot responsive specification of a read commit option in a client request and generating the result of data matching the read request from the committed snapshot. According to one embodiment, the method further comprises identifying a new committed snapshot responsive to receipt of at least one confirmation from the at least two secondary nodes. According to one embodiment, the method further comprises communicate, via a normal database operation, heartbeat information as metadata within a write operation function; and automatically recovering a primary node in the distributed database system in response to a detected failure of the primary node by an absence of the heartbeat information.

According to one aspect, a cloud distributed database system is provided. The system comprises at least one cloud based resource, the at least one cloud based resource including processor and memory, a database subsystem executing on the at least one cloud based resource, wherein the database subsystem comprises at least one replica set including a primary node hosting a primary database instance that accepts database write operations from client systems, and at least two secondary nodes that host copies of the primary database instance that replicate logged operations from the primary node, a connection manager configured to control authentication of the client systems based on connection strings communicated from the client systems connecting to the at least one cloud resources, wherein the database subsystem is configured to accept database operations including write and read commands from client systems connected to the database subsystem, and provide a result to the client from matching records in the database stored in the replica set responsive to client communicated database operations (e.g., default operation is configured to read and write from the primary node, client commands are executed by the replica set to resolve data operations against secondary nodes when specified), and a monitoring application, executing on the at least one cloud based resource, configured to: communicate performance metrics for cloud resource utilization by the distributed database (e.g., utilization of the cloud resources (e.g., processor usage, processor usage per user, storage usage, storage usage per indexes, storage usage per journal, I/O utilization for data, I/O utilization for indexes, I/O utilization for journal, etc.) to a central management server, communicate performance metrics for database operation (e.g., primary live status, database router status, IOPS per database instance or user, database instance size, operations counters (e.g., per database instance, network, etc.), connection counters, bandwidth usage, logical instance size, to the central management server), and wherein the database subsystem is further configured to accept optimization information from the central management server based on analysis of the performance metrics for cloud resource utilization and the performance metrics for database operation by the central management server.

According to one embodiment, the monitoring application further comprises at least one monitor agent executed on instantiated cloud resources configured to collect the performance metrics for cloud resource utilization. According to one embodiment, the monitoring application further comprising at least one monitor agent executing on database application components (e.g., replica set nodes, database routing processes, database configuration processes, database application instance associated with respective primary and secondary database nodes of the distributed database) configured to collect the performance metrics for database operation.

According to one embodiment, the database subsystem further comprises: a plurality of replica sets, wherein the database data is partition across the plurality of replica sets, a routing component configured to route client data requests to respective replica sets based on configuration metadata for the database data, and a configuration sever configured to store configuration metadata specifying location of database ranges. According to one embodiment, the connection manager is configured to manage database connections from the client to the routing component. According to one embodiment, the system further comprises an automation component executed on the at least one cloud resource configured to automatically execute optimization information from the central management server.

According to one embodiment, the automation component is configured to automatically provision additional database components hosted on cloud resources responsive to optimization information. According to one embodiment, the automation component is configured to provision a new secondary node in the at least one replica set and trigger an initial synchronization with at least one of the at least two secondary nodes to provide a copy of the primary node's database, update configuration information for the at least one replica set, and trigger replication of logged operations on the primary node to the new secondary node.

According to one embodiment, the system further comprises a snapshot component, executed on the at least one cloud resource, configured to: generate a plurality of snapshots of data stored in the at least one replica set; and identify a committed snapshot from the plurality of snapshots that is representative of data that has been replicated on a majority of members of the at least one replica set, and a command processing component configured to read the committed snapshot responsive specification of a read commit option in a client request and generate the result of data matching the read request using the committed snapshot. According to one embodiment, the snapshot component is further configured to identify a new committed snapshot responsive to receipt of at least one confirmation from the at least two secondary nodes.

According to one embodiment, the command processing component is configured identify a data storage node from the at least one replica set having data consistent with the committed snapshot and execute a read commit operations from the identified data storage node. According to one embodiment, the at least one replica set is configured to: communicate, via a normal database operation, heartbeat information as metadata within a write operation function, and automatically recover a primary node in the distributed database system in response to a detected failure of the primary node by an absence of the heartbeat information.

According to one aspect, a computer implemented method for managing a distributed database on cloud resources is provided. The method comprises: executing a database subsystem on at least one cloud based resource having memory and processor, wherein the database subsystem comprises at least one replica set including a primary node hosting a primary database instance, and at least two secondary nodes that host copies of the primary database instance, executing, by the database subsystem, write operations at the primary database instance and replicating the write operations to the at least two secondary nodes, managing, by the database subsystem, authentication of client systems based on connection strings communicated from the client systems connecting to the at least one cloud resource and accepting database operations including write and read commands from client systems connected to the database subsystem, communicating, by the database subsystem, a result to the client from the database stored in the at least one replica set responsive to the client communicated operations (e.g., default operation is configured to read and write from the primary node, client commands are executed by the replica set to resolve data operations against secondary nodes when specified), communicating, by a monitoring component executed on the at least one cloud based resource, performance metrics for cloud resource utilization by the distributed database (e.g., utilization of the cloud resources (e.g., processor usage, processor usage per user, storage usage, storage usage per indexes, storage usage per journal, I/O utilization for data, I/O utilization for indexes, I/O utilization for journal, etc.) to a central management server, communicating, by the monitoring component, performance metrics for database operation (e.g., primary live status, database router status, IOPS per database instance or user, database instance size, operations counters (e.g., per database instance, network, etc.), connection counters, bandwidth usage, logical instance size, to the central management server), and accepting, by the database subsystem, optimization information from the central management server based on analysis of the performance metrics for cloud resource utilization and the performance metrics for database operation by the central management server.

According to one embodiment, the method further comprises executing a monitoring application on instantiated cloud resources. According to one embodiment, the method further comprises executing a monitoring application on a plurality of database application components (e.g., replica set nodes, database routing processes, database configuration processes, database application instance associated with respective primary and secondary database nodes of the distributed database). According to one embodiment, the method further comprises partitioning the database data across a plurality of replica sets, routing client data requests, by a routing component, to respective replica sets based on configuration metadata for the database data, and storing on a configuration sever configuration metadata specifying location of database ranges.

According to one embodiment, the method further comprises managing database connections from the client to the routing component by a connection manager. According to one embodiment, the method further comprises executing, automatically optimization information from the central management server by an automation component executed on the at least one cloud resource.

According to one embodiment, the method further comprises automatically provisioning additional database components hosted on cloud resources responsive to optimization information. According to one embodiment, the method further comprises provisioning, by the automation component, a new secondary node in the at least one replica set and triggering an initial synchronization with at least one of the at least two secondary nodes to provide a copy of the primary node's database, updating configuration information for the at least one replica set, and triggering replication of logged operations on the primary node to the new secondary node responsive to the updated configuration information.

According to one embodiment, the method further comprises generating, by the snapshot component, a plurality of snapshots of data stored in the at least one replica set, and identifying, by the snapshot component, a committed snapshot from the plurality of snapshots that is representative of data that has been replicated on a majority of members of the at least one replica set, and controlling read operations to access the committed snapshot responsive specification of a read commit option in a client request and generating the result of data matching the read request using the committed snapshot. According to one embodiment, the method further comprises identifying, by the snapshot component, a new committed snapshot responsive to receipt of at least one confirmation from the at least two secondary nodes.

According to one embodiment, the method further comprises identifying a data storage node from the at least one replica set having data consistent with the committed snapshot and execute a read commit operations from the identified data storage node. According to one embodiment, the method further comprises: communicating, via a normal database operation, heartbeat information as metadata within a write operation function, and recovering, automatically, a primary node in the distributed database system in response to a detected failure of the primary node by an absence of the heartbeat information.

A cloud distributed database is provided. The database comprises at least one cloud based resource, the at least one cloud based resource including processor and memory, a database subsystem executing on the at least one cloud based resource, wherein the database subsystem comprises at least one replica set comprising a primary node hosting a primary database instance that accepts database write operations from client systems, and at least two secondary nodes that host copies of the primary database instance that replicate logged operations from the primary node, a proxy layer configured to control authentication of client systems based on connection strings communicated from the client systems connecting to the at least one cloud resources, assign a portion of the at least one cloud based resource and operating capability of the database subsystem to respective clients, manage access to the database application for respective clients based on the client connection strings to enable transparent execution of write and read commands against the database subsystem and respective portions of the database hosted by the replica set, and communicate a result to the client system from the portion of database associated with the client system responsive to client communicated operations, and a monitoring component, executing within the proxy layer, configured to monitor usage metrics for cloud resource utilization and database operation, wherein the proxy layer is further configured to limit resource utilization by any client to pre-defined thresholds for processor, bandwidth, memory, and storage based on usage metrics from the monitoring component.

According to one embodiment, the database subsystem executes a multi-tenant database instance hosted on the at least one replica set. The system of claim 2, wherein the proxy layer manages secure portions of the multi-tenant database instance for each of the portion of the at least one cloud based resource and the operating capability of the database subsystem assigned to respective clients. According to one embodiment, the monitoring component further comprises at least one monitor agent executed on instantiated cloud resources configured to collect the performance metrics for cloud resource utilization.

According to one embodiment, the monitoring component further comprising at least one monitor agent executing on database application components configured to collect performance metrics for database operation. According to one embodiment, the database subsystem is further configured to automatically provision additional cloud resources to support the at least one replica set; and maintain minimum threshold of resource for respective clients. According to one embodiment, the proxy layer is further configured to connect a respective portion of the database subsystem associated a client with an independent complete database instance associated with the client. According to one embodiment, the database subsystem is configured display a management interface configured to manage connected multi-tenant and non-multi-tenant database instances of the client.

According to one embodiment, the system further comprises a snapshot component, executed on the at least one cloud resource, configured to: generate a plurality of snapshots of data stored in the at least one replica set, and identify a committed snapshot from the plurality of snapshots that is representative of data that has been replicated on a majority of members of the at least one replica set, and a command processing component configured to read the committed snapshot responsive specification of a read commit option in a client request and generate the result of data matching the read request using the committed snapshot.

According to one embodiment, the database subsystem is further configured to disable memory or processor intensive database operations. According to one embodiment, the at least one replica set is configured to: communicate, via a normal database operation, heartbeat information as metadata within a write operation function, and automatically recover a primary node in the distributed database system in response to a detected failure of the primary node by an absence of the heartbeat information.

According to one aspect, a computer implemented method for managing a cloud distributed database is provided. The method comprises: executing a database subsystem on at least one cloud based resource having memory and processor, wherein the database subsystem comprises at least one replica set including a primary node hosting a primary database instance, and at least two secondary nodes that host copies of the primary database instance, executing, by the database subsystem, write operations at the primary database instance and replicating the write operations to the at least two secondary nodes, controlling, by a proxy layer executing on the at least one cloud resource, authentication, of client systems based on connection strings communicated from the client systems connecting to the at least one cloud resources, assigning, by the proxy layer, assign a portion of the at least one cloud based resource and operating capability of the database subsystem to respective clients, managing, by the proxy layer, access to the database application for respective clients based on the client connection strings to enable transparent execution of write and read commands against the database subsystem and respective portions of the database hosted by the replica set, and communicating, by the proxy layer, a result to the client system from the portion of database associated with the client system responsive to client communicated operations, and monitoring, by a monitor component executed on the at least one cloud resource, usage metrics for cloud resource utilization and database operation, and limiting, by the proxy layer, resource utilization by any client to pre-defined thresholds for processor, bandwidth, memory, and storage based on usage metrics obtained from the monitoring component.

According to one embodiment, the method further comprises executing, on the database subsystem, a multi-tenant database instance hosted on the at least one replica set. According to one embodiment, the method further comprises managing, by the proxy layer, secure portions of the multi-tenant database instance for each portion of the at least one cloud based resource and the operating capability of the database subsystem assigned to respective clients. According to one embodiment, the method further comprises collecting, by the monitoring component, the performance metrics for cloud resource utilization. According to one embodiment, method further comprises executing at least one monitor agent executing on respective database application components; and collecting the performance metrics for database operation with respective at least one monitor agent.

According to one embodiment, the method further comprises: provisioning, automatically, additional cloud resources to support the at least one replica set, and maintaining a minimum threshold of resource for respective clients. According to one embodiment, the method further comprises connecting, by the proxy layer, a respective portion of the database subsystem associated a client with an independent database (e.g., non-multitenant database) instance associated with the client. According to one embodiment, the method further comprises displaying, a management interface configured to manage connected multi-tenant and non-multi-tenant database instances of the client. According to one embodiment, the method further comprises disabling memory or processor intensive database operations.

According to one embodiment, the method further comprises: generating, by a snapshot component executed on the at least one cloud resource, a plurality of snapshots of data stored in the at least one replica set, identify, by the snapshot component, a committed snapshot from the plurality of snapshots that is representative of data that has been replicated on a majority of members of the at least one replica set, and reading, data from the committed snapshot responsive to specification of a read commit option in a client request and generating the result of data matching the read request using the committed snapshot.

According to one embodiment, the method further comprises: communicating, via a normal database operation, heartbeat information as metadata within a write operation function, and automatically recovering a primary node in the distributed database system in response to a detected failure of the primary node by an absence of the heartbeat information.

A cloud distributed database, the database comprising: at least one processor operative connected to a memory, a provisioning component, executed by the at least one processor, configured to accept user specification of configuration information for a distributed database, configured to: provision cloud based resources, having processor and memory, for a user, install and configure a database subsystem on the cloud based resources, wherein the database subsystem comprises: at least one replica set comprising a primary node hosting a primary database instance that accepts database write operations from client systems, and at least two secondary nodes that host copies of the primary database instance that replicate logged operations from the primary node, a proxy layer configured to control authentication of client systems based on connection strings communicated from the client systems connecting to the at least one cloud resources; assign a portion of the at least one cloud based resource and operating capability of the database subsystem to respective clients; manage access to the database application for respective clients based on the client connection strings to enable transparent execution of write and read commands against the database subsystem and respective portions of the database hosted by the replica set, and communicate a result to the client system from the portion of database associated with the client system responsive to client communicated operations, and a monitoring component, executing within the proxy layer, configured to monitor usage metrics for cloud resource utilization and database operation, wherein the proxy layer is further configured to limit resource utilization by any client to predefined thresholds for processor, bandwidth, memory, and storage based on usage metrics from the monitoring component.

According to one embodiment, the database subsystem executes a multi-tenant database instance hosted on the at least one replica set. According to one embodiment, the proxy layer manages secure portions of the multi-tenant database instance for each portion of the at least one cloud based resource and the operating capability of the database subsystem assigned to respective clients. According to one embodiment, the monitoring component further comprises at least one monitor agent executed on instantiated cloud resources configured to collect the performance metrics for cloud resource utilization.

According to one embodiment, the monitoring component further comprising at least one monitor agent executing on database application components configured to collect performance metrics for database operation. According to one embodiment, the database subsystem is further configured to automatically provision additional cloud resources to support the at least one replica set; and maintain minimum threshold of resource for respective clients. According to one embodiment, the proxy layer is further configured to connect a respective portion of the database subsystem associated a client with an independent complete database instance associated with the client. According to one embodiment, the database subsystem is configured display a management interface configured to manage connected multi-tenant and non-multi-tenant database instances of the client. According to one embodiment, the system further comprises, a snapshot component, executed on the at least one cloud resource, configured to: generate a plurality of snapshots of data stored in the at least one replica set, and identify a committed snapshot from the plurality of snapshots that is representative of data that has been replicated on a majority of members of the at least one replica set, and a command processing component configured to read the committed snapshot responsive specification of a read commit option in a client request and generate the result of data matching the read request using the committed snapshot.

According to one embodiment, the database subsystem is further configured to disable memory or processor intensive database operations. According to one embodiment, the at least one replica set is configured to: communicate, via a normal database operation, heartbeat information as metadata within a write operation function; and automatically recover a primary node in the distributed database system in response to a detected failure of the primary node by an absence of the heartbeat information.

According to one aspect, a computer implemented method for managing a cloud distributed database is provided. The method comprises: accepting, by a provisioning component executed by at least one processor, user specification of configuration information for a distributed database, provisioning, by the provisioning component, cloud based resources, having processor and memory, for a user, installing and configuring, by the provisioning component, a database subsystem on the cloud based resources, wherein the database subsystem comprises at least one replica set including a primary node hosting a primary database instance, and at least two secondary nodes that host copies of the primary database instance, executing, by the database subsystem, write operations at the primary database instance and replicating the write operations to the at least two secondary nodes, controlling, by a proxy layer executing on the at least one cloud resource, authentication, of client systems based on connection strings communicated from the client systems connecting to the replica set, assigning, by the proxy layer, a portion of the at least one cloud based resource and the at least one replica set to respective clients, managing, by the proxy layer, access to the database application for respective clients based on the client connection strings to enable transparent execution of write and read commands against the database subsystem and respective portions of the database hosted by the replica set, and communicating, by the proxy layer, a result to the client system from the portion of database associated with the client system responsive to client communicated operations, and limiting, by the proxy layer, resource utilization by any client to pre-defined thresholds for processor, bandwidth, memory, and storage based on usage metrics obtained from the monitoring component.

According to one embodiment, the method further comprises: monitoring, by a monitor component executed on the at least one cloud resource, usage metrics for cloud resource utilization and database operation, and communicating the usage metrics to the proxy layer. According to one embodiment, the method further comprises executing, on the database subsystem, a multi-tenant database instance hosted on the at least one replica set. According to one embodiment, the method further comprises managing, by the proxy layer, secure portions of the multi-tenant database instance for each portion of the at least one cloud based resource and the operating capability of the database subsystem assigned to respective clients.

According to one embodiment, the method further comprises collecting, by the monitoring component, the performance metrics for cloud resource utilization. According to one embodiment, the method further comprises executing at least one monitor agent executing on respective database application components; and collecting the performance metrics for database operation with respective at least one monitor agent. According to one embodiment, the method further comprises: provisioning, automatically, additional cloud resources to support the at least one replica set, and maintaining a minimum threshold of resource for respective clients.

According to one embodiment, the method further comprises connecting, by the proxy layer, a respective portion of the database subsystem associated a client with an independent database (e.g., non-multitenant database) instance associated with the client. According to one embodiment, the method further comprises displaying, a management interface configured to manage connected multi-tenant and non-multi-tenant database instances of the client. According to one embodiment, the method further comprises disabling memory or processor intensive database operations.

According to one embodiment, the method further comprises: generating, by a snapshot component executed on the at least one cloud resource, a plurality of snapshots of data stored in the at least one replica set, identify, by the snapshot component, a committed snapshot from the plurality of snapshots that is representative of data that has been replicated on a majority of members of the at least one replica set, and reading, data from the committed snapshot responsive to specification of a read commit option in a client request and generating the result of data matching the read request using the committed snapshot. According to one embodiment, the method further comprises: communicating, via a normal database operation, heartbeat information as metadata within a write operation function, and automatically recovering a primary node in the distributed database system in response to a detected failure of the primary node by an absence of the heartbeat information.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 9 is a table showing the relationship between the snapshot view and the operation log view of data, according to some embodiments;

DETAILED DESCRIPTION

Figure 1:
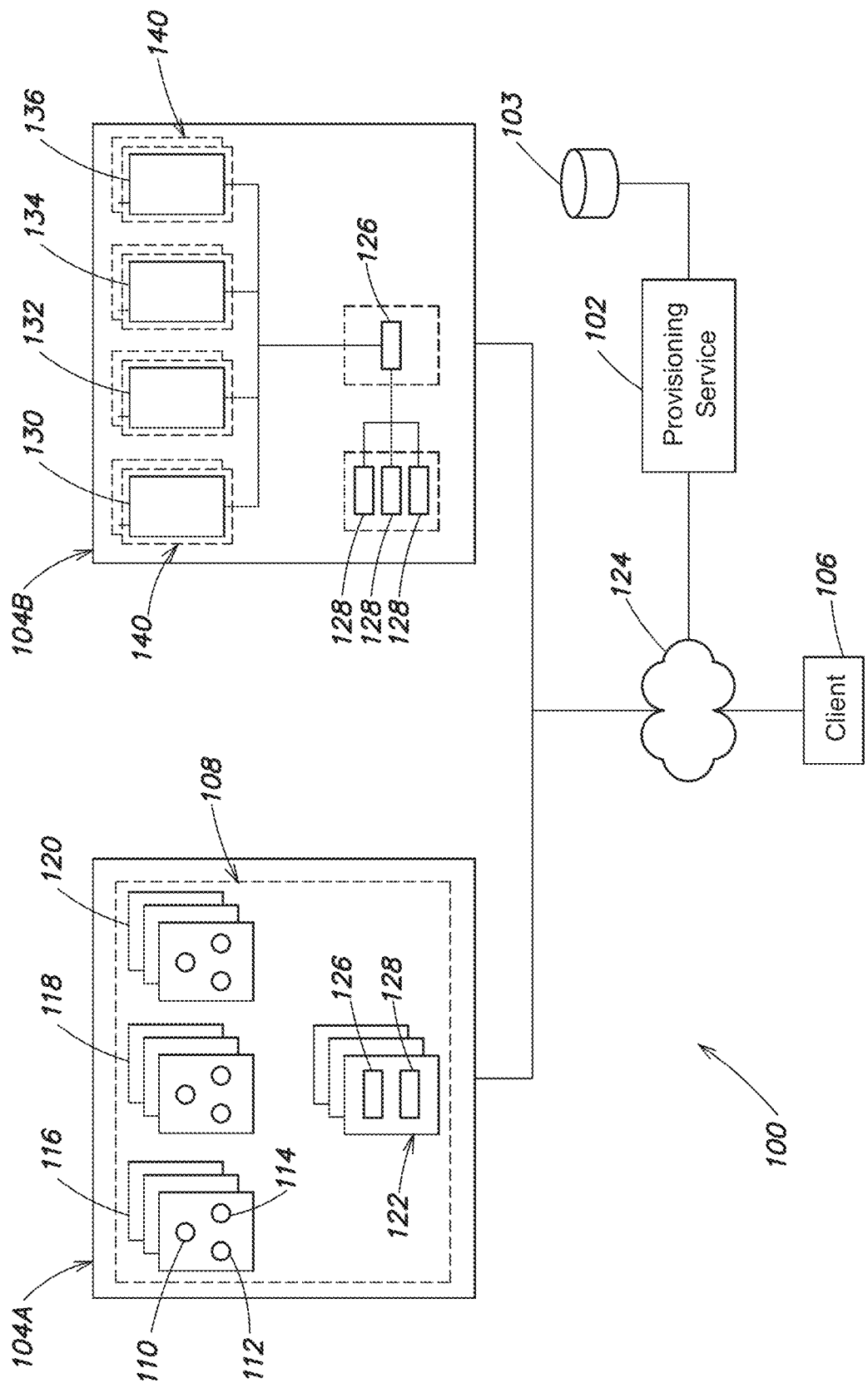
FIG. 1 is a block diagram of an example distributed database system.

According to some embodiments, the system is configured to manage the design and creation of a distributed database in the cloud with minimal user input. Replication settings for database data can be pre-configured (e.g., based on a replica set architecture), cloud resources started in response to user request (e.g., AWS or any other cloud), and automation agents can also be integrated with any database server/resource requested. In one example, an end user can access a provisioning interface provided through a user accessible website. The provisioning interface can be configured to present minimal selections required to create, design, and start a fully functional distributed database in the cloud.

Improving over know approaches, security and secure architectures can be pre-defined to limit security exposure. According to another embodiment, default security selections trigger the system to provision a virtual private cloud (VPC) architecture, that automatically implements replication mechanics (e.g., replica sets as discussed in greater detail below) within the VPC, manages server provisioning, and for new clients/users, the VPC instantiation provides a respective special subnet—where all servers in the subnet can reach each other, as preconfigured by the system from within the architecture executing on the cloud resources. According to one embodiment, the VPC instantiation provides a highly secure implementation, where by default no outside communication can reach in unless an administrative user opens up network pathway to an external resource. In some examples, encryption (e.g., SSL) over the wire is enabled by default (e.g., as a configuration of a pre-designed database), database user name and password are required for connections (e.g., as a configuration of a pre-designed database), and optional file system encryption is selectable by administrative users (e.g., by default encryption at rest can be enabled, with the option of an administrator to disable in the UI).

Various embodiments, implement automated cloud instantiation services and provide for additional functionality. For example, the system enables user interface specification of all configurations (some set by default with options to override template selections via user selection in the UI). The system includes a number of application programming interfaces configured to connect with various cloud service providers, define database configurations, provision cloud resources to support the database configurations, establish default security configurations (e.g., VPC, encryption of data transmitted over the wire, etc.), capture database applications or settings from existing systems, and identify and execute updates and/or specific versions (e.g., associated with MONGODB binaries), among other options.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is a block diagram 100 of a provisioning service 102 and cloud provider 104A. A client or end user 106 can access the provisioning service 102 to begin creation of a distributed database through network 124. According to one embodiment, the provisioning service is configured to manage implementation of a distributed database 108 by the provisioning service 102 on an available cloud provider 104A or 104B (e.g., AWS of AMAZON, AZURE Cloud, GOOGLE Cloud, etc.).

According to one aspect, the cloud based system (e.g., 100) can provide a number of user interfaces or web based platforms on which to access the system. User can access platform and/or interfaces and define database configurations desired (e.g., size of node, storage, number of replicas, shard (y/n)), for example through the provisioning service (e.g., 102) and associated web site. Once configurations are specified or a templated database has been selected, the system may require that a user enter a credit card (e.g., pay as the user go model) and build their new database instantiation. Some embodiments enable creation, access, and use of a cloud database without payment. For example, a free tier database service can be provided with some constraints on resource and in further examples, with constraints on processing.

Various embodiments are configured for high security in the cloud space (e.g., encryption over the wire (no plaintext), in provisioning and configuration—secure ports or IP addresses are opened to enable other servers to communicate in a VPC, and in one example, only whitelist servers are permitted to communicate on the VPC (e.g., the system provisions a set of servers and automatically adds the provisioned servers to the whitelist). Various APIs and/or embodiments are specially configured to tie into cloud manager and automation operations (e.g., of MONGODB). Various embodiments include continuous resource monitoring for each provisioned database instance. Shown in FIG. 1 at 108 is a distributed database 108 instantiated on cloud resource (e.g., 116-122). The overlapping blocks at on the cloud provider 104A shown that any number of cloud compute resources can be assigned, or used to execute the respective nodes, or alternatively one resource per node can be used, etc. The distributed database 108 is supported by a replica set model with a replication factor of 3. Co-pending U.S. patent application Ser. No. 15/074,987, entitled, METHOD AND APPARATUS FOR MAINTAINING REPLICA SETS, filed on Mar. 18, 2016 describes example of replica set and replica set models and is incorporated herein by reference in its entirety.

The replication factor specifies how many database nodes are present to replicate data managed by those nodes (e.g., 110-114). The nodes hosting database data can be assigned primary or secondary roles, where typically, primary nodes are responsible for write operations and secondary nodes replicate the write operations from the primary nodes to their respective databases. To improve scalability secondary nodes can response to read request, based on configuration settings.

The database may include one or more router servers (e.g., 126) configured to direct queries, writes, reads, etc. to the appropriate node hosting the database data (e.g., 110). The distributed database can also include one or more configuration servers (e.g., 128) configured to host metadata associated with operation of the database (e.g., key ranges for databases and/or nodes, replication information, sharding information (discussed in greater detail below), etc.).

The configuration of the database can be defined by selection in the user interface during interaction with the provisioning service 102. In some embodiments, the provisioning service can be configured to host the binaries (e.g., on database 103) associated with the database selections (e.g., MONGODB version 3.4 or 3.2), and can also include any extensions (e.g., MONGODB COMPASS, monitoring, automation, etc.). In other examples, the provisioning service 102 can also employ cloud based resources to host binaries for the database (e.g. on 304A), extensions, and/or optional applications that can be provided as part of provisioning a distributed database.

According to some embodiments, the distributed database instantiate in the cloud can include a shared architecture. Examples of shared architectures and implementation are described in U.S. patent application Ser. No. 13/078,104, entitled "SYSTEM AND METHOD FOR OPTIMIZING DATA MIGRATION IN A PARTITIONED DATABASE," filed on Apr. 1, 2011, incorporated by reference herein in its entirety. Shown in FIG. 1 within cloud provider 104B, is a sharded architecture, wherein database shards refer to partitions of database data managed by respective shard servers (e.g., 130-136). Router servers (e.g., 126) are configured to handle database operations (e.g., queries, reads, writes, etc.) and direct the operations to needed shards to obtain the proper result. The router 126 captures metadata on the shard from configuration servers (e.g., 128) to managed the requested database operations. Shown in dashed outline boxes (e.g., 140) within 104B are the cloud compute resources that support the respective elements of the sharded database. Various embodiments are configured to instantiate replica set supported databases as well as shared implementations (e.g., where each shard is supported by at least one replica set).

Figure 2:
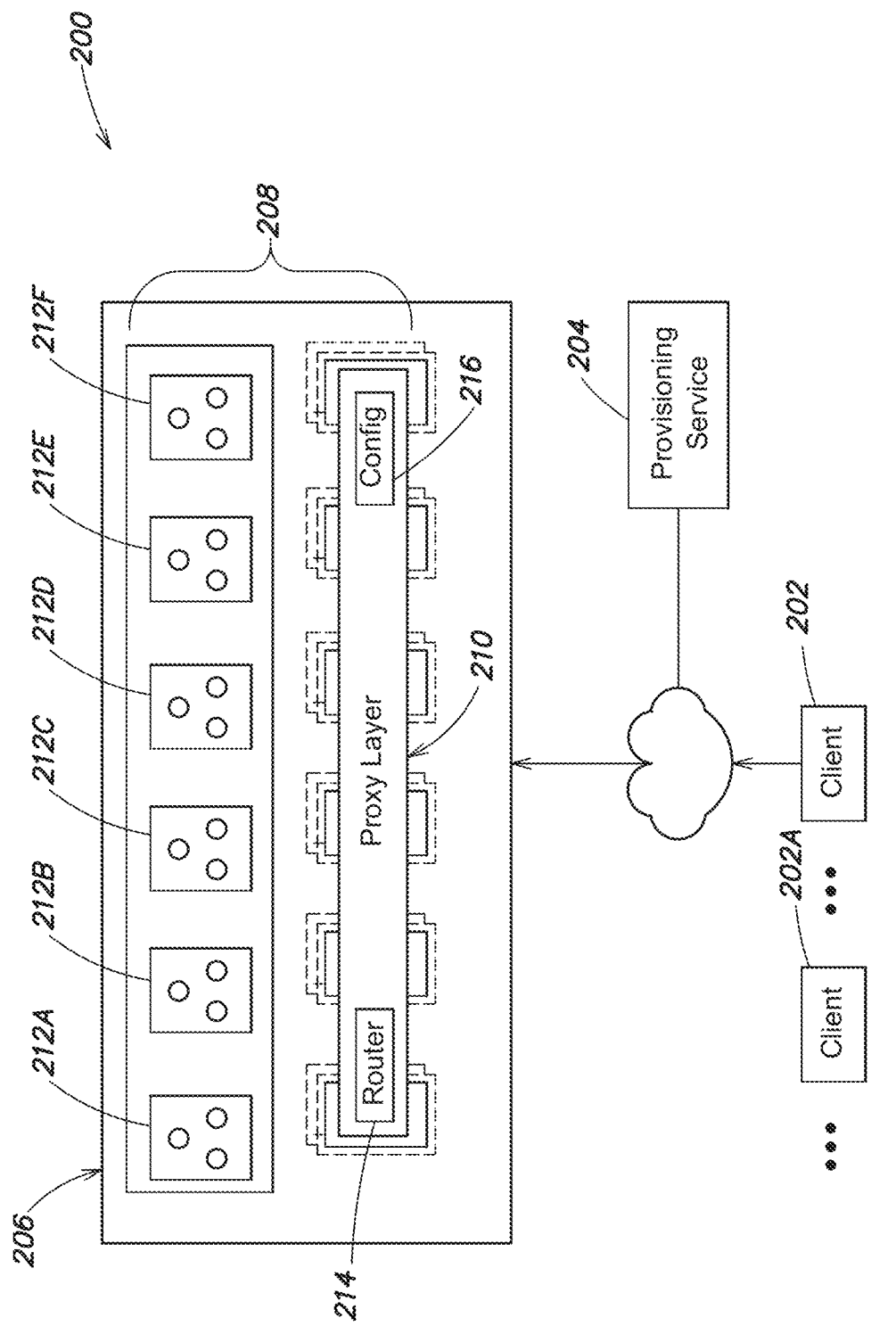
FIG. 2 is a block diagram of an example distributed database system.

Shown in FIG. 2 is a block diagram of a database as a service system 200. As shown, a client 202 can access a provisioning service 204. Provisioning service 204 can be configured to generate a free instantiation of a distributed database 208 on one or more cloud providers (e.g., 206). The free database model is configured as a multi-tenant solution that is managed by a proxy layer 210. The proxy layer manages a large distributed database instantiation, and allocates a virtual three node replica set (e.g., 212A-E) responsive to client requests (e.g., 202, 202A, where the three nodes indicate additional clients). The proxy layer can be executed on the cloud provider (e.g., 206) resources, and configured to provide the virtual replica set and operations to the client transparently. For example, the clients connect to their respective replica set also referred to as a database cluster, without any indication that their cluster is part of a larger database. The proxy layer is configured to authenticate connections to each client cluster, preserve security between the clusters, enforce security (e.g., encryption) within respective clusters, and manage database operations (e.g., reads, writes, or other operation) for each cluster. According to some embodiments, the proxy layer is configured with multiple DNS records to handle each customer instance. In some examples, each customer or client can be assigned three sets of DNS records to manage communication at the proxy layer and ensure client access is limited to their respective data and virtualized database instance. The DNS connection records can be associated to each replication instance supporting their free tier database (e.g., primary and two secondary node architecture).

According to one embodiment, end users are provide a transparent experience in accessing an using the database through the proxy layer. For example, an end user establishes a connection to their data using a connection string and a respective database credential. The proxy layer is configured to manage the respective connections and limit any access based on a valid connection string and authentication credential. In further embodiments, the proxy layer uniquely identifies a user and connections to a portion of the multi-tenant database with the respective connection strings and credentials. Based on usage of resource, the proxy layer can limit further consumption by respective users (e.g., throttle connections, limit processor usage, etc.).

Conceptually, the proxy layer 210 manages each client cluster similar to a sharded database, where each client cluster can be executed similar to shard, as discussed in U.S. patent application Ser. No. 13/078,104. According to some embodiments, the proxy layer 210 can include a router component 214 to handle identification and routing of requested to respective client clusters. According to one embodiment, the router component 214 is configured to communicate with a configuration component 210 to obtain identifying information and/or configuration metadata on the respective clusters. The router component 214 can be configured to accept client requests and direct respective database operations to the appropriate database cluster.

In one example, cluster names and/or group names can be used to identify respective client clusters. In other examples, the client clusters are set up with client identifiers and passwords to identify a respective cluster. The proxy layer 210 can be configured to manage the connections and authentication to respective clusters, with or without separate router and configuration components. The proxy layer can operate as a mediation layer to ensure transparency to the clients or end users. For example, the client or end user interacts with their cluster as if their cluster was a separate instantiation of a replica set.

According to some embodiments of the system, the free tier is configured with limitations on execution. For example, MONGODB database applications enable execution of aggregation pipelines. Execution of aggregation pipelines can provide similar functionality to map-reduce operations without the same level of complexity (e.g., in syntax or computation). Various examples of aggregation pipelines and aggregation operations/execution are discussed in co-pending U.S. patent application Ser. Nos. 15/604,879, 15/605,143, and 15/042,297, which applications are herein incorporated by reference in their entirety.

According to one embodiment, computationally burdensome operations are disabled on the free tier to limit resource consumption. For example, in MONGODB database instances, aggregation pipelines are disabled in the free tier, even though the underlying database applications provide for aggregation pipeline execution. In some examples, the functionality is disabled at the database application level. In other examples, the proxy layer can prohibit operations that would request disabled operations. In one instance, the system notifies the client or user of the prohibited functionality. In other database instances, map-reduce execution can be disabled. Various operations can be disabled if the processor burden is too great. For example, monitoring services can detect operations that consume too much of shared resources in the free tier. In one example, is an operation saturates processor capacity, the operation is flagged to disable or in other alternatives, the system can actively manage the operation to limit execution time, processor consumption, memory consumption, etc.

Multi-Tenancy Embodiments

According to some embodiments, a restricted use service can provide a multi-tenant solution configured with metered resource usage per client cluster. According to various embodiments, a proxy layer is configured to simulate a single user environment while hosting a plurality of clients on a multi-tenant solution.

According to one embodiment, the multi-tenant solutions provides a default configuration for the cloud database (e.g., a 3-node replica set) and provides each client a cluster made of a replica set. The client's cluster is configured with healing (e.g., data restore, point in time data restore, scaling (e.g., increase nodes in replica set, increase metered usage of cloud resource, migrate to true single user environment, etc.), and monitoring (e.g., performance evaluation, optimization evaluation, index recommendations, etc.). Further embodiments are configured to limit use of the multi-tenant offering. For example, the system is configured limit users to a single free cluster can be created per named group. In some examples, unlike conventions database as a service instantiations, the multi-tenant solution is specially configured for minimal user input for creation and does not require payment to define.

According to other embodiments, the multi-tenant or free clusters are configured to interoperate with single user clusters or pay service clusters. In one example, free clusters can created in conjunction with paid clusters and be in the same named group. The system is configured to allow users to terminate free clusters and clean the respective data with a period of time (e.g., 24 hours). In some examples, this enables clients to generate free clusters within a paid cluster group, for example, to test configurations or to manage data migration, among other options.

In various embodiment, the system is configured to provision a multi-tenant cluster based on default selections for a client in less than one minute 99% of the time. Once complete, each free cluster will appear to customer as if they have their own single user instance of the database, even though the instance is hosted as part of a multi-tenant architecture. The proxy layer, which can include a proxy server, is configured to execute a layer of indirection, for example, by executing routing functions to routing client requests to an appropriate cluster, and/or and by rewriting client incoming traffic to target respective clusters and rewriting outbound client traffic to provide consistent response. Various embodiments, and further configured to enable IP whitelists and management of users the same as paid cluster database. Further the proxy layer and the multi-tenant database are configured to sandbox the free clusters such that no client can access data of another free cluster unless permissions are explicitly granted. In further examples, the proxy layer can be configured with firewall functionality and mitigation any DOS attacks or other unauthorized access.

According to some embodiments, monitoring processes on the free clusters can be configured to report usage data to an administration system. The administration system can automatically throttle free clusters that exceed usage targets and manage allocation of resources between free cluster clients. In one embodiment, an administration UI is accessible through the administration system (e.g., executed on a cloud resource), that enables free tier administrators to manage system usage, balancing, etc. The UI can display current capacity levels, hardware metrics, and important optimization metrics across the fleet of clusters. Further, the UI is configured to display information on the top X users, in terms of operations counters, disk space, connections, bandwidth, etc. In some embodiments, the monitoring services are also executed at the proxy layer (e.g., on the proxy server) to capture complete end to end metrics for each user/cluster.

In some embodiments, the proxy layer monitoring services are configured to alert the free tier administrator based on failure of the proxy daemon on any free cluster, or if the proxy daemon is not running, the system is low on free tier capacity, resource (e.g., hardware) on an existing proxy is maxed out due to abuse or oversubscription, etc. The proxy layer can be configured to provision more cloud compute resource automatically. For example, in response to a low on free capacity alert, the system can be configured to provision additional resource. In some examples, the automatic provisioning can be limited to a percentage of existing capacity, or based on an additional cost metric.

Similar to paid tier clusters, free tier clusters can include automatic backup functionality. For example, snapshots of data on the cluster can be captured, and made available for restoration. In further examples, implementation of multiple storage engines enable queryable backup functionality, wherein snapshots can be directly queried and only the results of the query are used to restore data.

Co-pending U.S. patent application Ser. No. 15/627,502, entitled "METHOD AND APPARATUS FOR RESTORING DATA FROM SNAPSHOTS," filed on Jun. 20, 2017 describes examples of queryable backup solutions that can be incorporate in distributed databases hosted in the cloud, the specification of which is incorporated herein by reference in its entirety.

According to some aspects, the database a service model is configured to provide the full functionality of the underlying database model. In some embodiments, the distributed database can be architected with dynamic schemas, healing functionality, automatic replication, scaling, security, among other options. For example, various implementations are configured with default selection to enable the full suite of functionality provided by the MONGODB database offering. For example, the underlying database architecture and/ or applications, application programming interfaces (APIs), storage engines, encryption engines, daemons can be executed on cloud resources and configured to operate a provisionable service, rather than require users to architect and configured their own database.

Read/Write Committed Execution

According to one aspect, the cloud instantiated distributed database can be configured to read and write committed data in a database or data cluster. In some embodiments, the database may follow an eventual consistency model and committed data may be data that has been replicated by more than a predetermined number of secondary nodes (e.g., half the secondary nodes) in the database. In these embodiments, data may be replicated from a primary node in the database to secondary nodes in the database over time, and the database may contain many groups of primary and secondary nodes. Thereby, one or more of the secondary nodes may have data that is not completely up-to-date relative to a respective primary node. Further, a client sending a read request to the database may receive data from a secondary node that is not completely up-to-date. The distributed database, according to some embodiments, is configured to enable clients to read only committed from the database. "Read commit" may refer to the command to read committed data from the database.

For example, users may provide command line or execution instructions to read only committed data when interacting with their respective cloud provisioned distributed database. Thereby, the distributed database provides the client a view of the data that is being provided by a majority of the secondary nodes in response to read requests that require reads on committed data. Further, the system implementing the distributed database may provide clients an ability to write data to the database and receive a confirmation once the data is replicated on a sufficient number of nodes in the database so as to be committed. "Write commit" may refer to such a command.

In some embodiments, the system may monitor the latest data that has been committed to the database through the generation and management of snapshots. Snapshots may be captured periodically (or aperiodically) and be representative of the state of the data in the database at a particular point in time. The system may identify a committed snapshot that is representative of committed data (e.g., replicated by a threshold number of nodes (e.g., majority of nodes)). These snapshots may advantageously simplify processing of read commit and/or write commit commands. For example, read commit commands may be processed by simply reading from the committed snapshot. Similarly, write commit commands may be performed by determining whether the operation(s) included in the write commit command is included in the committed snapshot and returning a confirmation one the operation(s) are included in the committed snapshot.

Example Database Commit Engine

Figure 3:
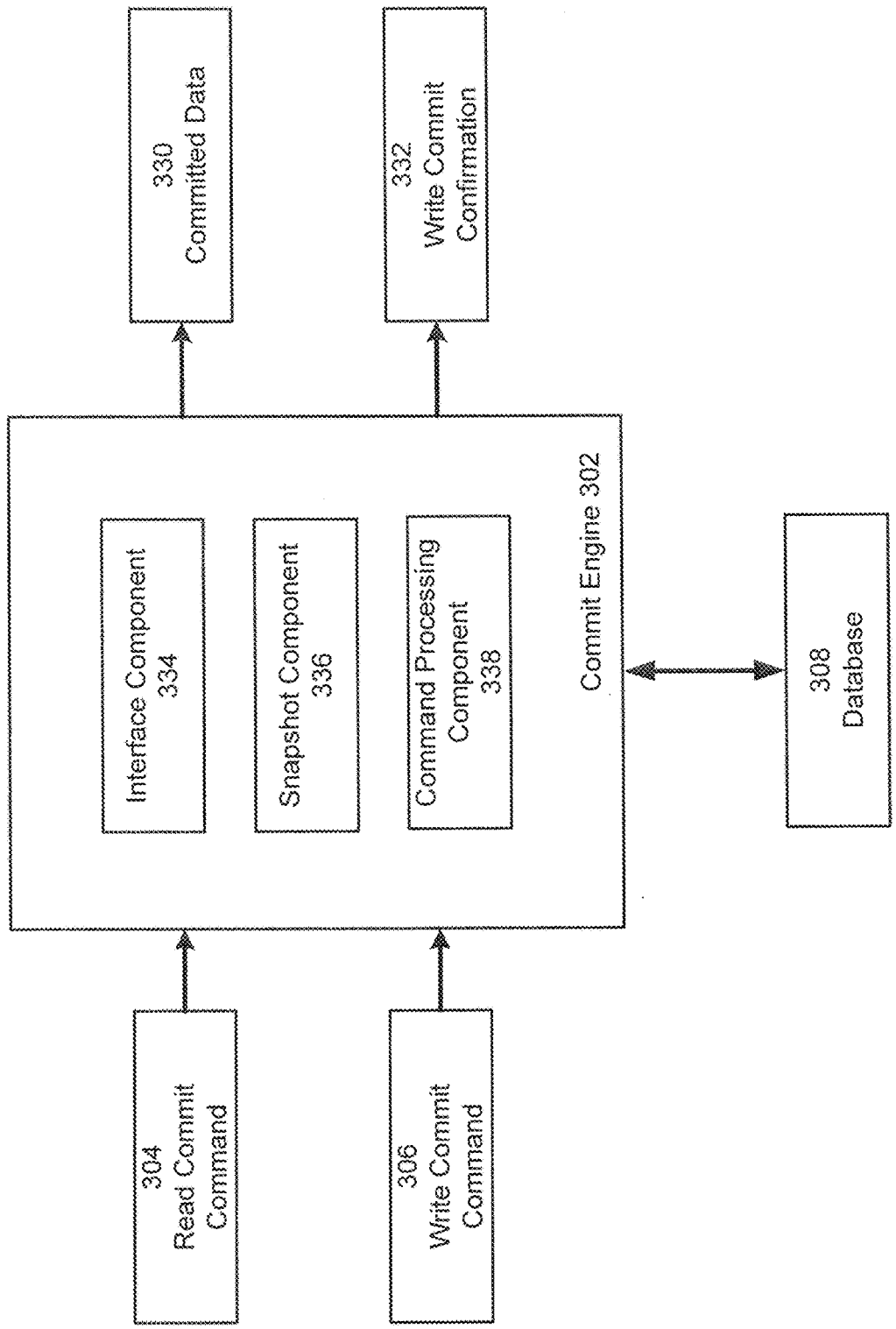
FIG. 3 illustrates a block diagram of an example commit engine configured to process read and write commit commands, according to some embodiments.

FIG. 3 shows an example commit engine 302 according to some embodiments. The commit engine 302 may be designed to process various received commands on a database 308. In some embodiments, the database 308 may include a plurality of nodes and replicate data from primary node to one or more secondary nodes—for example depending on the replication factor specified when provisioning the database. The primary and respective secondary nodes are configured to host at least a portion of the database data, and other replica sets (e.g., primary and respective secondary nodes) can host other portions. In these embodiments, the primary node may handle commands that change the data stored in the database and the secondary nodes may replicate the data in the primary node over time and process read requests. Thereby, the secondary nodes may have data that is not completely up-to-date relative to the primary nodes. Committed data may include data that has been replicated to at least a predetermined number of secondary nodes in the database (e.g., at least half of the secondary nodes).

In some embodiments, the commit engine 302 receives and processes read commit commands 304 and/or write commit commands 306. The commit engine 302 may process a read commit command 304 by identifying committed data in the database 308, processing a read request on the identified committed data, and providing the results as committed data 310. The commit engine 302 may process a write commit command 306 by writing data to the database 308 and providing a write commit confirmation 312 once the changes in the write to the database 308 have been committed.

As shown in FIG. 3, the commit engine 302 includes an interface component 314. The interface component 314 may be configured to receive and provide data to various system components, such as the database 308. In some embodiments, the interface component 314 receives the read commit command 304 and provides the committed data 310 once the read commit command 304 has been processed by the commit engine 302. The interface component 314 may also receive the write commit command 306 and provide the write commit confirmation 312 once the write commit command 306 has been processed by the commit engine 302.

The commit engine 302 may include a snapshot component 316 to generate snapshots of data in the database 308. The snapshots are illustrative of the data in the database 308 at a particular point in time (e.g., a unique point in time) on a logical clock. For example, the snapshot component 316 may generate a snapshot of the database 308 every 30 milliseconds (ms) and each snapshot may be representative of the data in the database 308 at the time the snapshot was taken. For example, the snapshots may be indicative of the data in a primary node and/or a secondary node or any replica set at a particular point in time. Thereby, the snapshots generated by the snapshot component 316 may provide a different view of the data in the database 308 that illustrates changes over time, and/or from node to node.

It should be appreciated that the snapshots may be captured at unique points in time on both a logical clock and a physical clock in cases where the time difference between the captured snapshots is larger than the resolution of the physical clock. For example, the snapshots may be captured every 10 ms and the resolution of the physical clock may be 1 ms. In this example, each of the snapshots may be generated at both a unique point in time on a logical clock and a unique point in time on the physical clock.

As described above, secondary nodes in the database 308 may include data that is not completely up-to-date relative to the primary node. Thereby, there is generally a delay between changes being made to the primary node and the changes being replicated in a requisite number of secondary nodes so as to be committed to the database 308. In some embodiments, the snapshot component 316 may identify a committed snapshot from the generated snapshots. In one example, the commit engine evaluates changes in state within the snapshots to determine if replication has occurred to a threshold number of nodes, if so the snapshot can be identified or labelled as a committed snapshot. In another example, a snapshot is only updated to include new data once the new data has been committed. Thus, in one implementation committed snapshots are only updated to include committed data.

A committed snapshot may be a latest snapshot of the database 308 that is representative of only committed data. Stated differently, the committed snapshot may be the most recent snapshot that only contains committed data. Further, the snapshot component 316 may update the snapshot that is the committed snapshot as the secondary nodes replicate changes made to the primary node. For example, the latest changes to the primary node that have been committed may be the changes made up to 12:30 pm on May 6, 2016. Subsequently, the secondary nodes may replicate data from the primary node and move the commit forward from 12:30 pm on May 6, 2016 to 2:00 pm on May 6, 2016. The snapshot component 316 may, in response, select a more recent snapshot as the committed snapshot and remove any snapshots that are older than the new committed snapshot. Thereby, the snapshot component 316 updates which snapshot is the committed snapshot in tandem with the secondary nodes in the database 308 replicating the data from the primary node.

The read commit commands 304 may be processed by a command processing component 318 of the commit engine 302. In some embodiments, the command processing component 318 may process read commit commands 304 by reading data from the committed snapshot generated and identified by the snapshot component 316. The particular method employed by the command processing component 318 to read from the committed snapshot may vary depending upon the particular implementation of the snapshot. For example, the snapshot may be a copy of the data and the command processing component 318 may read directly from the snapshot. In other examples, the snapshots may only be representative of operations made on the database to obtain data in the same state as the data in the database 308 at the time of the snapshot. In these examples, the command processing component 318 may identify a secondary node in the database 308 that has data stored in the same state as the committed snapshot and read from that secondary node. In some embodiments, each node may maintain a respective snapshot and reads can be distributed to secondary nodes based on respective snapshot information. It should be appreciated that the command processing component 318 may identify a secondary node in the database 308 that has data that deviates from the committed snapshot so long as the data relevant to the read request (e.g., the portion of the data being read) is in the same state as the committed snapshot. The results from the read performed by the command processing component 318 may be provided as the committed data 310 via the interface component 314.

The write commit commands 306 may also be processed by the command processing component 318. In some embodiments, the command processing component 318 may process the write commit commands 306 by writing the data to the primary node of the database 308 and waiting for a requisite number of secondary nodes (e.g., at least half of the secondary nodes) to have replicated the changes written to the primary node. The command processing component 318 may, in some implementations, expedite the process of replicating the changes by, for example, communicating with the secondary nodes to trigger replication of the changes. Once the changes have been replicated to a sufficient number of secondary nodes, the command processing component 318 may generate the write commit confirmation 312 that may be provided via the interface component 314.

It should be appreciated that, in some embodiments, the commit engine 302 may also be able to process regular read and/or write commands in addition to the read commit command 304 and the write commit command 306. For example, the command processing component 318 may read data from a secondary node in the database 308 and provide the result via the interface component 314 responsive to receipt of a read command. Similarly, the command processing component 318 may write data to a primary node in the database 308 in response to receipt of the write command.

Figure 4:
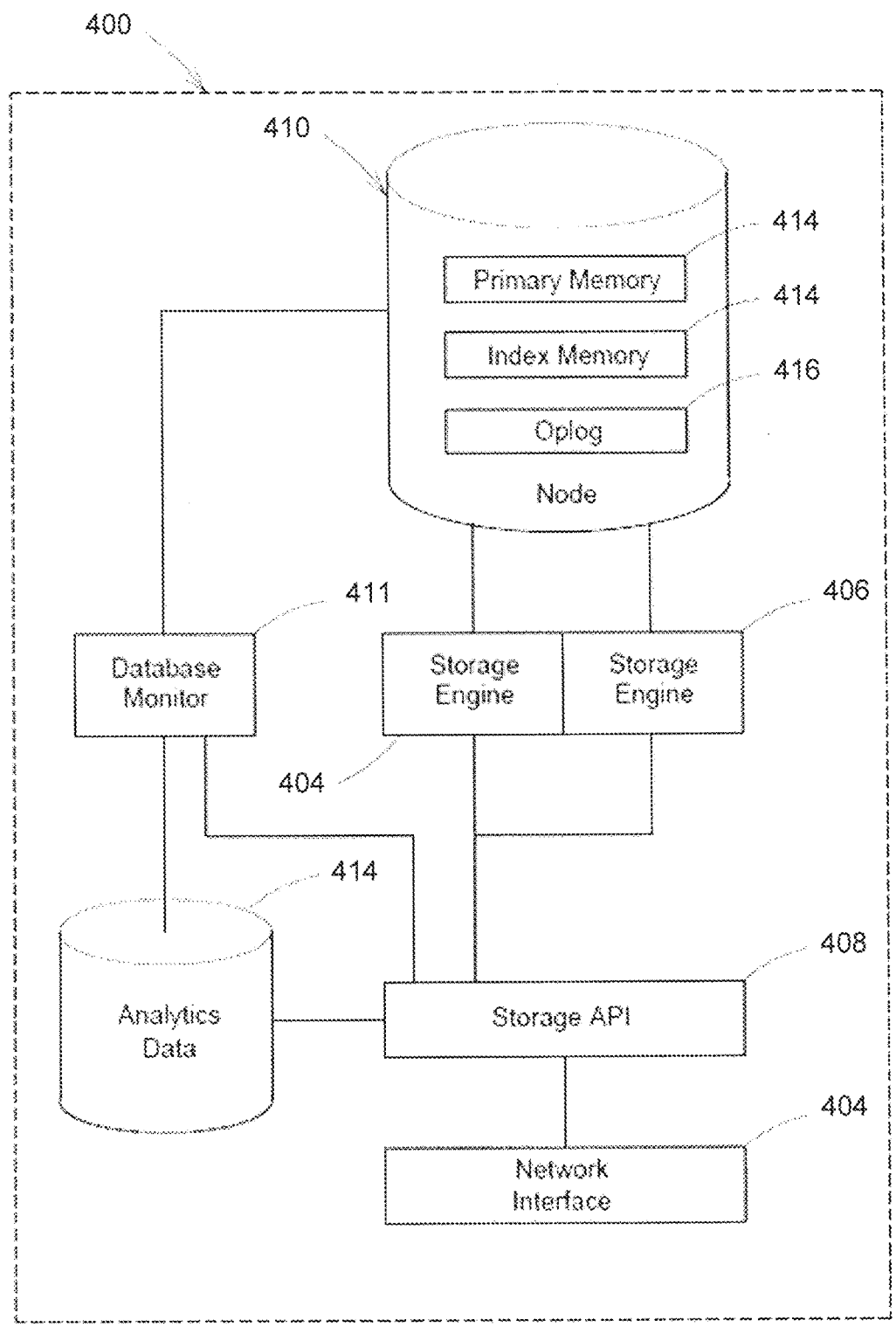
FIG. 4 illustrates a block diagram of another example distributed database system, according to some embodiments.

An example of a database system 400 and respective elements (e.g., 110 of FIG. 1) that can be generated on cloud resources to support the functionality discussed herein as a cloud provide database service, and is shown in FIG. 4. The database system 400 includes an interface 402 for sending and receiving information (including database requests and responses thereto) to router processes, database clients, or other components or entities in the system. In one embodiment, the backend architecture is configured to interact with any data model provided by a managed database. For example, the managed database can include a non-relational or dynamic schema data model. In another embodiment, the data model can be implemented in the form of replica sets as described in U.S. patent application Ser. No. 12/977,563, discussed above. The database system 400 includes a storage application. In one implementation described in greater detail below, a base unit of data is a document.

In some embodiments, a storage application programming interface (API) 408 receives database requests, including requests to perform read and write operations. When a write operation is requested, the storage API 408 in response selectively triggers a first storage engine 404 or a second storage engine 406 configured to store data in a first data format or second data format, respectively, in node 410. As discussed in more detail below, a database monitor 411 may track a number of analytics about the database. In some embodiments, the database monitor 411 is configured to track the operations performed on the data over time, and stores that information as analytics data 413. In some examples, analytic data may be stored in a separate database. In other examples, the analytics data is stored as a named collection (i.e., a logical grouping of data). These analytics may be provided to the storage API 408, which relies on the analytics to selectively actuate an appropriate storage engine. In further embodiments, although multiple storage engines are provided, not all storage engines may operate with snapshots and/or not all storage engines may provide read commit (and/or write commit) functionality. Responsive to a command execution that includes read commit settings, the system may force use of a particular storage engine or alternatively provide error information that the current storage engine does not support the functionality. Thus, the system can be configured to check capability of storage engines to support read commit (and/or write commit) functions and report on the same to end users.

In one example, the database monitor 411 tracks, for example, the relative number of read and write operations performed on a collection within the database. In another example, the database monitor 411 is configured to track any operations (e.g., reads, writes, etc.) performed on any base unit of data (e.g., documents) in the database.

In some embodiments, the storage API 408 uses the tracked data (e.g., analytics data) collected by the database monitor 411 and/or the analytics data 413 to select an optimal storage engine for a database, a collection, or a document having the observed read/write ratio. In one example, the storage API 408 is mapped to the selected storage engine. For example, an identifier of the selected storage engine may be stored in a location in memory or on disk; when a write operation request is received by the storage API 408, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 411 itself is configured to determine an optimal storage engine based on the analytics data 413 and other aspects of the data, for example, stored in the database, database collection, or in a document. This determination may be passed to the storage API 408, or otherwise used to map the storage API 408 to a determined storage engine.

The storage API 408 receives database write requests (e.g., from a database API (not shown)) via a network interface 402, and carries out the requested operations by selectively triggering one of the first storage engine 404 and the second storage engine 406. The first storage engine 404 and the second storage engine 406 are executable software modules configured to store database data in the data node 410 in a particular data format. For example, the first storage engine 404 may be configured to store data in a row-store format, and the second storage engine 406 may be configured to store data in a LSM-tree format. In one example, the first storage engine 404 and/or the second storage engine 406 are configured store primary database data (i.e., the data being stored and queried) in a particular data format in the primary data memory 412, and may store database index data in a particular data format in index data memory 414. In one embodiment, the first storage engine 404 and/or the second storage engine 406 are configured store an operation log (referred to as an "oplog") 416 in a particular data format. As discussed in more detail below, a database monitor 411 may track a number of analytics about the database, and the operations performed on it over time, and stores that information as analytics data 413.

One advantage of using the storage API 408 as an abstraction layer between the database API and the storage engines is that the identity and selection of a particular storage engine can be transparent to the database API and/or a user interacting with the database API. For example, the database API may pass a "write" function call to the storage API 408 instructing the storage API to write a particular set of data to the database. The storage API 408 then determines, according to its own analysis and/or user input, which storage engine should perform the write operation. Different storage engines may be appropriate for different types of data stored in different collections that may undergo a variety of different operations. Thus, the choice and implementation of calls to an appropriate storage engine are made by the API 408, freeing the database API calls to simply request a "write" of certain data. This abstraction level allows for the implementation of the system on large filesystems that may be stored across machines in a database cluster, such as the Hadoop Filesystem offered by the Apache Software Foundation.

Another advantage of using the storage API 408 is the ability to add, remove, or modify storage engines without modifying the requests being passed to the API 408. The storage API 408 is configured to identify the available storage engines and select the appropriate one based on one or more factors discussed below. The database API requesting write operations need not know the particulars of the storage engine selection or operation, meaning that storage engines may be embodied in pluggable modules that may be swapped out or modified. Thus, users are able to leverage the same query language, data model, scaling, security and operational tooling across different applications, each powered by different pluggable storage engines.

The embodiment shown and discussed with respect to FIG. 4 depicts a database node 410, in some embodiments, multiple database nodes may be provided and arranged in a replica set—a primary node, supported by a plurality of secondary nodes.

According to one embodiment, the primary node receives and performs client write operations and generates an oplog. Each logged operation is replicated to, and carried out by, each of the secondary nodes supporting the primary node, thereby bringing those secondary nodes into synchronization with the primary node. In some embodiments, the secondary nodes may query the primary node or the primary oplog to receive the operation log and identify operations that need to be replicated. In other embodiments, the operation log may be transmitted from the primary node to the secondary nodes periodically or in response to the occurrence of a predefined condition, such as accruing a threshold number of operations in the operation log that have not yet been sent to the secondary nodes. Other implementations can be configured to provide different levels of consistency, and, for example, by restricting read requests. According to one embodiment, read requests can be restricted to systems having up to date data, read requests can also in some settings be restricted to primary systems, among other options.

Example Methods for Processing Read/Write Commit Commands on Cloud Resource

Figure 5:
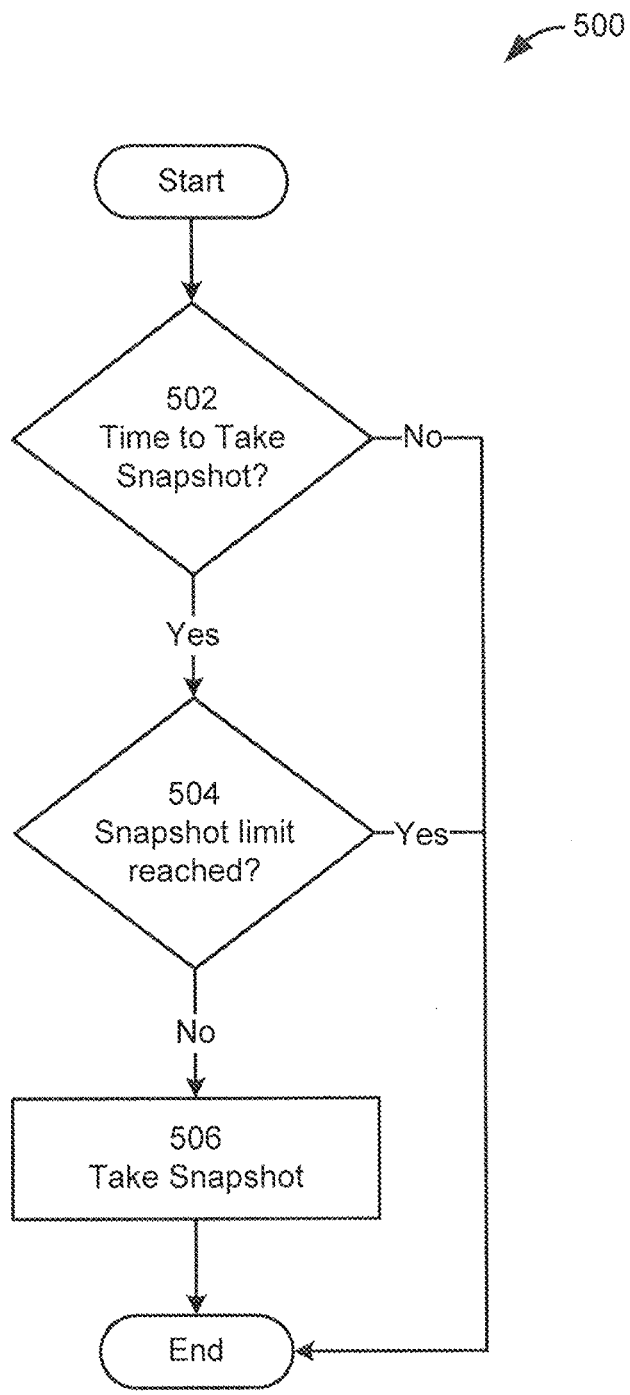
FIG. 5 is a flowchart showing an example snapshot generation process, according to some embodiments.

As discussed above, various systems may be configured to process read commit commands. The processing of these commands may be facilitated by the generation of snapshots of the database at different points in time on a logical clock. FIG. 5 shows an example snapshot generation process 500 according to some embodiments. The snapshot generation process 500 may be performed by a system (e.g., snapshot component 316 shown in FIG. 3) to generate snapshots of the data in the database that may be used to facilitate execution of read commit requests. In some embodiments, one or more storage nodes in a database may generate snapshots. For example, all of the storage nodes in a database may generate snapshots. Further, the storage nodes may generate snapshots of their own data (e.g., data in the respective storage node) and/or snapshots of data in another storage node (e.g., data in a primary storage node). As shown in FIG. 5, the snapshot generation process 500 includes an act 502 of determining whether it is time to take a snapshot, an act 504 of determining whether a snapshot limit has been reached, and an act 506 of taking a snapshot.

In act 502, the system determines whether it is time to take a snapshot. The system may make the determination as to whether it is appropriate to take a snapshot based on a predetermined policy. For example, the system may periodically or aperiodically capture snapshots of the data. In other examples, the system may change the timing of taking snapshots based on client interaction with the database. For example, the system may take snapshots every 10 milliseconds during time periods where the database is receiving change requests and pause snapshot generation during periods where no changes to the database are taking place. Thereby, the system may reduce the number of snapshots being taken and stored by avoiding multiple successive snapshots that do not include any changes to the database. If the system determines that it is an appropriate time to take a snapshot, the system proceeds to act 504 to determine whether a snapshot limit has been reached. Otherwise the snapshot generation process 500 ends.

In act 504, the system determines whether a snapshot limit has been reached. The system may have a predefined maximum number of snapshots that can be maintained at any given time. For example, the system may have a maximum number of snapshots of 10,000. If the snapshot limit has been reached, then process 500 ends. Otherwise, the system proceeds to act 506 and takes a snapshot.

Figure 6:
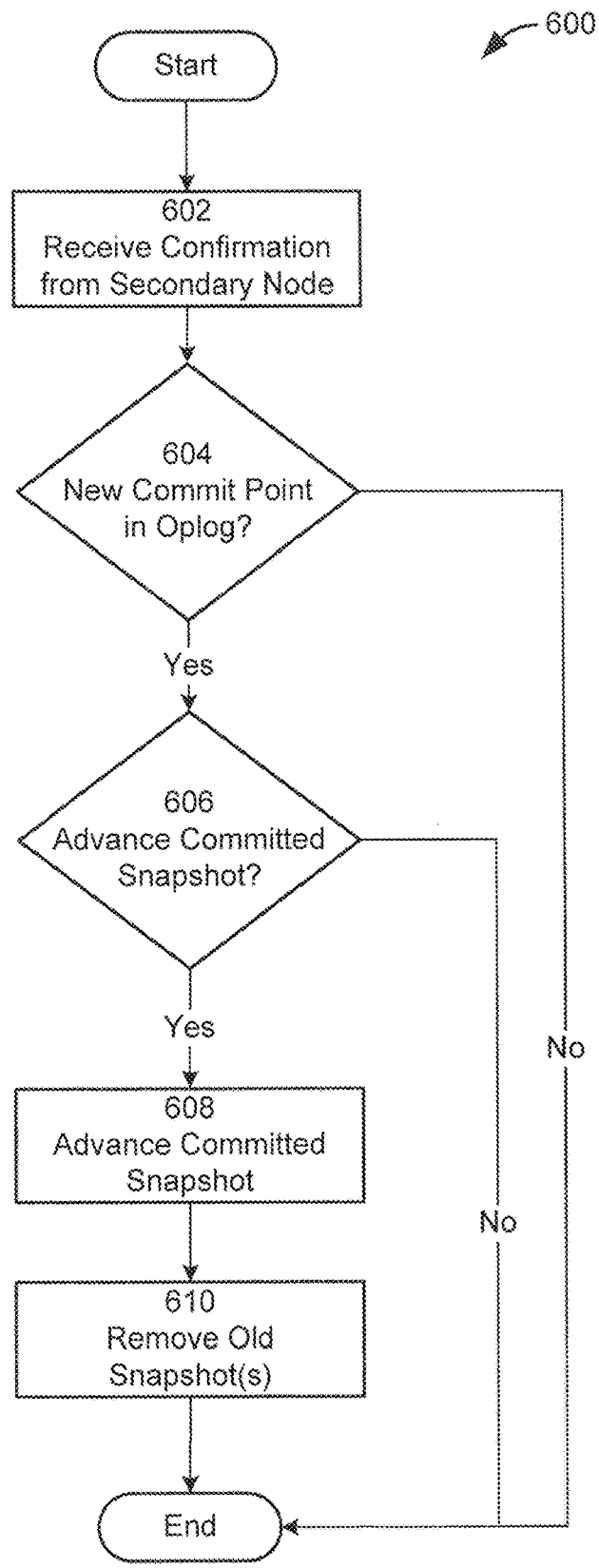
FIG. 6 is a flowchart showing an example snapshot commit process, according to some embodiments.

FIG. 6 shows an example snapshot commit process 600. A system (e.g., snapshot component 316 shown in FIG. 3) may perform the snapshot commit process 600 to continually update which snapshot is the latest committed snapshot and purge older snapshots. In some embodiments, one or more of the storage nodes that generate snapshots may perform process 600 to identify a committed snapshot. For example, all of the storage nodes may identify a committed snapshot. As shown in FIG. 6, the snapshot commit process 600 includes an act 602 of receiving confirmation from a secondary node, an act 604 of determining whether there is a new commit point in the operation log, an act 606 of determining whether to advance the committed snapshot, an act 608 of advancing the committed snapshot, and an act 610 of removing old snapshot(s).

In act 602, the system receives confirmation from a secondary node. The confirmation from the secondary node may indicate that a particular secondary node has performed various actions consistent with the operation log to make the data in that secondary node more up-to-date. The secondary node may provide the confirmation without explicit instructions from a primary node.

In act 604, the system determines whether there is a new commit point in the operation log. The system may determine whether there is a new commit point in the operation log by, for example, identifying the latest operation in the operation log that at least 50% of the secondary nodes have replicated. If the latest operation in the operation log is more up-to-date than the previous commit point, the commit point in the operation log advances. If the commit point in the operation log advances, the system proceeds to act 606 to determine whether the advance the committed snapshot. Otherwise the snapshot commit process 600 ends.

In act 606, the system determines whether to advance the committed snapshot based on the change in the commit point in the operation log. The system may determine whether to advance the committed snapshot by determining whether there is a more recent snapshot that only captures committed operations in the operation log. For example, the advance in the commit point in the operation log may be very small (e.g., 2 operations). In this example, the system may determine not to advance the snapshot by determining that the most recent snapshot that does not include any uncommitted operations (e.g., operations after the commit point in the operation log) is the same snapshot that has already been committed.

In another example, the advance in the commit point in the operation log may be very large (e.g., 30 operations). In this example, the system may determine to advance the snapshot by determining that the most recent snapshot that does not include any uncommitted operations is the 10th snapshot after the previously committed snapshot. If the system determines that is appropriate to advance the committed snapshot, the system proceeds to act 608 and advances the committed snapshot (e.g., to the 10th snapshot). Otherwise the snapshot commit process 600 ends.

In act 608, the system advances the committed snapshot. The system may advance the committed snapshot by flagging or otherwise marking the identified snapshot as the committed snapshot.

In act 610, the system removes old snapshots. The old snapshots that may be removed may be the snapshots that are older than the new committed snapshot. For example, a previous committed snapshot may be removed.

Figure 8:
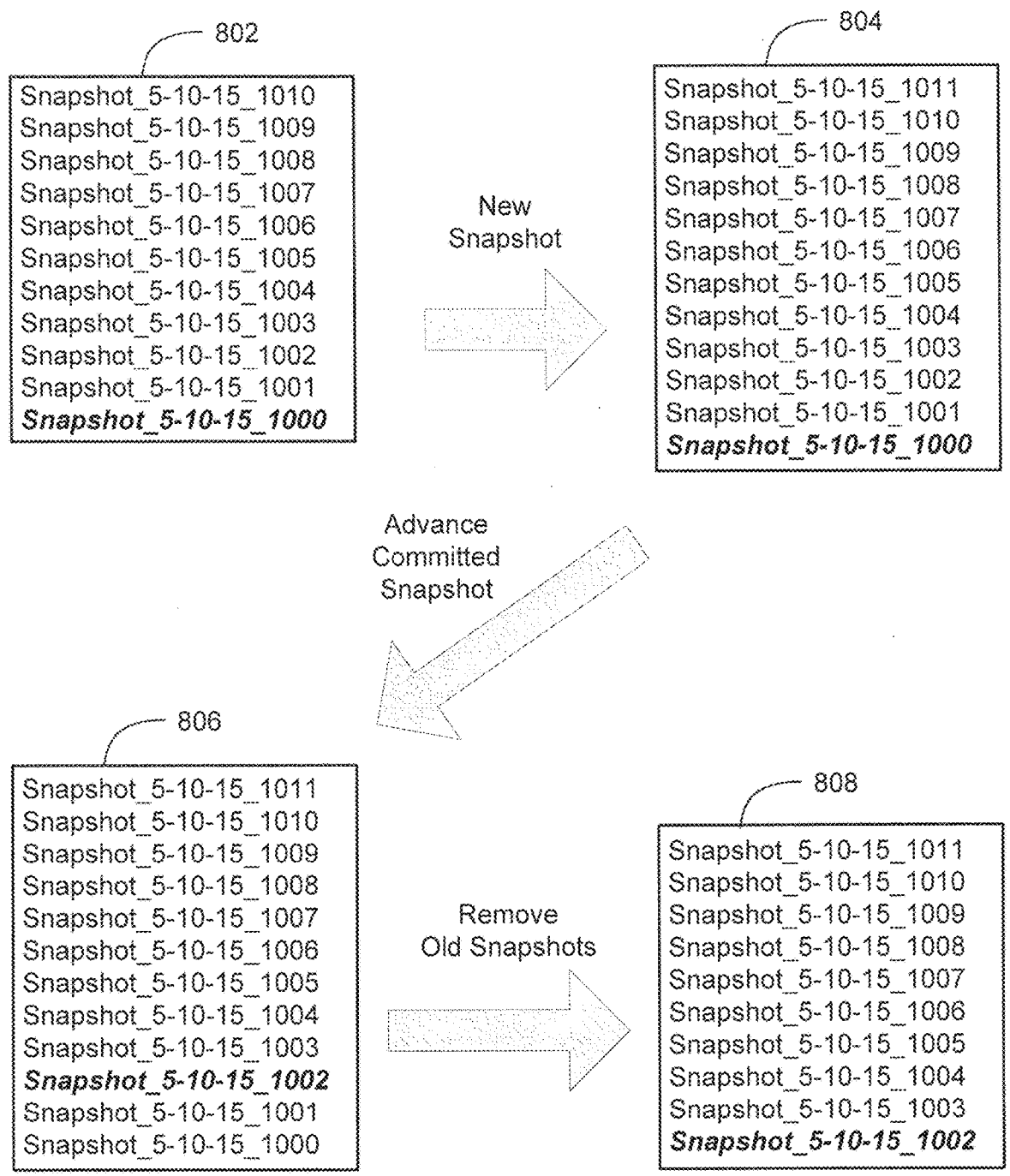
FIG. 8 is a state diagram showing the generation and maintenance of snapshots, according to some embodiments.

As discussed above, various processes may be performed by the system to generate and maintain the snapshots. FIG. 8 is a diagram showing the generation and maintenance of snapshots. A first collection of snapshots 802 is shown in the top left section of the diagram. The first collection of snapshots 802 includes a committed snapshot illustrated in bold (Snapshot_5-10-15_1000). A new snapshot (Snapshot_5-10-15_1011) is added to the first collection of snapshots 802 to form a second collection of snapshots 804. The committed snapshot in the second collection of snapshots 804 is advanced (now Snapshot_5-10-15_1002) to form the third collection of snapshots 806. The committed snapshot may advance responsive to a sufficient number of secondary nodes replicating the data in the new committed snapshot. The snapshots that are older than the new committed snapshot (Snapshot_5-10-15_1002) are removed from the third collection of snapshots 806 to form the fourth collection of snapshots 808. These old snapshots may be removed to limit the number of snapshots that need to be stored at any given time.

Each of the snapshots in the various snapshot collections may be representative of data stored at various points in time that may correspond to one or more actions in the operation log. Thereby, the snapshots create a new view of the data in the database that illustrates changes over discrete chunks of time as opposed to changes over operations performed (as shown by the operation log). FIG. 9 is a table showing the relationship between the snapshot view 902 and the operation log view 904 of data. As shown, the snapshot view 902 includes three snapshots (Snapshot_5-10-15_1000, Snapshot_5-10-15_1001, and Snapshot_5-10-15_1002) ordered from oldest (at the top) to newest (at the bottom). Each of the three snapshots were taken at different points in time on a database receiving a sequence of write requests shown in the operation log view 904. The requests are ordered from the oldest (at the top) to the newest (at the bottom). Each of the three snapshots corresponds to a specific point in time in the operation log and, thereby, a portion of the operation log. For example, Snapshot_5-10-15_1000 was taken just after the "Create VEGETABLE collection" operation was performed. Thereby, the data in the database at the time Snapshot_5-10-15_1000 was taken may be recreated by performing the "Create VEGETABLE collection" operation. The second snapshot (Snapshot_5-10-15_1001) was taken just after the "Insert BROCCOLI into VEGETABLE collection" operation was performed. Thereby, the data in the database at the time Snapshot_5-10-15_1001 was taken may be replicated by performing all of the operations prior to (and including) the "Insert BROCCOLI into VEGETABLE collection" operation. The third snapshot (Snapshot_5-10-15_1002) was taken just after the "Insert TOMATO into FRUIT collection" operation was performed. Thereby, the data in the database at the time Snapshot_5-10-15_1002 was taken may be replicated by performing all of the operations prior to (and including) the "Insert TOMATO into FRUIT collection" operation.

As shown in FIG. 9, a particular snapshot may be associated with more than one operations relative to the previous snapshot. For example, the third snapshot (Snapshot_5-10-15_1002) is associated with four additional operations relative to the second snapshot (Snapshot_5-10-15_1001). Further, operations may be performed after the latest snapshot (Snapshot_5-10-15_1002) has been taken as shown by the last two operations in the operation log view 1304. These two operations may be captured in the next snapshot to be captured (e.g., Snapshot_5-10-15_1003).

Figure 7:
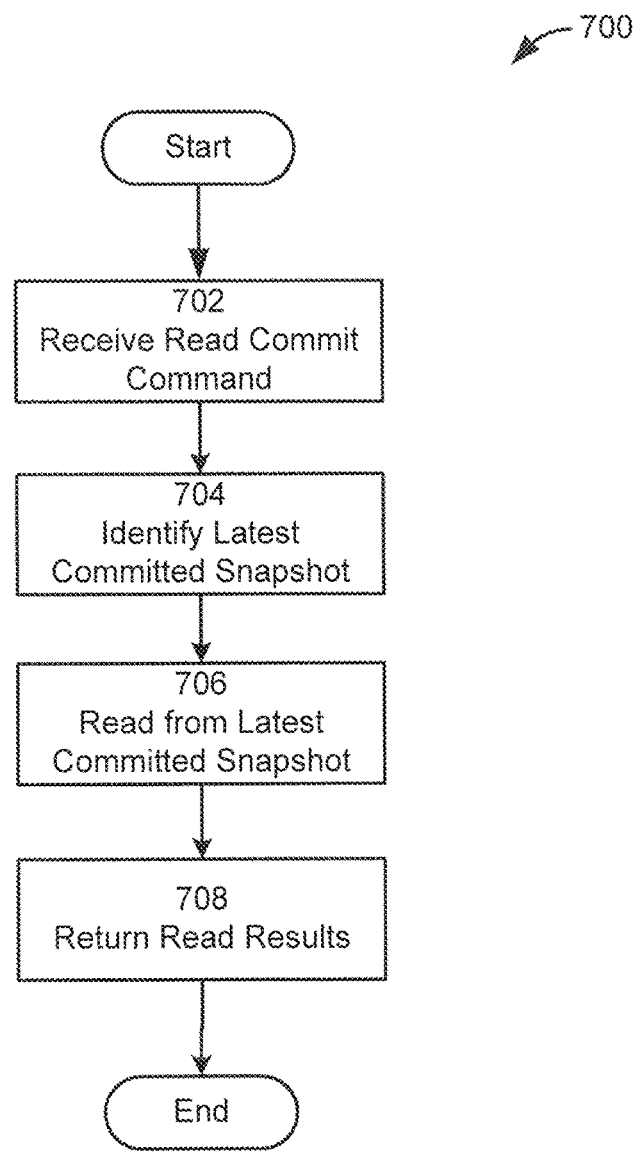
FIG. 7 is a flowchart showing an example read commit process, according to some embodiments.

As discussed above, the generation and maintenance of snapshots may facilitate the system to process read commit commands. FIG. 7 shows an example read commit process 700 that leverages the generated snapshots. The read commit process 700 may be performed by a system (e.g., a command processing component 118) to process read commit commands received from, for example, client. In some embodiments, a storage node (e.g., a primary or secondary storage node) that receives a read commit request may perform the read commit process 700. As shown in FIG. 7, the read commit process 700 includes an act 702 of receiving a read commit command, an act 704 of identifying the latest committed snapshot, an act 706 of reading from the latest committed snapshot, and an act 708 of returning the read results.

In some embodiments, read requests are permitted against uncommitted data by default. In one example, if no read commit parameter is specified in a data command, the system is configured to process against any available node and data. Whereas, if a read commit parameter is specified the system is configured to perform a read commit process, such as read commit process 700. For example, the system may determine where to access and return committed data.

In act 702, the system receives a read commit command. The read commit command may identify, for example, particular collections or documents that should be read.

In act 704, the system identifies the latest committed snapshot. The latest snapshot may be flagged or otherwise marked by, for example, the snapshot advance process 600 described above with reference to FIG. 6.

In act 706, the system reads from the latest committed snapshot. It should be appreciated that the particular method employed to read from the latest committed snapshot may vary depending upon the particular implementation of the snapshot employed. For example, the snapshot may not include data from the database but rather include a set of operations that have been performed (e.g., a section of the operation log). In this example the system may identify an appropriate secondary node to read that has the relevant data to be read in the same state as the committed snapshot. In other examples, the snapshot may store a copy of the data in the database. The snapshot may be stored in, for example, the primary storage node and/or any combination of one or more storage nodes. In these examples the system may directly read from the latest committed snapshot. In act 708, the system returns the data from the committed snapshot.

Additional Replication Embodiments

Various embodiments of the cloud implemented database are configured to ensure operations are performed consistently across the components of the distributed system. There are many different solutions for determining a consensus across multiple systems, especially when performing operations such as updates to a distributed database (e.g., nodes 110-114 of FIG. 1). In one such type of system, a primary node keeps an account of journaled operations performed on the database. It is appreciated that there are failures within such systems, and it is preferable to have one or more secondary systems that can take over applying database writes if the primary fails. However, it is appreciated that there are tradeoffs between detecting failures in a timely manner while ensuring there are few failover and rollback scenarios.

According to one aspect, a system and protocol is provided that maximizes write availability in the face of maintenance or failures by reducing failover time, regardless of failover frequency. For example, according to one embodiment, the system may achieve failover time in less than 1.5 seconds on "typical" installations. Further, it may be one objective to detect stale primaries in a more timely manner. Also, it may be beneficial to reduce a likelihood of rollback for write operations with write concern<w:majority. Write concern is generally described as the amount of acknowledgement required due to a write operation to be performed on secondaries. Problems exist when write operations are not performed on a majority of nodes within the network.

According to another aspect, new functionality is provided that improves performance for consensus-based protocols. In one aspect, a protocol is provided that reduces or eliminates heartbeat communication from secondary nodes, as it is appreciated that elections will be held only on failure of a primary, and high-frequency chatting from secondaries is not required. Secondaries connected directly to the primary may use the responsiveness of general database write commands (e.g., a getMore command in the MongoDB database system) that can convey heartbeat information. For instance, in one implementation, adding primary state information to the metadata returned through the getMore command, chained secondaries can be informed when upstream secondaries lose track of the primary.

According to one implementation, a system is provided that is capable of processing database requests within a distributed computer system implemented on cloud resources with multiple replicated versions of the database. For instance, it is appreciated that there may be one or more primary database systems and one or more secondary systems that communicate using a clustering protocol to maintain consistency within the distributed database. In one embodiment, a primary or master node is responsible for accepting write operations and propagating them to secondary nodes within the replica set.

Various embodiments of the present invention relate to improvements in a distributed consensus protocol. In particular, various aspects may relate to improvements to a leader based replicated state machine such as that provided in the MongoDB distributed database system. Consensus is generally defined as getting multiple processes or servers to agree on something. Such a system must handle however a wide range of failure issues, such as, disk failures, network partitions, machine freezes, skews in clocks, or other communication issues.

In some embodiments of a leader based consensus system, the leader includes the state machine and a replicated log which is distributed to one or more secondary systems. It is appreciated that issues exist when the primary is lost and failover occurs. Operationally, is beneficial to have the system be available for as much time as possible, as in one leader-based system, the primary node applies writes to the system, and it is beneficial to have the primary available as much as possible, and therefore reduce the amount of time for establishing a new primary. According to one embodiment, term IDs may be used to identify the attempts of an election of a new primary. In one implementation, the term may be a monotonically increasing identifier of the unique term in which an election occurs. For example, by using an election ID, voters may distinguish elections so that they can vote more quickly in different elections. Other aspects that improve performance may be used relate to being able to more quickly detect false primaries, increasing heartbeat frequency, including a configurable election timeout that is randomized per node, and using chained replication. Such improvements may reduce the amount of time to detect failover conditions, reducing rollback, and performing failover more quickly.

According to another embodiment, unlike in the Raft protocol, where followers have operations pushed to them by the leader, in MongoDB, secondaries pull records of executed operations (e.g., oplog entries) from the leader. Because of this, according to one implementation, the winning candidate of an election must broadcast a final message indicating that the winning candidate is the new leader. This message can take the form of a new declare winner command (e.g., a replSetDeclareElectionWinner command).

In some embodiments, the replica set system associated with the MongoDB database provides configurable levels of data readability and writability in the event of zero or more node failures. In some embodiments, the MongoDB database achieves the configurability of levels by assembling 'mongod' nodes into replica sets, which coordinate the acceptance and distribution of logical write operations. In one implementation, in order to maintain MongoDB database consistency guarantees, members of a replica set elect a primary node to coordinate writes. Clients direct writes to such a primary node, which then takes responsibility for ensuring the ordering guarantees and replicates the writes to secondaries in a way that preserves those guarantees on secondary nodes.

Figure 10:
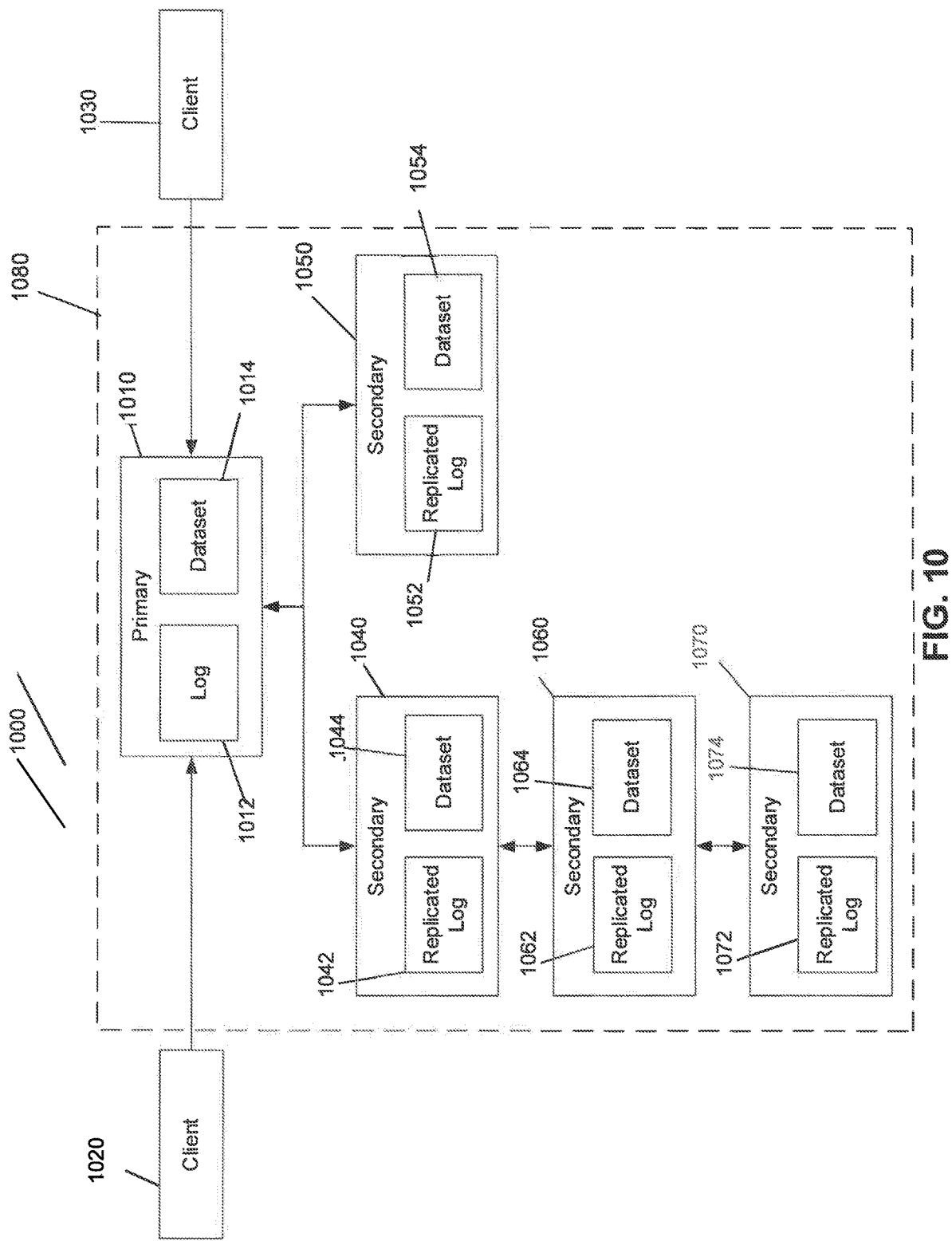
FIG. 10 is a block diagram of an example distributed database system.

FIG. 10 shows a block diagram of a distributed database system 1000 capable of implementing various aspects of embodiments described herein. In particular, distributed database system 1000 includes client systems 1020, 1030 and a replica set 1080 comprising a primary node 1010, two secondary nodes 1040, 1050 in direct communication with the primary node 1010, and two secondary nodes 1060, 1070 chained from secondary node 1040. The replica set 1080 may host a distributed database.

In some embodiments, the primary node 1010 may receive database operation requests from a plurality of client systems (e.g. clients 1020, 1030). The primary node 1010 may execute operations in response to the requests. In one embodiment, the primary node 1010 receives requests to write data to the distributed database that is hosted by the replica set 1080. The primary node 1010 may respond to the requests by executing the requested operation and writing data to a dataset 1014. In one embodiment, the data set maintained by the primary node may represent the current state of the database hosted by the replica set. For example, in replica set 1080 the data set 1014 may represent the current state of the database hosted by replica set 1080.

In one embodiment, the primary node 1010 may further maintain a record of operations such as an operation log 1012. For example, the primary node 1010 may record all executed operations in the log 1012. The log 1012 may include a plurality of entries each of which specifies a particular executed operation. In some embodiments, an entry may include information about an associated operation. The information may include information that captures the executed operation and metadata associated the operation. In one example, the entry may include an election term ID and a timestamp associated with the operation as well as other information about the operation.

In some embodiments, the replica set 1080 may use query responses as a heartbeat to detect health of communication between a primary node and secondary node. In one embodiment, a secondary node may determine a time between communication of a query command to the primary node and receipt of a response to the query. In one implementation, if the secondary node determines that the time exceeds a particular value (e.g. a timeout), the system may detect a failure of the primary node. In some embodiments, the secondary node may trigger selection of a new primary node responsive to detecting failure of the primary node.

In some embodiments, all secondary nodes of replica set 1080 may not be in direct communication with primary node 1010. For example, secondary nodes 1060 and 1070 are not in direct communication with primary node 1010 in replica set 1080. Secondary node 1060 is chained to and in direct communication with secondary node 1040 while secondary node 1070 is chained to and in direct communication with secondary node 1060. In one implementation, in order to update and maintain replica datasets 1064 and 1074 managed by secondary nodes 1060 and 1070 respectively, the secondary nodes 1060, 1070 may receive a record of operations from the secondary nodes to which they are chained. For example, secondary node 1060 may query secondary node 1040 for a record of latest operations. The secondary node 1060 may receive, in response to the query, one or more log entries of executed operations. The log entries may comprise information to execute associated operations and metadata associated with the operations. The secondary node 1060 may then execute the received operations recorded in the received log entries. In some embodiments, the secondary node 1060 may also maintain a log 1062 of executed operations.

Similar to how secondary node 1060 interacts with secondary node 1040 to update dataset 1064 associated with secondary node 1060, in one implementation, secondary node 1070 may interact with secondary node 1060 to update the associated dataset 1074. The secondary node 1070 may query secondary node 1060 for a record of operations. The secondary node 1070 may receive, in response to the query, a set of log entries specifying operations. The secondary node 1070 may use information in the log entry to replicate the operation on dataset 1074. The secondary node 1070 may further maintain a log 1072 of executed operations.

In some embodiments, the chained secondary nodes 1060, 1070 that are not in direct communication with the primary node 1010 may use metadata to determine a health of the primary node 1010. In one example embodiment, the chained secondaries 1060, 1070 may use metadata included with received operation log entries to determine whether an upstream secondary node has healthy communication with the primary node. For example, secondary node 1060 may use time stamp information included with the received operation log entries from secondary node 1040 to determine an amount of time that secondary node 1040 has not communicated successfully with the primary node 1010.

In some embodiments, the secondary nodes of replica set 1080 may communicate with primary node 1010 to indicate health or liveness of the secondary nodes. In one example embodiment, the secondary nodes issue a liveness command (e.g. a replSetUpdatePosition command). According to one implementation, such a command may comprise a no-operation (no-op) database command that relays heartbeat information. A no-operation database command may comprise a version of a normal database command that does not perform any operations on the database (e.g. write no-op command). The primary node 1010 may utilize receipt of liveness commands to determine whether the secondary nodes are healthy and/or whether the primary node 1010 is in communication with the secondary nodes. For example, secondary nodes 1040 and 1050 may communicate liveness commands to primary node 110. The primary node 1010 may track time between received liveness commands from each secondary node. If the time exceeds a threshold, the primary node 1010 may determine the secondary node to be failed or detect an inability to communicate with the secondary node.

In some embodiments, chained secondary nodes that are not in direct communication with the primary node may issue liveness commands (e.g. a replSetUpdatePosition command) to secondary nodes to which they are chained. The upstream secondary nodes may then include the liveness command or information indicating liveness of downstream secondary nodes in communications to the primary node 1010.

Example Consistency Implementation—Summary

Although some of the examples below refer to use with the MongoDB database system, it should be appreciated that other database systems may be used. Some of the possible changes, alone or in combination with other changes, may be implemented:

Replace tailing oplog query via find and getMore with new find and getMore commands that return extra replication state data along with oplog entries.

Use getMore and replSetUpdatePosition commands to convey liveness heartbeat information to and from primaries. It is appreciated that elections only need to be held if the primary disappears, so a high frequency heartbeat among secondaries is not necessary for this purpose.

Add a 64-bit term counter to oplog entries.

Use a better liveness timeout to decide when to call for elections on secondaries.

Currently, in one example implementation, only the wait-after-election-tie timer is randomized in the code; it is appreciated that this is sub-optimal Use replSetHeartbeat command for establishing ping times and other information needed for building the spanning tree.

Add a new config restriction: Only nodes with votes >0 may have priority >0, excluding arbiters.

Instead of prohibiting such nodes, use the election rules for arbiters.

Nodes record the term and the ballot (the node being voted for) durably, before voting in an election.

In some embodiments, primary nodes determine liveness of secondary nodes by way of database commands. Further, secondary nodes may determine liveness of primary nodes via database commands. Nodes may use receipt of particular commands as heartbeats and indicators of health. In one embodiment, a secondary node may use a command for querying the primary node for log entries to also determine health of the primary node. Additionally, a primary node may receive database commands from secondary nodes and use them as indications of health of communication with the secondary nodes.

In one implementation, liveness may be communicated via database commands (e.g., getMore and replSetUpdatePosition commands). In one example, the system uses periodic heartbeats from each node in the set to every other node to give each node a reasonably symmetric portrait of the liveness of their fellow nodes. This makes the number of heartbeat messages required in a stable system grow as the square of the number of nodes in the replica set, and puts an effective lower bound on the frequency of those heartbeat operations. Because heartbeat frequency may put a lower bound on failover detection and recovery, it would be desired to make the effective heartbeat rate much higher. Fortunately, the nodes' requirements for liveness information are not symmetric.

In some embodiments, primaries need to know if the majority of the set can still receive updates, while secondaries need to know if the primary is still alive. In one implementation, these two pieces of information can be routed via the spanning tree currently used to deliver oplog entries from the primary to the secondaries. Information may be passed among systems in a chainlike manner when they are not directly connected.

In some embodiments, a replica set may use heartbeats in addition to database commands to determine health of nodes and node communication. In one embodiment, the system may use a low frequency heartbeat to reduce latency requirements of the system.

In some embodiments, heartbeats can continue to be used to help choose a sync source (via the ping information), and, if the election timeout is long enough, as a backstop when oplog queries respond too slowly. These heartbeats may not need to be as frequent as some implementations, and certainly do not need to be more frequent. However, when the spanning tree is severed (i.e., when a non-primary node has no sync source), it is appreciated that the heartbeat frequency will need to be higher than the electionTimeout, to prevent a primary from stepping down.

In some embodiments, in order to communicate liveness of the primary to secondaries, database commands such as find and getMore commands can be used to respond promptly to secondaries. The definition of "promptly" depends on the election timeout, which in turn depends on the latency of the network, but may be, for example, under 100 ms for a local network and under 1000 ms for a multi-datacenter system.

In some embodiments, secondaries connected directly to the primary may use the responsiveness of getMore as a stand-in for a heartbeat. Furthermore, by adding primary state information to the metadata returned through the getMore command, chained secondaries can be informed when upstream secondaries lose track of the primary.

In some embodiments, to communicate the liveness of secondaries to the primary, a liveness command (e.g., a replSetUpdatePosition command) may be used to communicate liveness, though that command can be issued in a no-op form during extended periods of writelessness (e.g., an actual write is not performed). By keeping track of how long it has been since the primary has heard a liveness command (possibly indirectly) from all secondaries, the primary can track how many secondaries are still responding and replicating. Note that this detection is not necessary in Raft, because there is no consequence if the leader continues to accept writes but not commit them; uncommitted log entries are not acted upon by the followers until they are committed. In some embodiments of the MongoDB system, secondaries are actively applying write ops even before they are committed. Due to this consequence, we must actively step down the primary when the primary loses contact with a majority of nodes in a cluster.

This approach to heartbeating has the advantage that it uses the same channel and direction of communication that is needed to actually propagate operation changes. In one implementation, in the event that there is an asymmetric network partition that temporarily constrains the direction in which connections may be established (i.e., a firewall misconfiguration), these liveness heartbeats flow along secondary-initiated connections, just like oplog operations.

Arbiter Considerations

In some embodiments, additional node types can be employed in addition to primary and secondary nodes. In one example, a node can additionally or alternatively function as an arbiter. A node assigned an arbiter role can be configured to facilitate the election protocol and improve efficiency during election of a new primary node. In one embodiment, an arbiter node may be configured with voting rights in an election protocol but may be unable to take on a primary node role. In some embodiments, an arbiter node receives information on statuses of other nodes and facilitates reaching consensus by accumulating status information and communicating information associated with the most suitable candidates.

In some embodiments, arbiter nodes may execute a database command (e.g. a replSetUpdatePosition command) to receive information on statuses of other nodes. The information may, for example, be included as metadata received in response to the database command. The arbiter node may then use the information in a voting process to participate in electing a new primary node. In one implementation, arbiters must have knowledge of the commit level (e.g., commitIndex or commitLevel parameters) on the current primary in order to vote for nodes in elections. Arbiter nodes may base their vote, at least in part, on a value of the commitIndex or commitLevel.

Naively, the commitIndex level may be monitored on the primary. In one implementation, a system does not vote 'yea' in response to any candidate whose last log index is behind the commitIndex entry (or the terms do not match).

Like a secondary, an arbiter chooses a syncSource, and replSetUpdatePositions are sent back to that syncSource; thus a direct connection to the primary is not necessary replSetUpdatePosition would indicate a position of a secondary in replication (e.g. an optime). For example, replSetUpdatePosition may indicate a position is OpTime(0,0)

commitLevel would be fetched via this same command (in its response).

Figure 11:
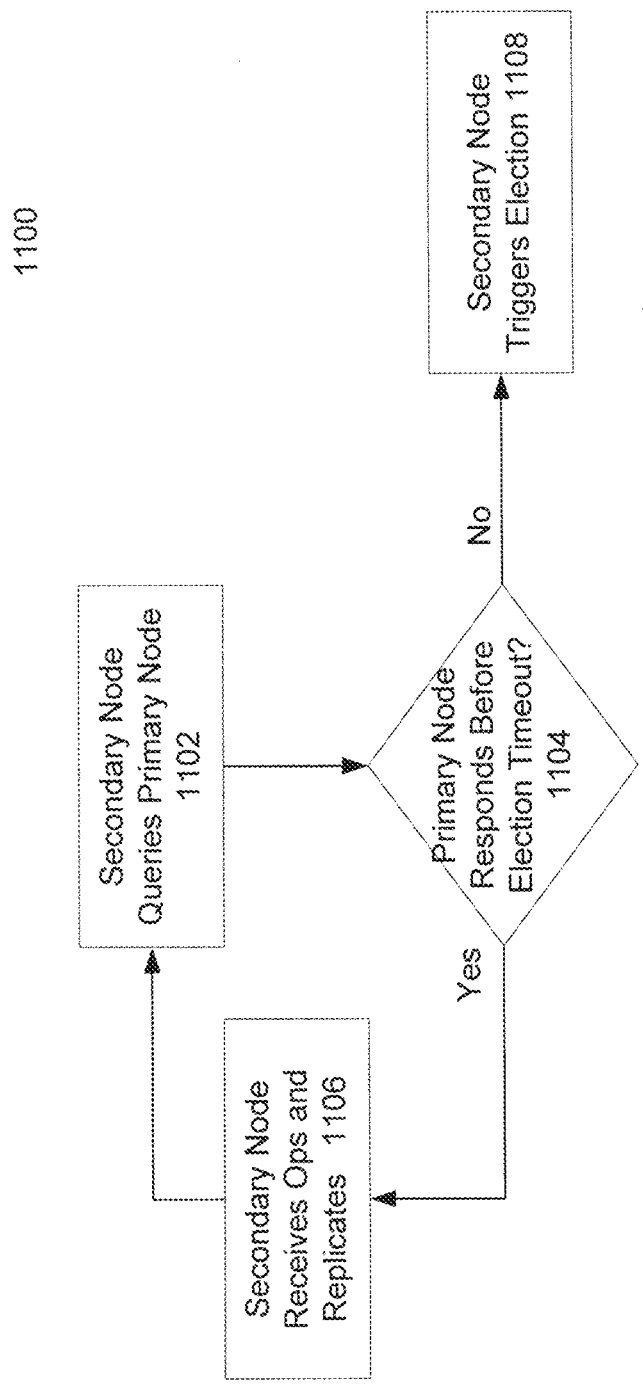
FIG. 11 is a state diagram illustrating an example process for electing a new primary node.

FIG. 11 illustrates an exemplary process 1100 according to which a secondary node may detect a primary node failure and trigger an election. Exemplary process 1100 may be executed by a secondary node of a replica set such as replica set 1080 described above with respect to FIG. 10.

Exemplary process begins at act 1102 where a secondary node executing the process queries a primary node. In some embodiments, the secondary node may communicate a command to query the primary node (e.g. getMore or find commands). The secondary node may communicate the commands in order to receive a record of executed database operations from the primary node. The record of executed operations may, for example, comprise a set of log entries.

Next, exemplary process 1100 proceeds to act 1104 where the secondary nodes determines whether a response is received from the queried primary node. If the secondary node receives a response from the primary node before an election timeout 1104, YES, the process proceeds to act 1106 where the secondary nodes receives a record of operations and executes them. The secondary node then returns to act 1102 where the secondary node continues to query the primary node.

In some embodiments, the secondary node may have an election timeout that triggers the election process. If the secondary node does not receive a response from the primary node before the election timeout 1104, NO, exemplary process 1100 proceeds to act 1108 where the secondary node initiates an election. The secondary node may, for example, determine a time that has passed since communicating a query command to the primary node. If the time reaches the election timeout 1104, NO, the secondary node may initiate an election 1110.

Figure 12:
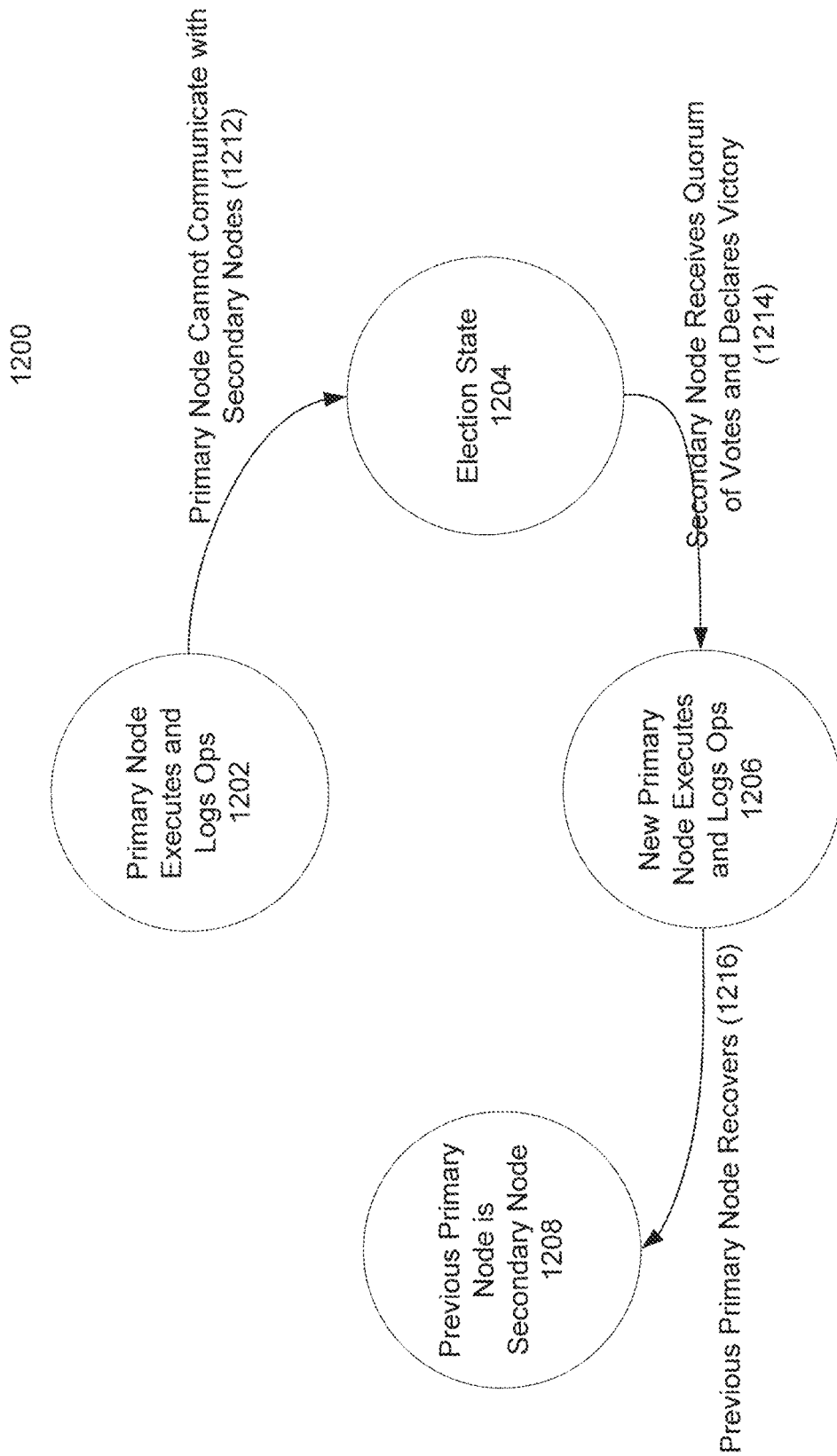
FIG. 12 is a state diagram illustrating an example process by which a secondary node may trigger selection of a new primary node.

FIG. 12 illustrates an exemplary state diagram from a primary node to trigger election. The process may be executed by a primary node of a replica set (e.g. replica set 1080) in accordance with embodiments described herein.

At state 1202, a primary node is in a normal operational state. In some embodiments, the primary node may receive database operation requests from client systems. The primary node may execute database operations in response to the requests. Additionally, the primary node may log executed operations. Furthermore, the primary node may respond to queries from one or more secondary nodes for log entries in order for the secondary nodes to replicate the executed operations of the primary node.

In some embodiments, the primary node may receive liveness communications from secondary nodes of the system. The primary node may, for example, receive a communication from secondary nodes indicating their liveness (e.g. via a replSetUpdatePosition command). As discussed, for example, these communications may be in the form of no-op commands and/or metadata communicated by secondary nodes. In one embodiment, the primary node uses these communications to keep track of liveness of the secondary nodes. The primary node may, for example, determine a time that has passed since receiving a liveness command for all the secondary nodes. For secondary nodes that are not directly in communication with the primary node, the primary node may receive their liveness indication through secondary nodes in direct communication with the primary node.

If the primary node determines that it cannot communicate with a specific number (e.g. majority) of secondary nodes 1212, the primary node may initiate an election and the replica set may transition to an election state 1204. In one embodiment, the primary node may determine, for each secondary node, an amount of time that has passed since receiving an indication of liveness. If the amount of time for a secondary node exceeds a threshold, the primary node may determine the secondary node to be dead or that the primary node is unable to communicate with the secondary node. If the primary node determines that a certain number of secondary nodes are dead or unable to communicate, the primary node may trigger an election. The primary node may, for example, use times of received liveness indications to track amount of time passed since receipt of the indications and to determine health of communication for each secondary node. If a threshold number of nodes are deemed unhealthy, the primary node may trigger an election.

During election state 1204, one of the secondary nodes of the replica set may receive a quorum of votes and declare victory 1214. The system then transitions to state 1206 where the secondary node becomes the new primary node. The new primary node takes over the role and tasks of the primary node. The original primary node may be down and unable to communicate with other nodes. For example, the original primary node may be stale and unable to replicate operations from the new primary node.

The original primary node may eventually recover 1216. In some embodiments, the original primary node may re-establish communication with the new primary node and/or other secondary nodes. The system then transitions to state 1208 where the original primary node becomes a secondary node. The node then replicates operations executed by the newly elected primary node.

Spanning Tree Maintenance Via replSetHeartbeat Command

In some embodiments, a system may include a low frequency heartbeat in order to maintain a spanning tree. In one embodiment, a primary node may receive a low frequency heart beat command from secondary nodes in the replica set. For example, the low frequency heart beat command may comprise a no-op database command (e.g. a replSetHeartbeat command). The primary node may respond to this heartbeat command to provide state information about the database as metadata. In situations where a chained secondary node loses communication with its sync source (i.e. an upstream secondary node), the low frequency heartbeat command may provide a backup method for the chained secondary node to learn primary node identity and obtain record(s) of executed operations (e.g. oplog entries).

In one implementation, the replication chaining spanning tree is maintained using information collected by infrequent (every two seconds or more) issuance of replSetHeartbeat commands among all nodes in a replica set. In one implementation, these heartbeats may also serve as a liveness backstop on systems where getMore on the oplog collection or oplog application on the secondary have very high latency. However, in one embodiment, concurrency control system may avoid using such mechanisms, as well as for nodes that do not currently have a sync source with which to send liveness information.

In some embodiments, during periods of asymmetric connectivity, it is appreciated that secondaries might learn the identity of new primaries through these heartbeats. For example, if a new primary cannot establish a connection to some secondaries to send election messages, but such secondaries can still successfully open connections to the new primary. In one implementation, replSetHeartbeat includes the same metadata described for getMore and find, below.

getMore and Find Commands

In one implementation, in order to support enhancements to the replication protocol, find and getMore operations may target the oplog return metadata in addition to the stored documents. An example implementation of this metadata is discussed below. In one implementation, replication uses command forms of find and getMore (possibly replication-specific, possibly generic), rather than the find and getMore wire protocol messages.

In some embodiments, replication makes use of two query flags that are not documented for external use:

AwaitData and OplogReplay:

AwaitData, in one implementation, activates a special mode of tailing cursor that waits for more data before returning EOD to the client—this is known as a "long poll".

AwaitData, in one implementation, waits about 10 second before returning. It may not be necessary to adjust this timeout for failover detection logic to be efficient.

AwaitData, in one implementation, employs the use of a condition variable to efficiently detect when new data is written to the oplog. This may not change in one implementation, although the signaling of the condvar can be done in an OperationObserver.

OplogReplay, in one implementation, a special way of efficiently finding a particular ts entry in an oplog On one implementation of MMAPv1, it uses knowledge of capped collection and extent layouts to divide the search space In one implementation, WiredTiger storage engine uses a special index on ts.

In some embodiments, there is also special code to make sure the oplogReader does not read storage-engine-uncommitted records, as these could be rolled back if a storage-engine-transaction aborts. Note this has nothing to do with replication rollbacks, which are at a higher level.

On MMAPv1, for insertion efficiency, the oplog has no indexes, even on id, so this query flag is necessary for efficient oplog queries.

getMore and Find Metadata

In one embodiment, in addition to returning the requested oplog entries, find and getMore on oplog cursors in use by replication may return the metadata fields described below. In one implementation, when a downstream secondary chains from an upstream secondary, the upstream secondary will return the most current form of the metadata it has received from its own sync source (e.g. an upstream secondary node or the primary node). In some embodiments, the metadata may include the following information:

lastOpCommitted The current commit optime, reported by the primary

This is the latest optime that a majority of nodes have affirmatively written to their oplog. Entries in the oplog with optimes no greater than this value will not roll back without external intervention. They are thus considered committed.

The Raft protocol utilizes a leaderCommit argument to an AppendEntries remote procedure call (RPC).

Reconfigure also uses this information to serialize reconfigurations.

The identity of the current primary or leader ID.

In the Raft protocol, this is leaderId

In some embodiments, the leader ID may be used to update chained secondaries' record of who the current primary is, so that calls to determine the primary (e.g. isMaster calls) can be up to date.

In some embodiments, an index of the current primary leader from a replica set configuration may be used.

In one embodiment, the configuration version may be used to confirm that the index of the current primary leader is valid.

In some embodiments, if there is no primary, the system may use a default value (e.g. −1).

In one embodiment, using the ID (e.g., value of the_id parameter) value of the primary is not as ideal, as there is no clear sentinel that may be used to indicate 'no primary'.

The upstream node's value of the current election term (e.g. the currentTerm parameter)

Mongos Considerations

"Mongos" may comprise a routing service (and include data routers discussed herein) in embodiments of MongoDB database systems. Mongos may process operation requests received from client systems (e.g. client systems 1020 and 1030). Mongos may determine locations of data in a replica set in order to complete an operation request. The Mongos may further return information back to the client system. In some embodiments, Mongos may execute various versions of database commands (e.g. find and/or getMore commands) in order to retrieve metadata as part of the processing.

In one implementation, the extra metadata may not be collated and returned by the mongos versions of find and getMore commands. In another implementation, the system may be capable of propagating the information back to clients via mongos.

In one implementation, the system may attach term id to each op in the oplog—A term id helps identify which primary produced a given op; this is helpful in undertaking a rollback operation.

In one embodiment, an oplog entry has an h (hash) field, a 64 bit integer that is a calculation based on the prior hash, the node's replica set configuration id, and the current timestamp.

In one embodiment, the term is not stored in a hash field. Instead, a new field "t" (term) is added.

In one embodiment, the term id is incremented for each election attempt when a node transitions to candidate status.

In one embodiment, the field name can remain "h" for backwards compatibility.

According to one implementation, both old and new protocols can understand how to interpret both old and new log formats, making upgrade and downgrade procedures easier. In one embodiment, the primary node may always add the term to the oplog even if in protocol version 0.

Example

Current Oplog Document:
{"ts": Timestamp(1424293143, 10), "h": NumberLong (432750029), "v": 2, "op": "n", "ns": " ", "o": {"msg": "initiating set"}}

New Oplog Document:
{"ts": Timestamp(1424293143, 10), "h": NumberLong (1), "t": NumberLong(1), "v": 2, "op": "n", "ns": " ", "o": {"msg": "initiating set"}}

In some embodiments, OpTime may be used to compare terms. In one implementation, OpTime always compares terms even if in protocol version 0. This may provide continuing functionality of items in protocol version 0 because the version does not change at the beginning of protocol version 0. In some embodiments, the term is left unchanged during a downgrade. As a result the term remains unchanged. In one embodiment, if any of the two OpTimes in comparison lacks term(s), they can be compared by timestamp and fall back to protocol version 0 that relies on the order of timestamp to be satisfied.

Tracking Committed Ops

In the Raft protocol, the leader keeps track of the commitIndex, which is the last op the leader is allowed to apply. In one embodiment of MongoDB database, the primary calculates a value of a last committed operation (e.g. lastOpCommitted) as the latest op in the oplog that the primary knows a majority of the replica set members have written. In one implementation, the primary keeps a state map of all the replica set members and their last applied op; the primary may use this state map to calculate the value of lastOpCommitted. This value indicates that all ops up to and including itself are committed—they will not be rolled back in the future. lastOpCommitted is of value to clients and to internal replication operations. The secondaries receive the primary's notion of lastOpCommitted as they pull ops down the wire via find/getMore, and update their own local copies of lastOpCommitted.

Newly Elected Nodes Must Commit a First Operation

One of the Raft requirements includes that a newly elected leader cannot change the commit level until the elected leader has committed one operation in the new term. To enforce this, the commit level calculation may be amended slightly. In one implementation, upon election, a primary writes a no-op entry into the oplog announcing its election and the new term. The primary may then make a note of that entry's optime. This optime can be stored non-durably adjacent to the state map. Now, when calculating a new commit level, this initial optime provides a floor; the commit level cannot change unless the commit level is greater than or equal to this optime.

Election Protocol

A new election protocol may be defined with some modifications. Unlike in Raft, where followers have operations pushed to them by the leader, in some embodiments, secondaries pull oplog entries. Because of this, in some embodiments, the winning candidate of an election must broadcast a final message indicating that the winning candidate is the new leader. In Raft, the AppendEntries RPC suffices for this. In some embodiments, this message can take the form of a new election winning declaration command (e.g., a replSetDeclareElectionWinner command).

Example replication commands are summarized below. Steady-state operation replication and leader election may, in one implementation, otherwise proceed similarly in Raft.

Use Cases Examples

Figure 19:
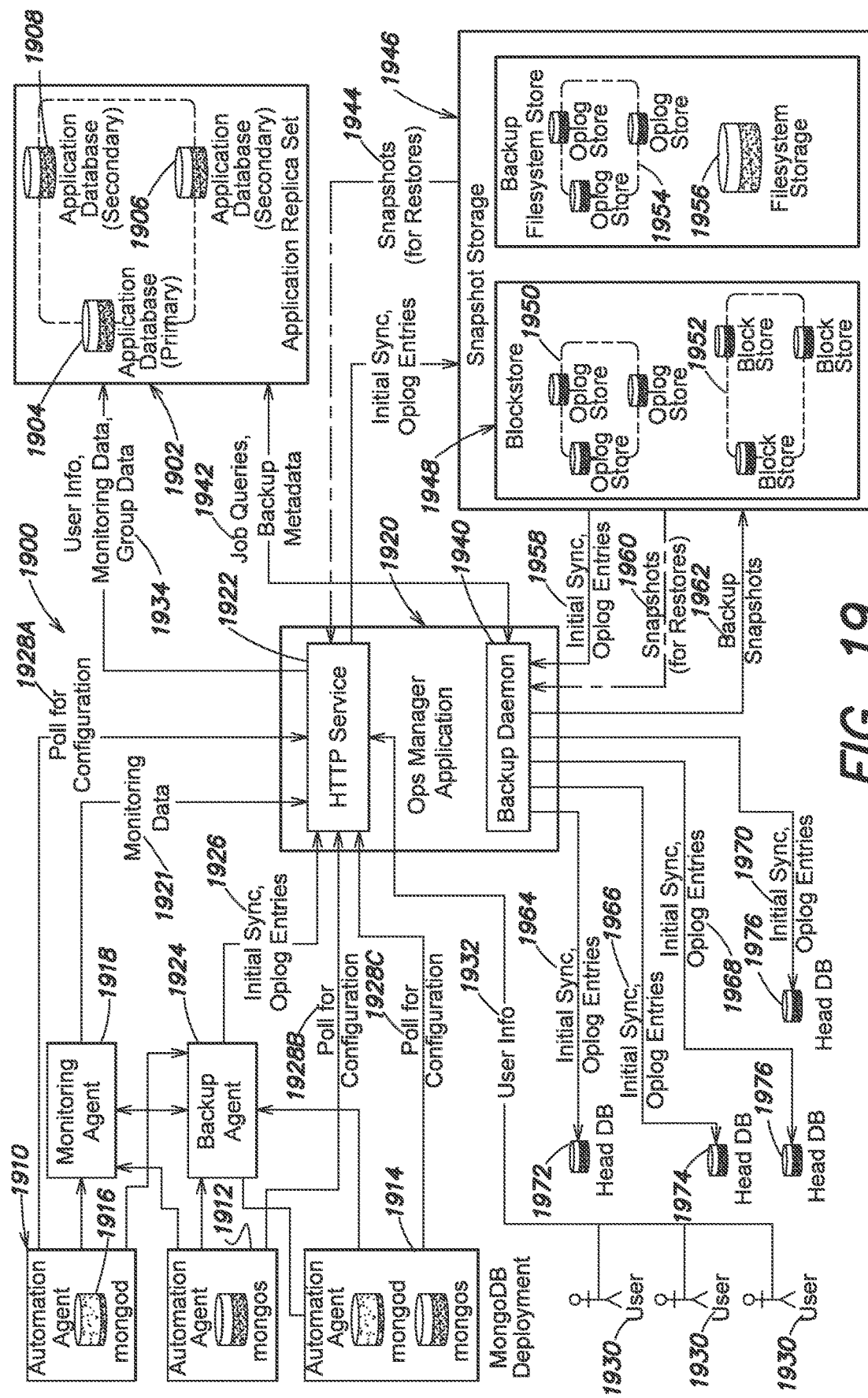
FIG. 19 is a block diagram of an example architecture for a distributed database hosted on cloud resources.

FIG. 19 illustrates an example architecture 1900 of a distributed database that can be provisioned on cloud resources. According to one embodiment, the example architecture can be defined by configuration setting stored on a system for managing a cloud distributed data, in conjunction with user selection described herein, for resource size, replication factor, etc. Other embodiments, employ difference architectures.

The architecture includes one or more replica sets (e.g., 1902) which includes at least a primary node, and at least two secondary nodes, having a primary database 1904 and at least two secondary databases 1906 and 1908. Automation agents 1910-1914 can be installed and executed on the respective components of the database. For example, each database manager application/daemon (e.g., "mongod" 1916) can include an automation agent configured to execute management functions on the database manager. Automation agents can also be installed and executed on database routers (e.g., mongos 1912) and in some examples one agent can monitor both mongod and mongos (e.g., at 1914). A monitoring agent 1918 can be configured to collect performance data from the automation agents and communicate any monitoring data (e.g., 1921) to a central management sever (including, for example, ops manager application 1920) via an http service 1922 or other communication architecture. In some embodiments, the automation agents and monitoring agents are part of a monitoring component executing on the distributed database. In some embodiments, the monitoring component can also include backup agents 1924 configured to capture replication data (e.g., initial synch data (i.e., status for initial data copy functions)) and communicate the same (e.g., 1926) to the central management server. Automation agents can also be configured to poll information from the central management server (e.g., at 1928A, 1928B, and 1928C) and implement changes to the mongos or mongod reflected in the polled information.

The central server 1920 can be configured to provide backup services. For example, a backup daemon 1940 can be configured to execute job queries and/or capture backup metadata (e.g, 1942) from primary and secondary databases of respective replica sets.

The central management server 1920 can be accessed by users with their respective authorization or user information 1932. User interfaces provide visualizations to the end users of monitoring data, group data, etc. (e.g. 1934). Backup data can be managed as snapshots which can be used to restore data 1944. Snapshot storage 1946 can maintain backup data in a number of formats. For example, a blockstore 1948 can include respective oplog ("operation log" from write operations on a database) store (e.g., 1950) for any nodes in the database, and respective blockstores for snapshots of database data stored in the primary and/or secondary databases. In another embodiment, backup data can be archived in a filesystem store 1954 including oplog stores at 1956 and a file system storage 1956 configured to hold backup database data. The backup daemon 1940 can be configured to manage storing of backup data to the snapshot storage and/or retrieval of the backup data (e.g., at 1958, 1960, and 1962). The backup daemon can also be configured to manage initial sync data and oplog entries in head databases (e.g., 1964-1978).

Figure 13:
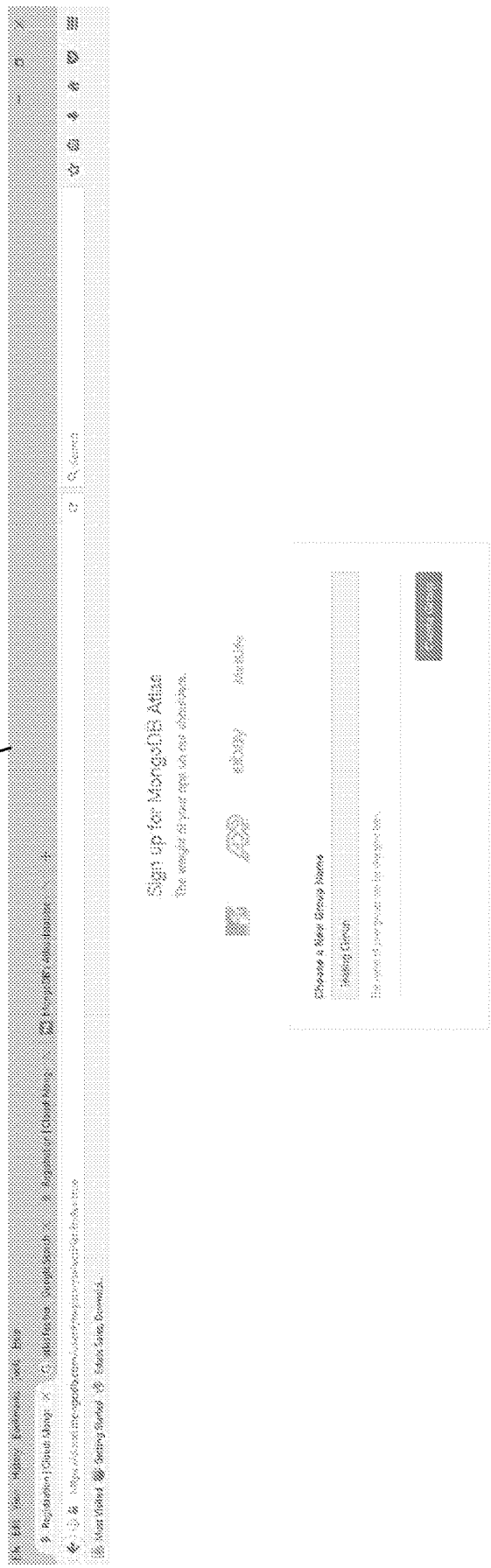
FIGS. 13-18 are example screen captures of user interfaces, according to one embodiment.

FIGS. 13-18 are screen captures of example user interfaces shown to end users during creation of an MongoDB database cluster. According to one embodiment, a user can access website and user interfaces of FIGS. 13-18 to provision a complete distributed database within minutes of accessing the website. FIG. 13 shows a user interface 1302.

Figure 14:
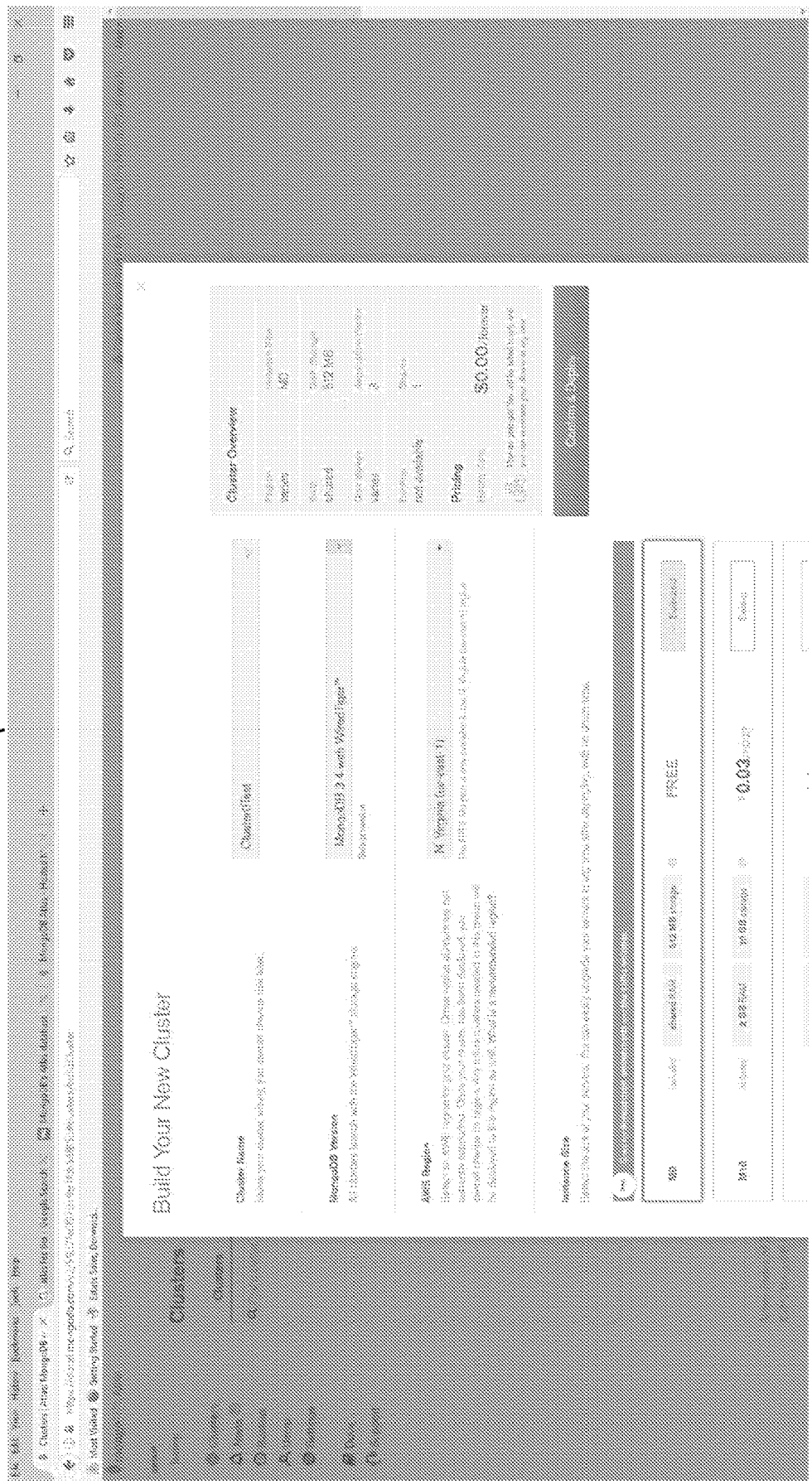
Figure 15:
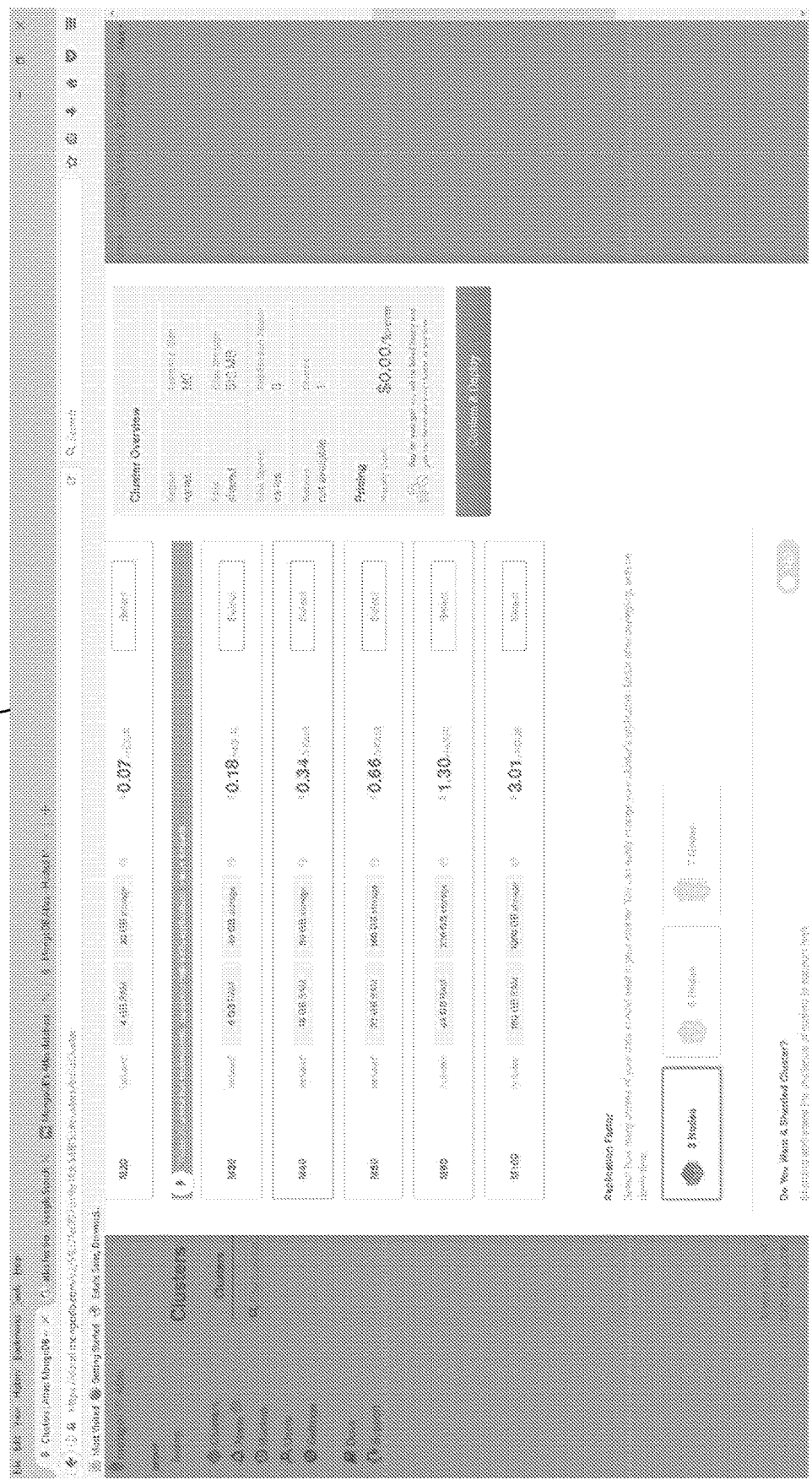
Figure 16:
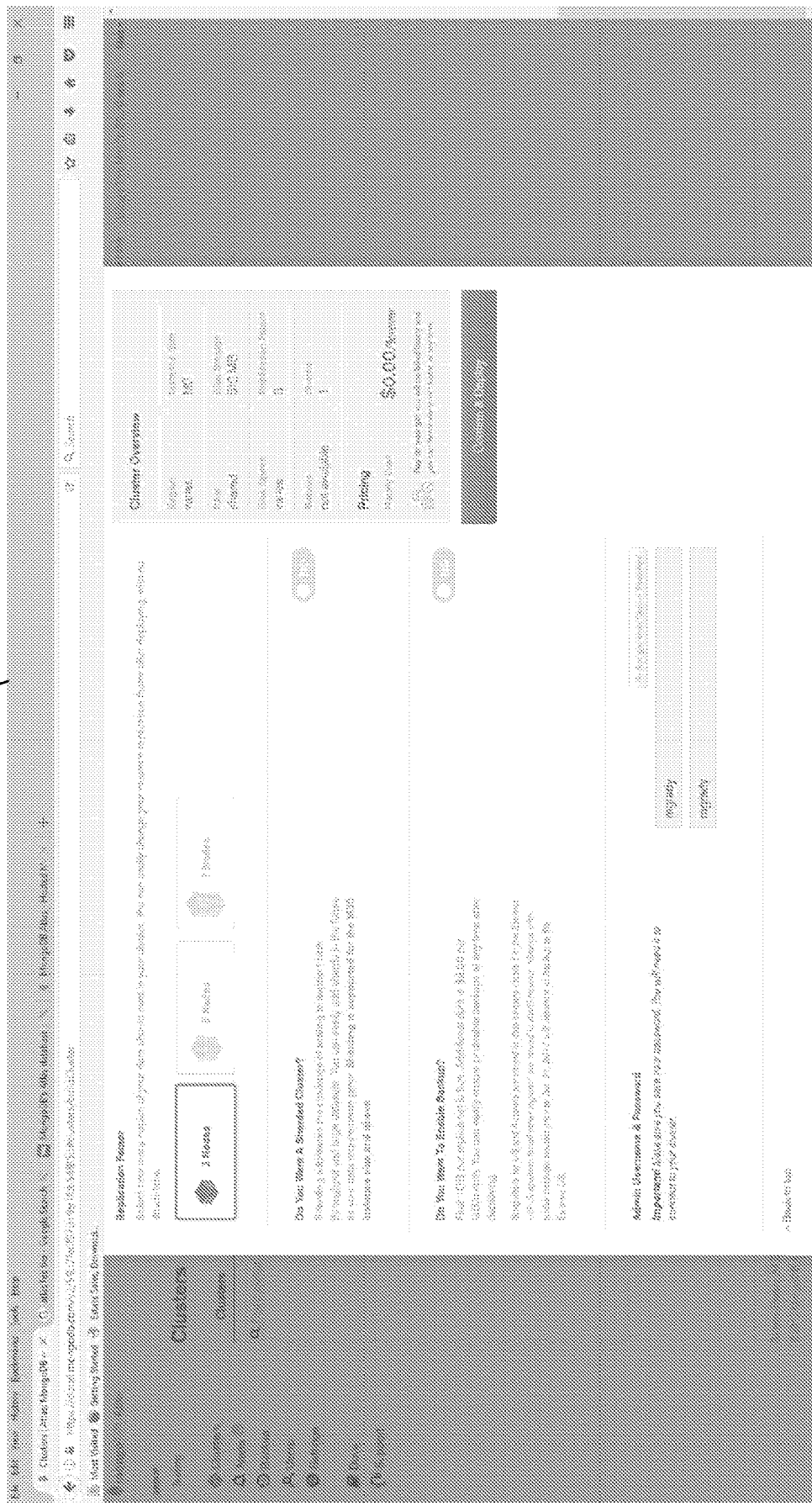
Figure 17:
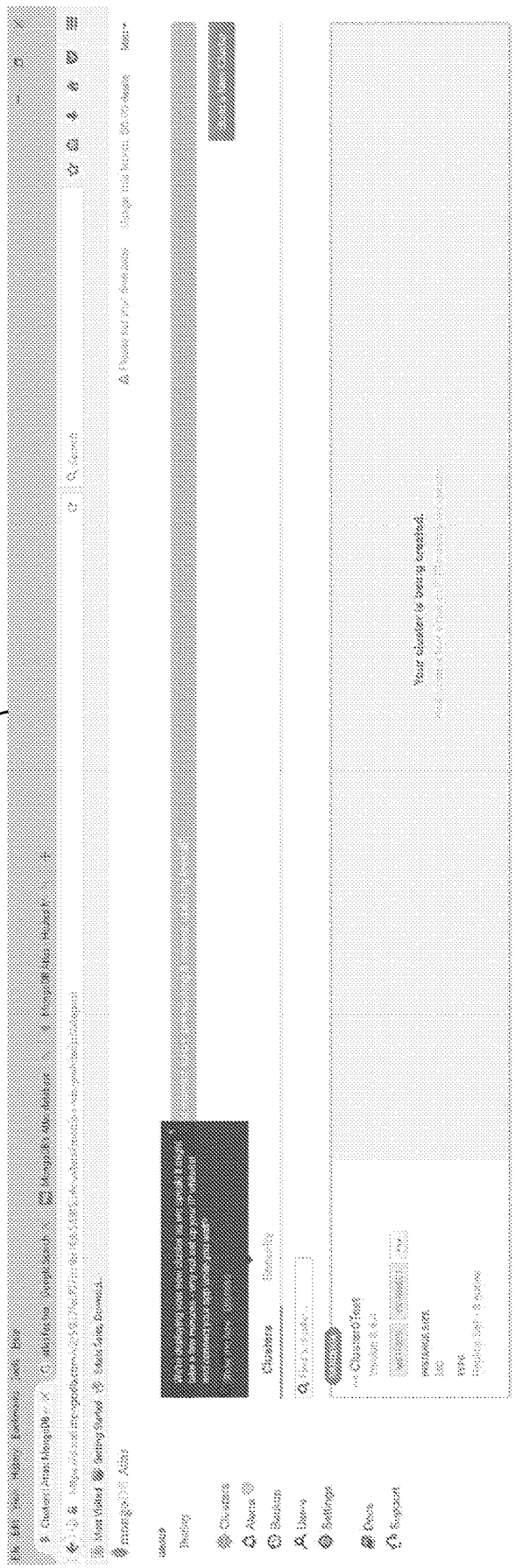
Figure 18:
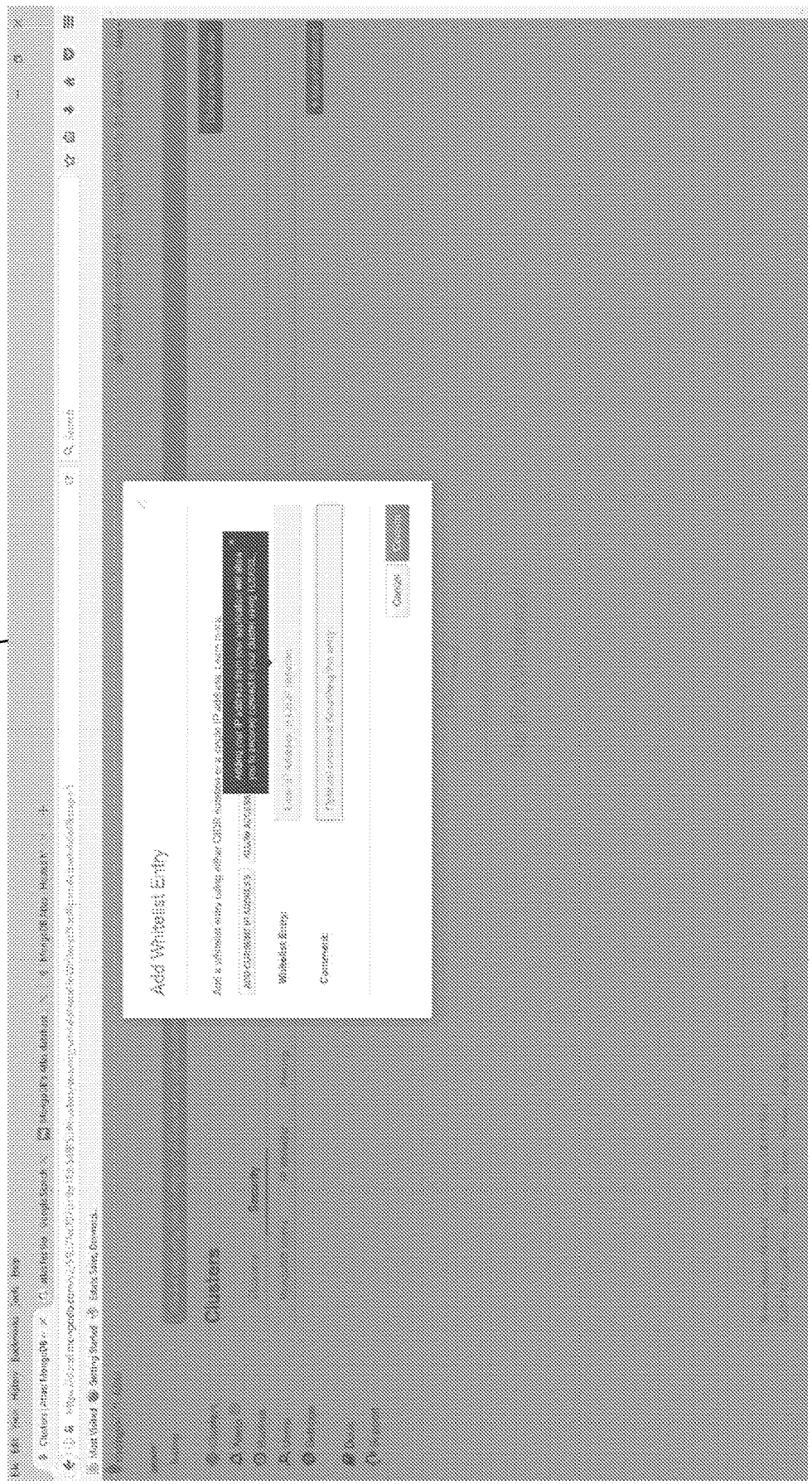
Figure 20:
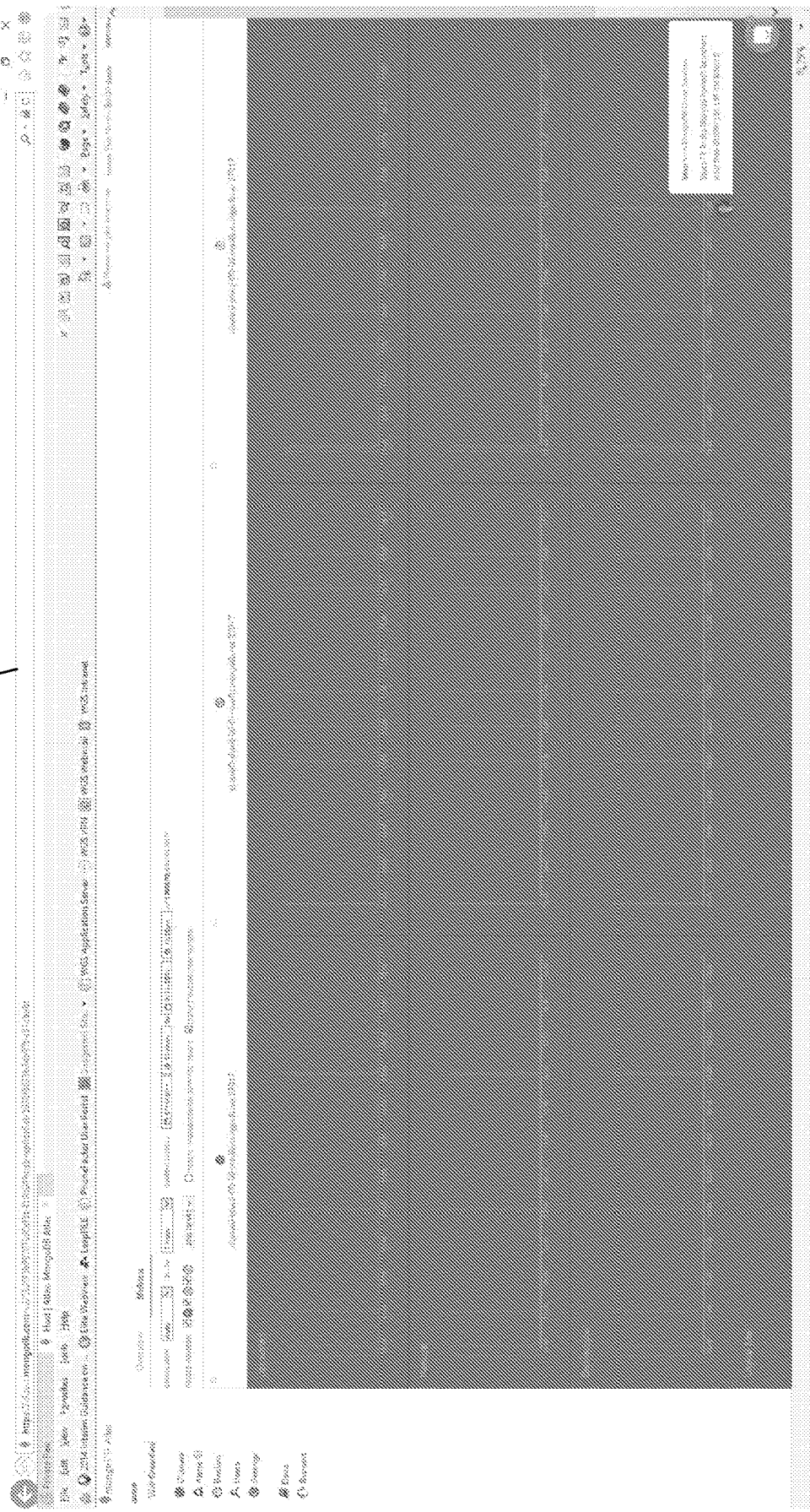
FIG. 20 is an example screen capture of a user interface, according to one embodiment.

FIG. 14 shows a user interface 1402. FIG. 15 shows a user interface 1502. FIG. 16 shows a user interface 1602. FIG. 17 shows a user interface 1702. FIG. 18 shows a user interface 1802. FIG. 20 shows a user interface 2002.

Shown in FIG. 13 an end user can access a provisioning service to create their own database server, without need of any hardware beyond a computer and internet connection. In the UI shown in FIG. 13, the user names a group which will contain a database cluster or clusters (e.g., a free cluster). In FIG. 14 the user interfaces accepts a name input for the cluster to create, a version for the database application and in some embodiments, specification of a storage engine to support the database application. Storages engines selection can include encrypted storage engines, as described in co-pending patent application Ser. No. 15/604,856 entitled "DISTRIBUTED DATABASE SYSTEMS AND METHODS WITH ENCRYPTED STORAGE ENGINES," filed on May 25, 2017, incorporated by reference herein in its entirety. Users can select regions for their database resources and specify instance size (e.g., FIGS. 14 and 15). The user interface is configured to display selections for a replication factor (i.e., a number of nodes in a replica set), sharding, and whether to enable automated backup services. Selection in the UI that change the cost for running the database are shown dynamically as resource selections are made in the UI (e.g., FIG. 16). FIG. 17 shows a cluster dashboard that is configures to display build status of the user defined cluster as it is instantiated on cloud resources. Once created the cluster dashboard can be used to monitor live performance statistics, and configured security settings. For example, users can defined IP addresses or CIDR ranges from within the cluster to create whitelist settings.

In some embodiments, including both sharded or replica set models, database monitoring services are built into the database deployment automatically (in some examples users can disable as desired). For example, resource monitoring processes are configured to detect database utilization and upon a detecting capacity condition: (1) alert to administrators; and/or (2) automatically provision new resources (e.g., new database instances) on a respective provider (e.g., 104A or 104B). In some embodiments, the cloud platform (e.g., 100) provides database as a service that is configured to be ready to be used in <5 minutes.

Other features of various embodiments include one or more or any combination of the following:
 Resource utilization monitoring (e.g., continuous monitoring, periodic monitoring, aperiodic monitoring) and billing options
  E.g., billing based on compute cycles
  Billing based on network utilization (etc.) (e.g., monitoring processes continually determine network utilization and establish resource usage schedule on which billing is generated by the system)
 Administrator Alerting
  System executed patching of resources (e.g., operating system, database version, executable or source updates) automatically with no downtime of resources
  Identify storage issues (e.g., determine database utilization is reaching capacity or may include lock conditions (e.g., identify excessive lock conditions (e.g., exceeds threshold number of locked record requests))
  System is configured to automatically provision temporary resources with upgrades enabled (installed) and manage a switch over to upgraded resources without downtime to the distributed database, and/or to avoid deadlocks, downtime, etc.
 Replica Set Model of database
  Example implementation provides three nodes—allows for take down of at least one node in the replica set without comprising accessibility
  Permits user defined maintenance window to limit when maintenance operations can happen on system (e.g., defined in cluster dashboard)
  Instantiate new resources (e.g., as a new node in the replica set) with upgrades and patches—trigger switch over in the user interface when ready, to the new resources, which yields zero downtime upgrades and/or maintenance—conventional systems fail to provide real zero downtime; alternatively can schedule switch over, for example, at low use times
 Auto-scale operations—for example where the system monitors usage characteristics and is configured to automatically provision resources to handle load, distribution, overload conditions, etc.—the system can automatically provision new cloud resources, automatically introduce a new node into a replica set, or to support a shard server, etc.
 Auto-heal operations (e.g., storage, patching, upgrade, etc.)
 Components that can be integrated can include (A) automation agents and/or monitor agents, (B) cloud administration services (e.g., MongoDB Cloud Manager, and/or (C) Ops Manager)
 Cloud based database as a service enables utilization of MongoDB databases at scale, and as a service
 Cloud Manager configured to handle multi-tenant implementation
  hosted solution with 1000s of distinct clusters/users
   Shared management/administration processes (e.g., logical control handled by central service—e.g., by the proxy layer) and/or management/monitoring server
   In some examples, respective databases do not share clusters/servers that respective users are deployed on
   Isolated clusters/networks
 In Some Use Cases:
  User defines
   Cloud compute size, memory, CPU, et.; Node size; Replication strategy; Shard y/n; Region (If any) and the system generates the distributed database (e.g., default configurations are used to simplify a myriad of choices needed to complete the install)—database default configurations used to complete creation of database without further intervention—and the database is generated
 Can include a Public Cloud API
  In some embodiments, the API is configured to take configuration information and provisions resources from various cloud providers (e.g., Google Cloud, Azure, AWS)
  Secure communication protocol configured—e.g., SSH (secure connect into provisioned instances) installs or connects with installed automation agents and/or monitor agents Connect agents to cloud manager processing (e.g., secure tunnels or connections established) automatically New instances per user configurations Default configurations of the database can include (e.g., default storage engine selection, etc.)

Vanilla configuration are pre-configured and made available to the users when default is desired (e.g., quick set up time or resources needed in minimal time)

Default configuration will include setup for authentication (in some embodiments configurations for secure communication (e.g., ssh) is always enabled))

Other APIs can be configured to enable:

Zones—Pin resources or data sets to geographic regions based on usage

Tiered region information

Provide globally distributed data

Manage hardware/resources allocations—monitoring processes identify conditions for optimization:

E.g., assign SSD to most frequently accessed data resources

Monitoring services identify most frequently accessed data or resources, and updates hardware/resource support to include solid state drives (SSD).

Query-able back ups

Example Environment and Implementation: MongoDB Deployments

MongoDB deployments, or "clusters" in Atlas (Atlas refers to a distributed database instantiated in the cloud and provided as a service), can be either a replica set or a sharded database. In one example, the system in configured to use MongoDB 3.2 with the WiredTiger storage engine. As new 3.2 maintenance releases become available, the system is configured to automatically upgrade to these releases via a rolling process to maintain cluster availability. In some embodiments, the system is configured to deploy each cluster across a minimum of three availability zones and with mandatory security settings. The system's clusters can be established single-tenant and deployed on servers allocated specifically to the cluster.

Security Examples

Various embodiment secure a deployment through the use of TLS/SSL, virtual private cloud (VPC) subnet with IP whitelisting IP whitelists, and user authentication using SCRAM-SHA1 and authorization.

Example embodiments And Features Described (other embodiments can incorporate the same features with different databases)

References to Atlas herein are used to describe various embodiments of a cloud implemented and distributed database system. The features described with respect to the embodiment can be used together or used separately in various implementations.

Support: At least one embodiment provides support functions and/or help base shat session covering the use of the service itself.

Create User Account: To get started with Atlas, create a user account and log in to Atlas. If client is MongoDB Cloud Manager user, client can also use MongoDB Cloud Manager credentials. Once logged in, create an Atlas group.

Create an Atlas Group: Group are a logical unit for managing MongoDB deployments. Amin users can give other Atlas users access to the user's group, allowing them to log into the group and manage the user's deployments.

Once the user create the user's Atlas user account and log in: Enter the name of the user's new group. Choose a globally unique name for the group. For security and auditing reasons, do not use a name used earlier. The system can be configured to prevent duplicate naming. Notes for users, in some implementations, the group's name cannot be changed—thus for any example implementation limiting name configurations, the user receives a warning message at creation. Atlas takes the user to the Clusters view to create the user's first MongoDB cluster or deployment.

Create a cluster functions: User interface prompts are displayed by the system. A user can follow the prompts to create the cluster—the cluster defines the architecture of the database within the named group. A MongoDB cluster can be either a replica set or a sharded cluster (user selectable option in the UI). MongoDB deployments, or "clusters" in Atlas, can be either a replica set or a sharded cluster. In one example, for the deployments, Atlas uses MongoDB 3.2 with the WiredTiger storage engine by default. In some alternatives, default selections can be overridden in the UI. Atlas clusters are configured for single-tenant and deployed on servers allocated specifically to the cluster. In other embodiments, a most recent database version will be selected by the system as well as a most recent version of a database storage engine. An Atlas group can have multiple MongoDB clusters.

Create a Cluster: to create a cluster, go to the Clusters view (shown in the UI) and click the Add New Cluster or Build a New Cluster button (displayed in the UI). For example, a user may configure a cluster as described in the steps below. As users create a cluster, Atlas displays the associated costs (e.g., on the fly calculations of costs for any selections. If no MongoDB user exists for the user's Atlas group, the user will also create the user's first MongoDB user. In some examples, the user must save the admin user and password or the user can lose administrative access to the MongoDB databases (e.g., until the user resets the password). If the user chooses to have Atlas generate the admin password, warning screens are displayed to remind the user to save the password when it is displayed. Atlas can be configured to only display admin passwords once.

Next Function Example: Go to the Clusters view. Go to the Clusters view and click the Add New Cluster or Build a New Cluster button.Configure the user's cluster in the user interface. Atlas provides the configuration options described in the table below. As the user make selections, Atlas displays the associated costs. When the user complete the configuration, enter the user's payment information.

Configuration Option Description

Cluster Name The name as it will appear in Atlas.

Region The physical location of the user's MongoDB cluster. The region the user choose can affect network latency for clients accessing the user's databases.

The region selected for the first cluster in the Atlas group determines the region for all clusters in that group. This is because a region-specific Virtual Private Cloud (VPC) is created for the Atlas group during the deployment of the group's first cluster. Pricing for cluster configuration settings vary by region.

Instance Size define the memory, storage, and IOPS specification for each data-bearing server for the user's Atlas cluster. In one example each instance size comes with a default set of resources, but users can customize the servers to meet use cases.

For replica sets, the data-bearing servers are the servers hosting the replica set members. For sharded clusters, the data-bearing servers are the servers hosting the shards. For sharded clusters, Atlas also deploys servers for the config servers; these are charged at a rate separate from the instance costs. In some examples, the user interfaces are configured to accept users modification of the following: (modifying the capacity and storage speed affects the cost)

Custom Storage Capacity: The size of the server root volume.

Custom Storage Speed: The input/output operations per second (IOPS) the system can perform.

Use encrypted storage volumes: Encrypts root volume using Amazon EBS encryption for data at rest inside the volume and all data moving between the volume and the instance.

In some examples with a sharded cluster, the selected instance size must be M50 or larger.

Replication Factor The number of replica set members. Each member keeps a copy of the user's database, providing high availability and data redundancy.

Some examples require that the replica set spans a minimum of three availability zones, and each member of the replica set runs on a separate instance. For details on how the number of server instances affects cost, see Number of Servers. If the user's deployment is a sharded cluster, each shard is a replica set, and the replica factor determines the number of members in each shard replica set.

Do the user want a sharded cluster? Sharded clusters support horizontal scaling and consists of shards, config servers and router programs. For a sharded cluster, the selected instance size must be M50 or larger. •Atlas deploys each shard as a replica set, consisting of the number of members specified by the replication factor. The shard servers have the selected instance size. •Atlas deploys the config servers as a three-member replica set. The config servers run on M30 instances. •Atlas deploys six routers (mongos programs) for a sharded cluster. Atlas runs the routers on the shard servers.

Do the user want to enable backup? If enabled, Atlas takes snapshots of the user's databases at regular intervals and retains them according to the user's group's retention policy.

Admin Username & Password Creates a MongoDB admin user with the specified username and password. These fields appear only if no MongoDB user exists for the user's Atlas group, such as if the user are creating the first cluster in the group and have not set up MongoDB users beforehand.

When creating a new admin user, be sure to save the credentials. The admin user has read and write access to any MongoDB database in any cluster in the user's Atlas group. The admin user can also enable sharding. To have Atlas generate the password for the admin user, click Generate Secure Password. If the user choose to have Atlas generate the password, Atlas displays it only once.

Save the user's admin credentials. In some examples once a new MongoDB admin user is created, the user must save the admin user and password or the user will lose administrative access to the user's MongoDB databases until the user reset the password. Enter Payment Information. Click Confirm & Deploy to enter payment information.

Next Steps
    To continue setting up the cluster, see:
    Set up security (below)
    Connect to the cluster (below).
    To change the cluster configuration after deployment, see Scale a Cluster. Atlas secures the user's databases through encrypted communication protocols (e.g., TLS/SSL), virtual private cloud (VPC), whitelists, and user authentication and access control.

TLS/SSL
    In one example, Atlas uses TLS/SSL to encrypt the connections to the user's databases.

Virtual Private Cloud (VPC)
    In some embodiments, a region-specific Virtual Private Cloud (VPC) is created for the Atlas group during the deployment of the group's first cluster.
    Add IP Addresses to the Whitelist
    Atlas allows client connections to the cluster only from IP addresses on the group's whitelist; i.e. a client can connect to the MongoDB deployment only from an IP address on the whitelist specified at creation. The whitelist applies to all clusters in the group. To add an IP address or an address range to the whitelist, from the Clusters view in the user interface, select the Security tab to display the security screen, click IP Whitelist in the security screen, then Add IP Address to trigger the functionality to add an IP address to the whitelist and enable connections with that IP address.

Go to IP Whitelist view.
    From the Clusters view, select the Security tab, then IP Whitelist.
    Click Add IP Address.
    Enter an IP address or addresses.
    Important in some examples: ensure that the user add the IP address the user will use to access MongoDB as the admin user. Enter the desired IP address or CIDR-notated range of addresses:

Entry Grants
    An IP address Access from that address.
    A CIDR-notated range of IP addresses Access from the designated range of addresses. The Internet provides online tools for converting a range of IP addresses to CIDR, such as http://www.ipaddressguide.com/cidr.
    0.0.0.0/0 Unrestricted access. All IP addresses have access to the user's group's clusters.
    Click Save and Close in the user interface. To add more entries to the whitelist, repeat this procedure in the user interface.

Create a New MongoDB User for the Cluster
    Create MongoDB users to provide clients access to the clusters in the user's group. A MongoDB user's access is determined by the roles assigned to the user.
    To create a new MongoDB user, from the Clusters view, select the Security tab, then click Users, then Add New User.
    MongoDB users are separate from Atlas users. MongoDB users have access to MongoDB databases, while Atlas users access to the Atlas application itself.
    Note: When the user create a MongoDB user, the user is added to all clusters in the user's Atlas group.
    Go to Users view. (in user interface display). To create a new MongoDB user, from the Clusters view, select the Security tab, then Users.
    Click Add New User.
    Enter user information.
    Field Description
    User Name The user's login name.
    Database The database to which the user authenticates. The user's name and authentication database serve as a unique identifier for that user. That is, if two users have the same name but are created in different databases, they are two separate users. Note in various embodiments a user's access is not restricted by this selection. By assigning to the user roles in other databases, a user created in one database can have permissions to act on other databases.

Roles The actions a user can perform on specified databases. A given role can be granted for a specific database or for all databases. the user can assign a user roles on different databases. the user can assign the following roles:

Roles available in the admin database: •backup •clusterMonitor •enableSharding. Allows the MongoDB user to enable sharding on a database and to shard a collection. See the enableSharding privilege action in the MongoDB manual. •readAnyDatabase •readWriteAnyDatabase Roles available in any database. Specify the role in the form role@dbname. •read User must specify the database; e.g. read@test for read role on the test database or read@admin for read role on the admin database. •readWrite System requires user to specify the database; e.g. readWrite@test for readWrite role on the test database or readWrite@admin for readWrite role on the admin database.

Password The user's password. Users can change their passwords. In one embodiment, Atlas clusters use SCRAM-SHA-1 to authenticate MongoDB users. According to one embodiment, the system displays a "Click Add User" option. In response the system is configured to provide detail to connect to a cluster via the mongo shell or a MongoDB driver. Examples Prerequisites •TLS/SSL (or any secure communication protocol) In some embodiments, clients must have support for TLS/SSL to connect to an Atlas cluster. Note for some examples: If using the mongo shell, recommended to use version 3.2.6 or later binary with TLS/SSL support. To download the binary, see Download Center and download the Server package with TLS/SSL support; the Server package includes the mongo shell. •Whitelist: To access a cluster the user must connect from an IP address on the cluster's whitelist. If the user have not done so, add the user's IP address to the whitelist. the user can also add an IP address to the whitelist when retrieving connection information.

Connect to the User's Cluster

To view connection specification details for a cluster, go to the Clusters view in the user interface From the Clusters view, click Clusters tab. For the cluster to which the user wish to connect, click Connect. Atlas displays the details to connect to the cluster via a mongo shell or a MongoDB driver. For the connection details for the mongo shell, click the Mongo Shell tab; for the MongoDB Driver, click the MongoDB Drivers tab.

Connect to the Cluster.

Use the displayed connection details to connect to the cluster via a mongo shell or via a MongoDB Driver. The connection details use the MongoDB administration user and password set up for the group. Update the PASSWORD placeholder with the password for the user. To connect with a different MongoDB user, replace the user name and password in the connection details. For examples of connecting via the MongoDB Drivers, see Driver Connection (below). The Connect dialog for a cluster provides the URI string to use to connect via the MongoDB drivers.

In the connection string, replace PASSWORD with the password for the user.

The following examples use the connection string to authenticate and connect to an Atlas cluster. In the examples, PASSWORD has been replaced with the password (myRealPassword) for the user key.

In some examples, if the password contains reserved URI characters, the user must escape the characters per RFC 2396. For example, if the user's password is @bc123, the user must escape the @ character when specifying the password in the connection string; i.e. %40bc123.

C Driver Example
client=mongoc_client_new ("mongodb://kay:myRealPassword@mycluster0-shard-00-00-wpeiv.mongodb.net:27017,mycluster0-shard-00-01-wpeiv.mongodb.net:27017,mycluster0-shard-00-02-wpeiv.mongodb.net:27017/admin?replicaSet=Mycluster0-shard-O&ssl=true");

C++ Driver Example
include <mongocxx/client.hpp>
include <mongocxx/instance.hpp>
// . . .
mongocxx::instance inst{ };
mongocxx::client conn{mongocxx::uri{"mongodb://kay:myRealPas sword@mycluster0-shard-00-00-wpeiv.mongodb.net:27017,mycluster0-shard-00-01-wpeiv.mongodb.net:27017,mycluster0-shard-00-02-wpeiv.mongodb.net:27017/admin?replicaSet=Mycluster0-shard-0&ssl=true"}};

C#/.Net Driver Example
var client=new MongoClient("mongodb://kay:myRealPas sword@mycluster0-shard-00-00-wpeiv.mongodb.net:27017,mycluster0-shard-00-01-wpeiv.mongodb.net:27017,mycluster0-shard-00-02-wpeiv.mongodb.net:27017/admin?replicaSet=Mycluster0-shard-Ms sl=true");

Java Driver Example
MongoClientURI uri=new MongoClientURI(
  "mongodb://kay:myRealPassword@mycluster0-shard-00-00-wpeiv.mongodb .net: 27017,mycluster0-shard-00-01-wpeiv.mongodb .net:27017,mycluster0-shard-00-02-wpeiv.mongodb.net:27017/admin?replicaSet=Mycluster0-shard-0&ssl=true");
MongoClient mongoClient=new MongoClient(uri);
MongoDatabase database=mongoClient.getDatabase ("test");

Node.js Driver Example
var MongoClient=require('mongodb').MongoClient;
var uri="mongodb://kay:myRealPassword@mycluster0-shard-00-00-wpeiv.mongodb.net:27017,mycluster0-shard-00-01-wpeiv.mongodb.net:27017,mycluster0-shard-00-02-wpeiv.mongodb.net:27017/admin?replicaSet=Mycluster0-shard-O&ssl=true"; MongoClient.connect(uri, function(err, db) {
  db.close( );
});

Perl Driver Example
my $client=MongoDB->connect("mongodb://kay:myRealPassword@mycluster0-shard-00-00-wpeiv.mongodb.net:27017,mycluster0-shard-00-01-wpeiv.mongodb.net:27017,mycluster0-shard-00-02-wpeiv.mongodb.net:27017/admin?replicaSet=Mycluster0-shard-0&ssl=true");

PHP Driver Example
$client=new MongoDB\Client(
  'mongodb://kay:myRealPassword@mycluster0-shard-00-00-wpeiv.mongodb.net:27017,mycluster0-shard-00-01-wpeiv.mongodb.net:27017,mycluster0-shard-00-02-wpeiv.mongodb.net:27017/admin?replicaSet=Mycluster0-shard-0&ssl=true');

Python Driver Example
client=pymongo.MongoClient("mongodb://kay:myRealPas sword@mycluster0-shard-00-00-wpeiv.mongodb.net:27017,mycluster0-shard-00-01-wpeiv.mongodb.net:27017,mycluster0-shard-00-02-wpeiv.mongodb.net:27017/admin?replicaSet=Mycluster0-shard-0&ssl=true")

Ruby Driver Example
client=Mongo::Client.new('mongodb://kay:myRealPassword@mycluster0-shard-00-00-wpeiv.mongodb.net:27017,mycluster0-shard-00-01-wpeiv.mongodb- .net:27017,mycluster0-shard-00-02-wpeiv.mongodb.net:
27017/admin?replicaSet=Mycluster0-shard-0&ssl=true')
Scala Driver Example
val uri: String="mongodb://kay:myRealPassword@mycluster0-shard-00-00-wpeiv.mongodb.net:27017,mycluster0-shard-00-01-wpeiv.mongodb.net:27017,mycluster0-shard-00-02-wpeiv.mongodb.net:27017/admin?replicaSet=Mycluster0-shard-O&ssl=true"
System.setProperty("org.mongodb.async.type", "netty")
val client: MongoClient=MongoClient(uri)

Scale a Cluster

For an existing Atlas cluster in the user's group, the user can modify: the instance size, the replication factor, the cluster topology from a replica set to a sharded cluster, the number of shards for a sharded cluster, the enabling or disabling of backup. Some configuration changes require migration to new servers; e.g. changing the instance size. To provide continuous availability, scaling migrations are performed in a rolling fashion. However, depending on the amount of data to migrate, migrations can take a significant amount of time.

Scale an Existing Cluster Example: Go to the Clusters view in the user interface, From the Clusters view, click Configuration for the cluster the user want to modify, Atlas displays the configuration screen for the cluster.

Modify the cluster configuration example: For an existing cluster, the user can modify the fields listed in the table below. As the user make changes, Atlas displays the updated costs.

Option Description

Instance Size System accepts user specified changes the memory, storage, and IOPS (speed) specification.

Replication Factor System accepts user specified changes in the number of members in the user's cluster's replica set. The replica set spans a minimum of three availability zones, and each member of the replica set runs on a separate instance. For details on how the number of server instances affects cost, see Number of Servers.

If the user's deployment is a sharded cluster, each shard is a replica set, and the replica factor determines the number of members in each shard replica set.

For more information on replica sets, see Replication in the MongoDB manual.

Does the user want a sharded cluster? If the user's cluster is a replica set, the user can change the deployment to a sharded cluster. Sharded clusters support horizontal scaling. For a sharded cluster, the selected instance size must be M50 or larger.

Atlas deploys each shard as a replica set, consisting of the number of members specified by the replication factor. The shard servers have the selected instance size.

Atlas deploys the config servers as a three-member replica set. The config servers run on M30 instances.

Atlas deploys six routers (mongos programs) for a sharded cluster. Atlas runs the routers on the shard servers. For details on how the number of server instances affects cost, see Number of Servers. For more information on sharded clusters, see Sharding in the MongoDB manual.

In some embodiments, changing to a sharded cluster requires a new connection string for accessing MongoDB. For the new connection string, see Connect to a Cluster after the changes are deployed. the user must update the user's applications to use the new string. Number of Shards: This field appears only if the value for Do the user want a sharded cluster? is Yes. the user can increase or decrease the number of shards. the user cannot have fewer than two shards. Does the user want to enable backup? If enabled, Atlas takes snapshots of the user's databases at regular intervals and retains them according to the user's group's retention policy. the user can restore a backup to the same cluster or any cluster in the user's group that has the same topology. Click Confirm & Deploy in the user interface.

MongoDB Reference

For a comprehensive documentation of MongoDB, refer to the MongoDB Manual. The following sections in the manual provide some starting points for developing with MongoDB.

Sections Description

Introduction Introduction to MongoDB, including: •Databases and Collections •Documents CRUD and Aggregation Create, Read, Update, Delete and Aggregation operations with MongoDB, including: •Insert Documents •Query Documents •Update Documents •Remove Documents •Aggregation Framework Indexes Indexes and indexing strategies.

Data Modeling Data model design and examples with MongoDB.

Replica Sets Introduction to replica sets.

Sharded Clusters Sharded clusters and considerations for sharding, including: •Introduction to Sharding •Enable Sharding for a Database •Shard a Collection Available Drivers List of available MongoDB drivers.

Atlas provides the following ways to monitor the user's cluster's performance.

Performance Metrics

Atlas collects and displays metrics on the state of the user's cluster's databases and on server usage. Metrics provide an indication of when the user must modify the user's database configuration or add server capacity—various examples are discussed herein.

Alerts

Atlas notifies the user when the user's database operations or server usage reach thresholds that affect the user's cluster's performance. Examples are discussed below with respect to responding to alerts and configuration of alert settings, among other examples.

MongoDB Logs

Each database instance (e.g., a mongod—database application daemon) and each database router (e.g., mongos) process keeps an account of its activity in a log file. To view logs, the UI provides a Clusters options, and within that display a MongoDB Logs tab. The system is configured to respond to a browser refresh, e.g., in the user's browser, to visualize new entries. In some embodiments, the system is configured to allow users to optionally disable log collection for the user's group. Atlas will continue to display previously collected log entries but will cease to collect new log data. To disable log collection, click Settings in the UI, then select Group Settings in the UI. The system enables setting Collect Logs For All Hosts to Off.

Monitor Atlas Cluster

Atlas collects metrics for the user's cluster and provides charts for analyzing the data collected. Atlas warns the user if disk use, IOPS, or database operations exceed certain thresholds.

To view metrics, beginning from a Clusters view UI, the system provides a Clusters tab and a display for Metrics—responsive to selection the UI displays current metrics.

Alerts Examples

Atlas issues alerts for the database and server conditions configured in the user's alert settings. When a condition triggers an alert, Atlas displays a warning symbol on the cluster and sends alert notifications. the user's alert settings determine the notification methods. Atlas continues sending notifications at regular intervals until the condition resolves or the user delete or disable the alert.

View Alerts

To view an alert, the system provides an the Alerts tab.

Acknowledge Alerts

In some embodiments, the system requests and/or requires that the end user acknowledge an alert. The system enables users to acknowledge an alert via an Alerts tab displayed in the UI—locate the alert in the tab display, and select the Acknowledge option next to the alert. If an alert uses PagerDuty for alert notifications, the systems allows the user to acknowledge the alert only on the user's PagerDuty dashboard. When the user acknowledge an alert, Atlas sends no further notifications until either the acknowledgement period ends, the user resolve the alert condition, or the user unacknowledged alert. If an alert condition ends during an acknowledgment period, Atlas sends a notification.

Increase Cluster Capacity

To resolve an alert by increasing the user's cluster's capacity—options for scaling a cluster are discussed herein.

View all Activity

According to one embodiment, to view cluster events, the system displays an Alerts tab, then selection the All Activity display—cluster based events are then shown in the UI. The system allows the user to filter the list by date and by activity type. To download the list, click the Download Activity Feed button—the system is configured to transfer the respective data based on user selection.

Users can also select which conditions trigger alerts and how users are notified—the system enables and executed user defined trigger conditions.

Default Alert Settings

Atlas provides the following default alerts for a new group (e.g., automatically):

No Primary

Cluster database router (e.g., Mongos) Is Missing

Disk space used (%) for Data is

Disk I/O utilization (%) for Data is

Added to Group

Users awaiting approval to join group

Service suspended due to unpaid invoice(s) more than 30 days old

Credit card is about to expire

Notification Options

When the user configure an alert, the user select how notifications are sent. the user can select multiple notification methods, such as email, text message, or team collaboration tools.

To use certain notification methods, the user must first enter default values in Group Settings, accessed through the Settings tab. Atlas fills in the default values automatically when the user select that notification method. If a default value becomes invalid, Atlas sends an email to the group owner. The following notification methods require default values in Group Settings:

PagerDuty

Flowdock

HipChat

Slack

Webhook

Configure an Alert

When the user create a new alert the user have the option of using an existing alert setting as a template. Click Alerts. Choose whether to clone an existing alert setting as a template. To create a new alert without cloning an existing setting, click the Add button and select New Alert. To clone an existing setting, click the Alert Settings tab; Locate the alert setting; Click the ellipsis icon and select Clone. Select the condition that triggers the alert. In the Alert if section, select the target component and the condition. For explanations of alert conditions, see Alert Conditions. Apply the alert only to specific targets. (Optional). If the options in the For section are available, the user can optionally filter the alert to apply only to a subset of the targets. The matches field can use regular expressions. Select the alert recipients and delivery methods. In the Send to section, click Add and select from the options described below. To help eliminate false positives, set the time to elapse before the condition triggers the alert.

Notification Option Description

Group Sends the alert to a group, either by email or SMS. SMS uses the number configured for each user's account. To send to specific roles, deselect All Roles and select the roles.

Atlas User sends the alert to a user, either by email or SMS. SMS uses the number configured for the user's account.

Email Sends the alert to an email address.

SMS Sends the alert to a mobile number. Atlas removes all punctuation and letters and uses only the digits. If the user are outside of the United States or Canada, include '011' and the country code. For example, for New Zealand enter '01164' before the phone number. As an alternative, use a Google Voice number. Atlas uses the U.S.-based Twilio to send SMS messages.

HipChat Sends the alert to a HipChat room message stream. Enter the HipChat room name and API token.

Slack Sends the alert to a Slack channel. Enter the channel name and either an API token or a Bot token. To create an API token, see the https://api.slack.com/web page in the user's Slack account. For information on Bot users in Slack, see https://api.slack.com/bot-users.

Flowdock Sends the alert to a Flowdock account. Enter the following:Org Name: The Flowdock organization name in lower-case letters. This is the name that appears after www.flowdock.com/app/in the URL string.

Flow Name: The flow name in lower-case letters. The flow name appears after the org name in the URL string: www.flowdock.com/app/orgname/flowname. The flow name also appears in the "flow email address" setting in Flowdock. For example: flowname@example.flowdock.com.

User API Token: the user's Flowdock "personal API token" found on the https://www.flowdock.com/account/tokens page of the user's Flowdock account.

PagerDuty Enter only the service key. Define escalation rules and alert assignments in PagerDuty.

Webhook Sends an HTTP POST request to an endpoint for programmatic processing. The request body contains a JSON document that uses the same format as the Public API's Alerts resource. This option is available only if the user have configured Webhook settings on the Group Settings page.

Click Save.

Examples for Delete or Disable an Alert

If the user delete or disable an alert setting, Atlas cancels active alerts related to the setting. A disabled alert setting remains visible but grayed-out and can be later re-enabled. In some embodiments, a deleted alert setting does not remain visible. This page describes some of the conditions for which the user can trigger alerts related to the user's clusters. the user specify conditions and thresholds when configuring alerts.

Host Alerts

The conditions in this section apply if the user select Host as the alert target when configuring the alert. the user can apply the condition to all hosts or to specific type of host, such as primaries or config servers.

Asserts

The following alert conditions measure the rate of asserts for a MongoDB process, as collected from the MongoDB serverStatus command's asserts document. the user can view asserts through cluster monitoring.

Asserts: Regular is
Sends an alert if the rate of regular asserts meets the specified threshold.
Asserts: Warning is
Sends an alert if the rate of warnings meets the specified threshold.
Asserts: Msg is
Sends an alert if the rate of message asserts meets the specified threshold.
Message asserts are internal server errors. Stack traces are logged for these.
Asserts: User is
Sends an alert if the rate of errors generated by users meets the specified threshold.

Opcounter

The following alert conditions measure the rate of database operations on a MongoDB process since the process last started, as collected from the MongoDB serverStatus command's opcounters document. the user can view opcounters through cluster monitoring.

Opcounter: Cmd is
Sends an alert if the rate of commands performed meets the specified threshold.
Opcounter: Query is
Sends an alert if the rate of queries meets the specified threshold.
Opcounter: Update is
Sends an alert if the rate of updates meets the specified threshold.
Opcounter: Delete is
Sends an alert if the rate of deletes meets the specified threshold.
Opcounter: Insert is
Sends an alert if the rate of inserts meets the specified threshold.
Opcounter: Getmores is
Sends an alert if the rate of getmore operations to retrieve the next cursor batch meets the specified threshold. See Cursor Batches in the MongoDB manual.

Opcounter—Repl (replication)

The following alert conditions measure the rate of database operations on MongoDB secondaries, as collected from the MongoDB serverStatus command's opcountersRepl document. the user can view these metrics on the Opcounters—Repl chart, accessed through cluster monitoring.

Opcounter: Repl Cmd is
Sends an alert if the rate of replicated commands meets the specified threshold.
Opcounter: Repl Update is
Sends an alert if the rate of replicated updates meets the specified threshold.
Opcounter: Repl Delete is
Sends an alert if the rate of replicated deletes meets the specified threshold.
Opcounter: Repl Insert is
Sends an alert if the rate of replicated inserts meets the specified threshold.

Memory

The following alert conditions measure memory for a MongoDB process, as collected from the MongoDB serverStatus command's mem document. the user can view these metrics on the Atlas Memory and Non-Mapped Virtual Memory charts, accessed through cluster monitoring.

Memory: Resident is
Sends an alert if the size of the resident memory meets the specified threshold. It is typical over time, on a dedicated database server, for the size of the resident memory to approach the amount of physical RAM on the box.
Memory: Virtual is
Sends an alert if the size of virtual memory for the mongod process meets the specified threshold. the user can use this alert to flag excessive memory outside of memory mapping. For more information, click the Memory chart's i icon.
Memory: Computed is
Sends an alert if the size of virtual memory that is not accounted for by memory-mapping meets the specified threshold. If this number is very high (multiple gigabytes), it indicates that excessive memory is being used outside of memory mapping. For more information on how to use this metric, view the Non-Mapped Virtual Memory chart and click the chart's i icon.

Connections

The following alert condition measures connections to a MongoDB process, as collected from the MongoDB serverStatus command's connections document. the user can view this metric on the Atlas Connections chart, accessed through cluster monitoring.

Connections is
Sends an alert if the number of active connections to the host meets the specified average.

Queues

The following alert conditions measure operations waiting on locks, as collected from the MongoDB serverStatus command's globalLock document. the user can view these metrics on the Atlas Queues chart, accessed through cluster monitoring.

Queues: Total is
Sends an alert if the number of operations waiting on a lock of any type meets the specified average.
Queues: Readers is
Sends an alert if the number of operations waiting on a read lock meets the specified average.
Queues: Writers is
Sends an alert if the number of operations waiting on a write lock meets the specified average.

Page Faults

The following alert condition measures the rate of page faults for a MongoDB process, as collected from the MongoDB serverStatus command's extra_info.page_faults field.

Page Faults is
Sends an alert if the rate of page faults (whether or not an exception is thrown) meets the specified threshold. the user can view this metric on the Atlas Page Faults chart, accessed through cluster monitoring.

Cursors

The following alert conditions measure the number of cursors for a MongoDB process, as collected from the MongoDB serverStatus command's metrics.cursor document. the user can view these metrics on the Atlas Cursors chart, accessed through cluster monitoring.

Cursors: Open is
  Sends an alert if the number of cursors the server is maintaining for clients meets the specified average.
Cursors: Timed Out is
  Sends an alert if the number of timed-out cursors the server is maintaining for clients meets the specified average.
Network
  The following alert conditions measure throughput for MongoDB process, as collected from the MongoDB serverStatus command's network document. the user can view these metrics on a host's Network chart, accessed through cluster monitoring.
  Network: Bytes In is
  Sends an alert if the number of bytes sent to MongoDB meet the specified threshold.
  Network: Bytes Out is
  Sends an alert if the number of bytes sent from MongoDB meet the specified threshold.
  Network: Num Requests is
  Sends an alert if the number of requests sent to MongoDB meet the specified average.
Replication Oplog
  The following alert conditions apply to the MongoDB process's oplog. the user can view these metrics on the following charts, accessed through cluster monitoring:
  Replication Oplog Window
  Replication Lag
  Replication Headroom
  Oplog GB/Hour
The following alert conditions apply to the oplog:
  Replication Oplog Window is
  Sends an alert if the approximate amount of time available in the primary's replication oplog meets the specified threshold.
  Replication Lag is
  Sends an alert if the approximate amount of time that the secondary is behind the primary meets the specified threshold. Atlas calculates replication lag using the approach described in Check the Replication Lag in the MongoDB manual.
  Replication Headroom is
  Sends an alert when the difference between the primary oplog window and the replication lag time on a secondary meets the specified threshold.
  Oplog Data per Hour is
  Sends an alert when the amount of data per hour being written to a primary's oplog meets the specified threshold.
DB Storage
  The following alert conditions apply to database storage, as collected for a MongoDB process by the MongoDB dbStats command. The conditions are based on the summed total of all databases on the MongoDB process:
  DB Storage is
  Sends an alert if the allocated storage meets the specified threshold. This alert condition can be viewed on a host's database Storage chart, accessed through cluster monitoring.
  DB Data Size is
  Sends an alert if approximate size of all documents (and their paddings) meets the specified threshold.
WiredTiger Storage Engine
  The following alert conditions apply to the MongoDB process's WiredTiger storage engine, as collected from the MongoDB serverStatus command's wiredTiger.cache and wiredTiger.concurrentTransactions documents. Other embodiments extend the described functionality to other storage engine to provide the same or similar functionality with different storage engine deployments.
  Users can view these metrics on the following charts, accessed through cluster monitoring:
  Tickets Available
  Cache Activity
  Cache Usage
  The following are the alert conditions that apply to WiredTiger:
  Tickets Available: Reads is
  Sends an alert if the number of read tickets available to the WiredTiger storage engine meet the specified threshold.
  Tickets Available: Writes is
  Sends an alert if the number of write tickets available to the WiredTiger storage engine meet the specified threshold.
  Cache: Dirty Bytes is
  Sends an alert when the number of dirty bytes in the WiredTiger cache meets the specified threshold.
  Cache: Used Bytes is
  Sends an alert when the number of used bytes in the WiredTiger cache meets the specified threshold.
  Cache: Bytes Read Into Cache is
  Sends an alert when the number of bytes read into the WiredTiger cache meets the specified threshold.
  Cache: Bytes Written From Cache is
  Sends an alert when the number of bytes written from the WiredTiger cache meets the specified threshold.
System and Disk Alerts
  The following alert conditions measure usage on the user's Atlas server instances:
  System: CPU (User) % is
  The normalized CPU usage of the MongoDB process, which is scaled to a range of 0-100%.
  Disk space used (%) for Data is
  The percentage of disk space used on any partition that contains the MongoDB collection data.
  Disk space used (%) for Indexes is
  The percentage of disk space used on any partition that contains the MongoDB index data.
  Disk space used (%) for Journal is
  The percentage of disk space used on the partition that contains the MongoDB journal, if journaling is enabled. Examples of database journaling are described in co-pending U.S. patent application Ser. No. 14/665,877, entitled "SYSTEMS AND METHODS FOR DURABLE DATABASE OPERATIONS IN A MEMORY-MAPPED ENVIRONMENT," filed on Mar. 23, 2015, incorporated by reference herein in its entirety.
  Disk I/O utilization (%) for Data is
  The percentage of time during which requests are being issued to any partition just MongoDB processes.
  Disk I/O utilization (%) for Indexes is
  The percentage of time during which requests are being issued to any partition that contains the MongoDB index data. This includes requests from any process, not just MongoDB processes.
  Disk I/O utilization (%) for Journal is
  The percentage of time during which requests are being issued to the partition that contains the MongoDB journal, if journaling is enabled. This includes requests from any process, not just MongoDB processes.
  In some embodiments certain Host Conditions are excluded from reporting: the following host conditions do not apply to some embodiments of Atlas. Atlas will not generate alerts for the following conditions: Memory: Mapped is; B-tree: accesses is; B-tree: hits is; B-tree: misses is; B-tree: miss ratio is; Effective Lock % is; Background Flush Average is; Accesses Not In Memory: Total is; Page Fault Exceptions Thrown: Total is; Cursors: Client Cursors Size is; Journaling Commits in Write Lock is; Journaling MB is; Journaling Write Data Files MB is; other embodiments, can be configured to monitor any one or more or combination of the above conditions and generate a report or alert for users.

Replica Set Alerts

The following alert condition applies to replica sets:

No Primary

Sends an alert when a replica set does not have a primary. Specifically, when none of the members of a replica set have a status of PRIMARY, the alert triggers. For example, this condition may arise when a set has an even number of voting members resulting in a tie.

If Atlas collects data during an election for primary, this alert might send a false positive. To prevent such false positives, set the alert configuration's after waiting interval (in the configuration's Send to section).

Sharded Cluster Alerts

The following alert condition applies to sharded clusters:

Cluster Mongos Is Missing

Sends an alert if Atlas cannot reach a mongos for the cluster.

Backup Alerts

The following alert conditions apply to the user's cluster backups, if enabled:

Oplog Behind

Sends an alert if the most recent oplog data received by Atlas is more than 75 minutes old.

Resync Required

Sends an alert if the replication process for a backup falls too far behind the oplog to catch up. This occurs when the host overwrites oplog entries that backup has not yet replicated. When this happens, the user must resync backup.

User Alerts

The following alert conditions apply to Atlas users.

Added to Group

Sends an alert when a new user joins the Atlas group.

Removed from Group

Sends an alert when a user leaves the Atlas group.

Changed Roles

Sends an alert when an Atlas user's roles have changed.

Group Alerts

The following alert conditions apply to the user's Atlas group.

Users awaiting approval to join group

Sends an alert if there are users who have asked to join the group. A user can ask to join a group when first registering for Atlas.

Users do not have two factor authentication enabled

Sends an alert if the group has users who have not set up two-factor authentication.

Service suspended due to unpaid invoice(s) more than 30 days old

Sends an alert if the group is suspended because of non-payment. A suspended group:
  denies users access,
  stops backups,
  terminates stored snapshots 90 days after suspension.

Billing Alert

The following alert condition applies to Atlas billing.

Credit card is about to expire

Sends an alert if the credit card on file is about to expire. The alert is triggered at the beginning of the month that the card expires. Atlas enables this alert when a credit card is added for the first time.

According to some embodiments, Altas backup service takes snapshots of the data. According to one embodiment, these snapshots stores the differences between successive snapshots. For sharded clusters, the backup service temporarily stops the balancer via the mongos in order to insert a marker token into all shards and configuration ("config") servers in the cluster. Atlas then takes a snapshot when the marker tokens appear in the backup data.

To reduce the snapshot data size, Atlas uses compression and block-level de-duplication technology. According to one embodiment, Atlas stores the backup data in data centers in North America, regardless of where the cluster itself is deployed, and retains these snapshots based on the retention policy. Other embodiments, can use different regions or distributed snapshot data across regions.

Enable Backup

Users can enable backup during the cluster creation or during the modification of an existing cluster. Specifically, in the cluster configuration, set Do the user want to enable backup? to Yes.

Modify Backup Schedule

If the user (users) enable backup for a cluster, Atlas takes a base snapshot of the user's data every 6 hours. To change a deployment's backup schedule, go to Backup. For the cluster whose backup schedule the user wish to modify, click the ellipsis and select Edit Snapshot Schedule menu option.

Retention Policy

Atlas retains snapshots for the time periods listed in the following table. If a user disables backup for a cluster or terminate a cluster, according to one embodiment, Atlas immediately deletes the backup snapshots for the cluster.

Example retentions policy:

| Snapshot | Default Retention Policy | Maximum Retention Setting |
| --- | --- | --- |
| Base snapshot. | 2 days | 5 days. |
| Daily snapshot | 7 days | 360 days |
| Weekly snapshot | 4 weeks | 52 weeks |
| Monthly snapshot | 13 months | 36 months |

In various embodiments, Atlas lets the user restore data from a scheduled snapshot or from a selected point between snapshots. For replica sets, the user can restore from selected points in time. For sharded clusters the user can restore from checkpoints between snapshots.

Restore a Cluster

According to one embodiment, to restore a cluster, go to Backup view (in the UI). In the Overview, hover over the Status field of the cluster backup to display the Restore button. Click the Restore button or click the ellipsis button under Options and select Restore. Follow the prompts to restore the user's cluster. the user may choose to: download the user's backup data via HTTPS and restore manually or have Atlas restore to a selected cluster. Atlas can only restore to same cluster or another cluster with the same topology in the same Atlas group. Warning: in some embodiments, restore requires downtime for the target cluster.

According to some embodiments, Atlas charges by the hour for the user's MongoDB clusters. Atlas tabulates costs daily and displays the user's current monthly costs in the upper right corner. To view line-item charges, click Atlas Settings, then Billing/Subscriptions, and then the Usage Details link. As users create or modify a cluster, the user can compare the costs of different options before applying them. Atlas displays the costs, except for data transfer, in a Cluster Overview box. Note: In some embodiments, the Cluster Overview box does not display data transfer costs in some embodiments.

Instance Size

Atlas provides different instance sizes. Each has a default RAM size, storage capacity, and maximum storage speed, which is included in the instance's per-hour charge. The instance size the user select is used for all the data-bearing servers in the user's cluster. Atlas provides default amounts of data storage as part of the base per-hour cost of the user's instance. If the user add capacity or speed, the user incur additional costs on top of the base cost. The Cluster Overview box shows the user's overall charges.

Storage Capacity

Atlas charges for storage capacity differently depending on whether the user use the instance default or a custom size. If the user use the default, storage is included in the instance's per-hour cost. If the user customize, Atlas charges for the entire amount of storage, not the difference from the default size.

For example, if the instance default is 80 GB and if the user increase storage to 81 GB, the change in cost is the charge for 81 GB. If the user then increase storage to 82 GB, the change in cost is the charge for 1 GB.

Custom Storage Speed

Atlas measures storage speed as maximum IOPS (Input/Output Operations Per Second). Each Atlas instance type offers a Standard storage speed that is included in the instance's per-hour cost. The maximum IOPS of the standard speed depend on the instance type. For most instance types, the user can increase storage speed from Standard to Fast or Fastest, which affects costs. Selecting a custom speed changes both IOPS and the type of storage used. The storage type changes from a general-purpose SSD to a provisioned-IOPS SSD. For more information on storage types, see http://docs.aws.amazon.com/AWSEC2/latest/UserGuide/EBSVolumeTypes.html.

Data Transfer

Atlas charges for data transfer according to where the data originates. Atlas tabulates data transfer costs daily. Charges for data transfer increase as follows, from lowest to highest:
  Data transfer with a server in the same region.
  Data transfer with a server in a different region.
  Data transfer with a server on the Internet.
Region: Instance and storage costs vary by region. In addition, the region affects data transfer charges, as described in the Data Transfer section.

Number of Servers: according to some embodiments, Atlas charges the instance cost and data storage cost for each data-bearing server in the user's cluster. For a replica set, the number of data-bearing servers equals the replication factor. For a sharded cluster, the number of data-bearing servers equals the replication factor multiplied by the number of shards. If the user enable sharding, Atlas will also run three config servers in addition to the user's data-bearing servers. the user's selections for instance size and data storage do not affect the costs of the config servers. Config servers are charged at a separate rate. Their cost is reflected in the cost of the cluster.

Various aspects and functions described herein may be implemented as specialized hardware or software components executing in one or more specialized computer systems. There are many examples of computer systems that are currently in use that could be specially programmed or specially configured. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod Touches running iOS operating systems available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 21:
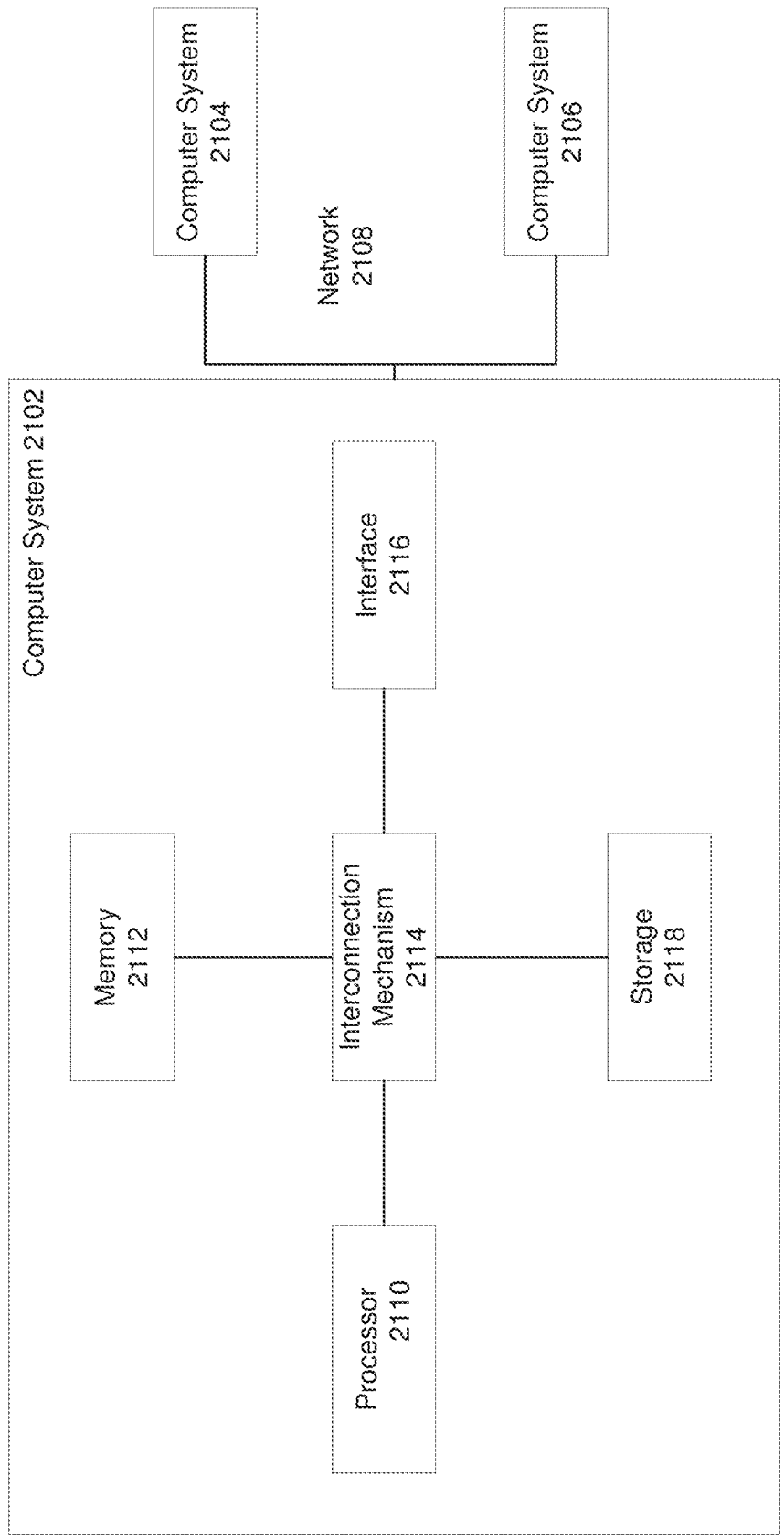
FIG. 21 is a schematic diagram of an exemplary computer system that may be specially configured to perform processes and functions disclosed herein.

For example, various aspects, functions, and processes may be distributed among one or more computer systems configured to provide a service to one or more client computers, or to perform an overall task as part of a distributed system, such as the distributed computer system 2100 shown in FIG. 21. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 21, there is illustrated a block diagram of a distributed computer system 2100, in which various aspects and functions are practiced. As shown, the distributed computer system 2100 includes one or more computer systems that exchange information. More specifically, the distributed computer system 2100 includes computer systems 2102, 2104, and 2106. As shown, the computer systems 2102, 2104, and 2106 are interconnected by, and may exchange data through, a communication network 2108. The network 2108 may include any communication network through which computer systems may exchange data. To exchange data using the network 2108, the computer systems 2102, 2104, and 2106 and the network 2108 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS21, JSON, SOAP, CORBA, REST, and Web Services. To ensure data transfer is secure, the computer systems 2102, 2104, and 2106 may transmit data via the network 2108 using a variety of security measures including, for example, SSL or VPN technologies. While the distributed computer system 2100 illustrates three networked computer systems, the distributed computer system 2100 is not so limited and may include any number of computer systems and computing devices, networked using any medium and communication protocol.

As illustrated in FIG. 21, the computer system 2102 includes a processor 2110, a memory 2112, an interconnection element 2114, an interface 2116 and data storage element 2118. To implement at least some of the aspects, functions, and processes disclosed herein, the processor 2110 performs a series of instructions that result in manipulated data. The processor 2110 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 2110 is connected to other system components, including one or more memory devices 2112, by the interconnection element 2114.

The memory 2112 stores programs (e.g., sequences of instructions coded to be executable by the processor 2110) and data during operation of the computer system 2102. Thus, the memory 2112 may be a relatively high performance, volatile, random access memory such as a dynamic random access memory ("DRAM") or static memory ("SRAM"). However, the memory 2112 may include any device for storing data, such as a disk drive or other nonvolatile storage device. Various examples may organize the memory 2112 into particularized and, in some cases, unique structures to perform the functions disclosed herein. These data structures may be sized and organized to store values for particular data and types of data.

Components of the computer system 2102 are coupled by an interconnection element such as the interconnection element 2114. The interconnection element 2114 may include any communication coupling between system components such as one or more physical busses in conformance with specialized or standard computing bus technologies such as IDE, SCSI, PCI and InfiniBand. The interconnection element 2114 enables communications, including instructions and data, to be exchanged between system components of the computer system 2102.

The computer system 2102 also includes one or more interface devices 2116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 2102 to exchange information and to communicate with external entities, such as users and other systems.

The data storage element 2118 includes a computer readable and writeable nonvolatile, or non-transitory, data storage medium in which instructions are stored that define a program or other object that is executed by the processor 2110. The data storage element 2118 also may include information that is recorded, on or in, the medium, and that is processed by the processor 2110 during execution of the program. More specifically, the information may be stored in one or more data structures specifically configured to conserve storage space or increase data exchange performance. The instructions may be persistently stored as encoded signals, and the instructions may cause the processor 2110 to perform any of the functions described herein. The medium may, for example, be optical disk, magnetic disk or flash memory, among others. In operation, the processor 2110 or some other controller causes data to be read from the nonvolatile recording medium into another memory, such as the memory 2112, that allows for faster access to the information by the processor 2110 than does the storage medium included in the data storage element 2118. The memory may be located in the data storage element 2118 or in the memory 2112, however, the processor 2110 manipulates the data within the memory, and then copies the data to the storage medium associated with the data storage element 2118 after processing is completed. A variety of components may manage data movement between the storage medium and other memory elements and examples are not limited to particular data management components. Further, examples are not limited to a particular memory system or data storage system.

Although the computer system 2102 is shown by way of example as one type of computer system upon which various aspects and functions may be practiced, aspects and functions are not limited to being implemented on the computer system 2102 as shown in FIG. 21. Various aspects and functions may be practiced on one or more computers having a different architectures or components than that shown in FIG. 21. For instance, the computer system 2102 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 2102 may be a computer system including an operating system that manages at least a portion of the hardware elements included in the computer system 2102. In some examples, a processor or controller, such as the processor 2110, executes an operating system. Examples of a particular operating system that may be executed include a Windows-based operating system, such as, the Windows-based operating systems, available from the Microsoft Corporation, a MAC OS System X operating system or an iOS operating system available from Apple Computer, one of many Linux-based operating system distributions, for example, the Enterprise Linux operating system available from Red Hat Inc., or a UNIX operating system available from various sources. Many other operating systems may be used, and examples are not limited to any particular operating system.

The processor 2110 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Java, C++, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiples of each selection. Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A cloud distributed database system, the system comprising:
   at least one cloud based resource, the at least one cloud based resource including processor and memory;
   a database subsystem executing on the at least one cloud based resource, wherein the database subsystem comprises:
      at least one replica set including:
         a primary node hosting a primary database instance of a database, the primary node configured to:
            accept database write operations from client systems and maintain an operation log including an ordered sequence of database write operations for execution including the database write operations, and
            responsive to accepting the database write operations from client systems, record the write operations in the operation log including the ordered sequence of database write operations for execution and replicate the database write operations to at least two secondary nodes from the operation log including the ordered sequence of database write operations for execution;
         the at least two secondary nodes configured to:
            host copies of data of the primary database instance,
            replicate logged operations from the primary node, the at least two secondary nodes replicating the database write operations included in the operation log including the ordered sequence of database write operations for execution from the primary node,
            accept database read operations from client systems, and
            responsive to accepting the database read operations, provide a result to the client from the copies of the data of the primary database instance hosted by the at least two secondary nodes;
      a connection manager configured to control authentication of the client systems based on connection strings communicated from the client systems connecting to an instance of the database stored in the at least one replica set;
   wherein the database subsystem is configured to accept database operations including write and read commands from client systems connected to the database, and provide a result to the client from matching records in the database stored in the at least one replica set responsive to the client communicated database operations; and
   a monitoring component, executing on the at least one cloud based resource, configured to:
      communicate performance metrics for cloud resource utilization by the database subsystem to a central management server;
      communicate performance metrics for database operation, the performance metrics for database operation being determined in part based on the operation log including the ordered sequence of database write operations for execution including the database write operations, from the primary node; and
   wherein the database subsystem is further configured to accept optimization information from the central management server based on analysis of the performance metrics for cloud resource utilization and the performance metrics for database operation by the central management server, including at least analysis of replication of the write operations from the operation log including the ordered sequence of database write operations for execution,
wherein the database subsystem is further configured to accept optimization information from the central management server based on analysis of whether a measured rate of replication of the write operations, from the operation log including the ordered sequence of database write operations for execution, meets a threshold rate.

2. The system of claim 1, wherein the monitoring component further comprises at least one monitor agent executed on instantiated cloud resources configured to collect the performance metrics for cloud resource utilization.

3. The system of claim 2, wherein the monitoring component further comprising at least one monitor agent executing on database application components configured to collect the performance metrics for database operation.

4. The system of claim 1, wherein the database subsystem further comprises:
a plurality of replica sets, wherein the database data is partition across the plurality of replica sets;
a routing component configured to route client data requests to respective replica sets based on configuration metadata for the database data; and
a configuration sever configured to store configuration metadata specifying location of database ranges.

5. The system of claim 4, wherein, the connection manager is configured to manage database connections from the client to the routing component.

6. The system of claim 1, further comprising an automation component executed on the at least one cloud based resource configured to automatically execute optimization information from the central management server.

7. The system of claim 6, wherein the automation component is configured to automatically provision additional database components hosted on cloud based resources responsive to optimization information.

8. The system of claim 7, wherein the automation component is configured to:
provision a new secondary node in the at least one replica set and trigger an initial synchronization with at least one of the at least two secondary nodes to provide a copy of the data of the primary node's database;
update configuration information for the at least one replica set; and
trigger replication of logged operations on the primary node to the new secondary node.

9. The system of claim 1, further comprising;
a snapshot component, executed on the at least one cloud based resource, configured to:
generate a plurality of snapshots of data stored in the at least one replica set; and
identify a committed snapshot from the plurality of snapshots that is representative of data that has been replicated on a majority of members of the at least one replica set; and
a command processing component configured to read the committed snapshot responsive specification of a read commit option in a client request and generate the result of data matching the read request using the committed snapshot.

10. The system of claim 9, wherein the snapshot component is further configured to identify a new committed snapshot responsive to receipt of at least one confirmation from the at least two secondary nodes.

11. The system of claim 9, wherein the command processing component is configured identify a data storage node from the at least one replica set having data consistent with the committed snapshot and execute a read commit operations from the identified data storage node.

12. The system of claim 1, wherein the at least one replica set is configured to:
communicate, via a normal database operation, heartbeat information as metadata within a write operation function; and
automatically recover a primary node in the distributed database system in response to a detected failure of the primary node by an absence of the heartbeat information.

13. The system of claim 1, wherein the database subsystem is further configured to accept optimization information from the central management server based on analysis of whether a measure of the write operations, from the operation log including the ordered sequence of database write operations for execution, meets a threshold.

14. The system of claim 1, wherein the database subsystem is further configured to accept optimization information from the central management server based on analysis of whether an estimated time for replication of the write operations, from the operation log including the ordered sequence of database write operations for execution, meets a threshold time.

15. A computer implemented method for managing a distributed database on cloud based resources, the method comprising:
executing a database subsystem on at least one cloud based resource having memory and processor, wherein the database subsystem comprises at least one replica set including a primary node hosting a primary database instance of a database, and at least two secondary nodes that host copies of data of the primary database instance;
accepting, by the primary node, database write operations from client systems;
responsive to accepting the database write operations from client system, recording, by the primary node, the operations in an operation log including an ordered sequence of database write operations for execution and replicating, by the primary node, the database write operations to the at least two secondary nodes from the operation log including the ordered sequence of database write operations for execution;
executing, by the database subsystem, database write operations at the primary database instance hosted on the primary node, wherein the primary node maintains the operation log including the ordered sequence of database write operations for execution including the database write operations;
replicating the database write operations included in the operation log including the ordered sequence of database write operations for execution from the primary node to the at least two secondary nodes;
accepting, by the at least two secondary nodes, database read operations from client systems;
responsive to accepting the database read operations, providing, by the at least two secondary nodes, a result to the client from the copies of the data of the primary database instance hosted by the at least two secondary nodes;

managing, by the database subsystem, authentication of client systems based on connection strings communicated from the client systems connecting to an instance of the database stored in the at least one replica set and accepting database operations including write and read commands from client systems connected to the database;

communicating, by the database subsystem, a result to the client from the database stored in the at least one replica set responsive to the client communicated database operations;

communicating, by a monitoring component executed on the at least one cloud based resource, performance metrics for cloud resource utilization by the database subsystem to a central management server;

communicating, by the monitoring component, performance metrics for database operation, the performance metrics for database operation being determined in part based on the operation log including the ordered sequence of database write operations for execution including the database write operations, from the primary node; and accepting, by the database subsystem, optimization information from the central management server based on analysis of the performance metrics for cloud resource utilization and the performance metrics for database operation by the central management server, including at least analysis of replication of the write operations from the operation log including the ordered sequence of database write operations for execution, accepting, by the database subsystem, optimization information from the central management server based on analysis of whether a measured rate of replication of the write operations, from the operation log including the ordered sequence of database write operations for execution, meets a threshold rate.

16. The method of claim 15, wherein the method further comprises executing a monitoring component on instantiated cloud resources.

17. The method of claim 16, wherein the method further comprises executing a monitoring component on a plurality of database application components.

18. The method of claim 15, wherein the method further comprises:
    partitioning the database data across a plurality of replica sets;
    routing client data requests, by a routing component, to respective replica sets based on configuration metadata for the database data; and
    storing on a configuration sever configuration metadata specifying location of database ranges.

19. The method of claim 18, wherein the method further comprises managing database connections from the client to the routing component by a connection manager.

20. The method of claim 15, wherein the method further comprises executing, automatically optimization information from the central management server by an automation component executed on the at least one cloud based resource.

21. The method of claim 20, wherein the method further comprises automatically provisioning additional database components hosted on cloud based resources responsive to optimization information.

22. The method of claim 21, wherein the method further comprises:
    provisioning, by the automation component, a new secondary node in the at least one replica set and triggering an initial synchronization with at least one of the at least two secondary nodes to provide a copy of the primary node's database;
    updating configuration information for the at least one replica set; and
    triggering replication of logged operations on the primary node to the new secondary node responsive to the updated configuration information.

23. The method of claim 15, the method further comprising:
    generating, by the snapshot component, a plurality of snapshots of data stored in the at least one replica set; and
    identifying, by the snapshot component, a committed snapshot from the plurality of snapshots that is representative of data that has been replicated on a majority of members of the at least one replica set; and
    controlling read operations to access the committed snapshot responsive specification of a read commit option in a client request and generating the result of data matching the read request using the committed snapshot.

24. The method of claim 23, further comprising identifying, by the snapshot component, a new committed snapshot responsive to receipt of at least one confirmation from the at least two secondary nodes.

25. The method of claim 23, further comprising identifying a data storage node from the at least one replica set having data consistent with the committed snapshot and execute a read commit operations from the identified data storage node.

26. The method of claim 23, further comprising:
    communicating, via a normal database operation, heartbeat information as metadata within a write operation function; and
    recovering, automatically, a primary node in the distributed database system in response to a detected failure of the primary node by an absence of the heartbeat information.

* * * * *